US012711412B2

(12) United States Patent
Uys et al.

(10) Patent No.: US 12,711,412 B2
(45) Date of Patent: Aug. 18, 2026

(54) METHODS AND APPARATUSES FOR RAPID MEASUREMENT OF THE MOTIONAL MODE PHASE IN TRAPPED ION CHAINS

(71) Applicant: IonQ, Inc., College Park, MD (US)

(72) Inventors: Hermann Uys, Annapolis, MD (US); Peter Lukas Wilhelm Maunz, Albuquerque, NM (US)

(73) Assignee: IonQ, Inc., College Park, MD (US)

( * ) Notice: Subject to any disclaimer, the term of this patent is extended or adjusted under 35 U.S.C. 154(b) by 540 days.

(21) Appl. No.: 18/088,287

(22) Filed: Dec. 23, 2022

(65) Prior Publication Data

US 2024/0211789 A1 Jun. 27, 2024

(51) Int. Cl.
*G06N 10/40* (2022.01)

(52) U.S. Cl.
CPC .................................... *G06N 10/40* (2022.01)

(58) Field of Classification Search
None
See application file for complete search history.

(56) References Cited

U.S. PATENT DOCUMENTS

2020/0005178 A1 1/2020 Amini
2020/0082291 A1 3/2020 Debnath et al.
2020/0321949 A1* 10/2020 Debnath ................ G06N 10/70
2020/0372391 A1 11/2020 Nam et al.
2021/0158200 A1 5/2021 Monroe et al.

FOREIGN PATENT DOCUMENTS

EP 3564872 A1 11/2019

OTHER PUBLICATIONS

Burd et al., Quantum amplification of mechanical oscillator motion, Science 364, 1163-1165 (2019) (Year: 2019).*
Timothy Andrew Manning, Quantum information processing with trapped ion chains, PhD thesis (Year: 2014).*
Bruzewicz et al., "Dual-species, multi-qubit logic primitives for Ca+/Sr+ trapped-ion crystals," NPJ Quantum Information, 2019, vol. 5, No. 102, 10 pages.
Eschner et al., "Laser cooling of trapped ions," Journal of the Optical Society of America B, May 2003, vol. 20, No. 5, pp. 1003-1015.
Hughes et al., "Benchmarking a high-fidelity mixed-species entangling gate," Physical Review Letters, Apr. 3, 2020, vol. 125, No. 080504, 7 pages.
Inlek et al., "Multi-Species Trapped Ion Node for Quantum Networking," Physical Review Letters, Jun. 23, 2017, vol. 118, No. 250502, 6 pages.

(Continued)

*Primary Examiner* — James Choi
(74) *Attorney, Agent, or Firm* — ARENTFOX SCHIFF LLP

(57) ABSTRACT

Aspects of the present disclosure may include a method and/or a system for selecting a first ion of the plurality of ions in the ion chain, selecting a second ion of the plurality of ions in the ion chain, applying a first carrier π/2 pulse to the first ion, applying a first red sideband π pulse to the first ion, applying a second red sideband π pulse to the second ion, applying a second carrier π/2 pulse to the second ion, and scanning a phase of the second carrier π/2 pulse.

12 Claims, 36 Drawing Sheets

(56) References Cited

OTHER PUBLICATIONS

International Search Report in PCT/US2022/033118, mailed Apr. 18, 2023, 5 pages.
Sorensen et al., "Efficient coherent internal state transfer in trapped ions using Stimulated Raman Adiabatic Passage," New Journal of Physics, 2006, vol. 8, No. 261, 11 pages.
Wei et al., "Raman sideband cooling of rubidium atoms in optical lattice," Chinese Physics B, 2017, vol. 26, No. 8, 6 pages.
Wright et al., "Scalable Quantum Computing Architecture with Mixed Species Ion Chains," arXiv:1410.0037v1 [quant-ph], Sep. 30, 2014. Retrieved from the Internet <URL:https://arxiv.org/abs/1410.0037>, 7 pages.
Written Opinion in PCT/US2022/033118, mailed Apr. 18, 2023, 11 pages.
Zi et al., "Injection locking method for Raman beams in atom interferometer," 2017 Asia Communications and Photonics Conference (ACP), Nov. 10, 2017, 2 pages.

* cited by examiner

● = data ion
○ = coolant ion

Example: (A) Sympathetic cooling/calibration

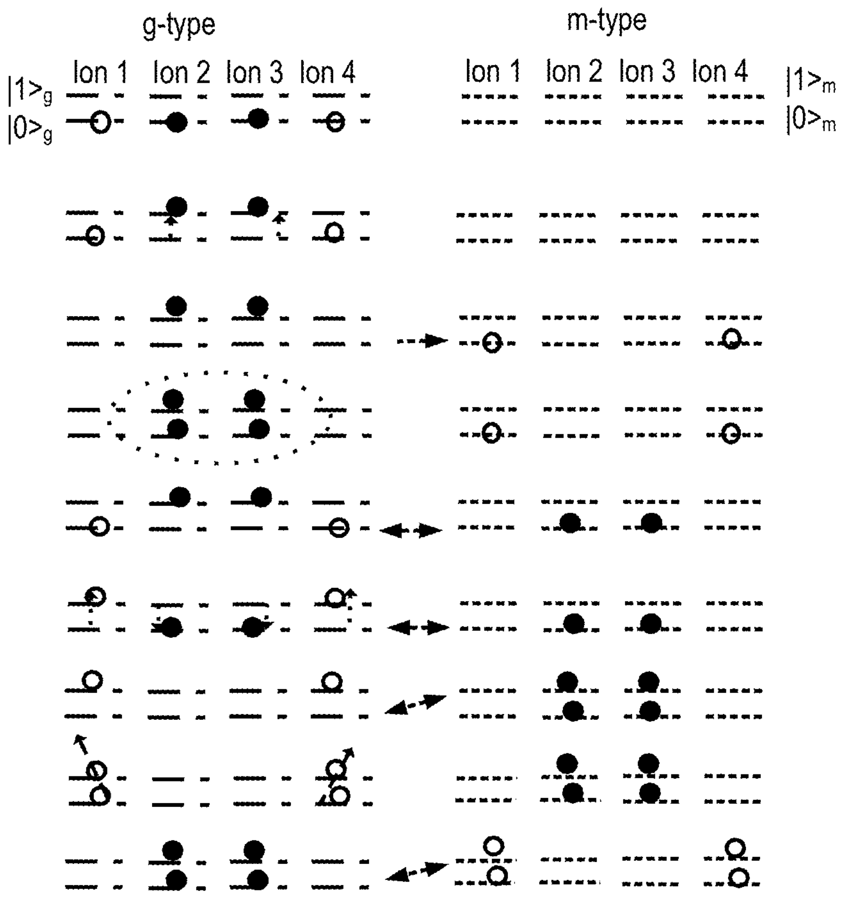

ALTERNATIVE REQUIRING HSS BEAMS WITH ONLY m-TYPE SPLITTING

1. Initialize all to $|0\rangle_g$ via OP

2. Local g-type Raman of data to $|1\rangle_g$

3. Global HSS of $|0\rangle_g \leftrightarrow |0\rangle_m$

4. Algorithm via g-type 1 and 2-qubit Raman gates

5A. Global HSS of $|0\rangle_g \leftrightarrow |0\rangle_m$ (o-type)

6A. Local *OR* global g-type Raman of all ions; *since global is OK, this could be u-wave driven*

7A. Global HSS of $|0\rangle_g \leftrightarrow |1\rangle_m$ (m-type)

8Ai/ii. Global sympathetic cooling in g-type space/cal

9A. Reverse steps 7A-5A

FIG. 5

Example: (D) REG and Distribution via Ancilla

= data ion
= coolant ion
= REG ion g-type: Ion 1 Ion 2 Ion 3 Ion 4 m-type: Ion 1 Ion 2 Ion 3 Ion 4

9D. REG attempts and symp. cooling interleaved

10D. Global HSS of $|0>_g$ to $|0>_m$

11D. Local g-type Raman on REG ancilla

12Di. Global HSS of $|1>_g \leftrightarrow |1>_m$

12Dii. Global HSS of $|0>_g \leftrightarrow |0>_m$

13D. Local g-type Raman of REG ancilla

14D. Global HSS of $|0>_g \leftrightarrow |0>_m$

15D. Entanglement distribution in g-type using *single species* 2q gates

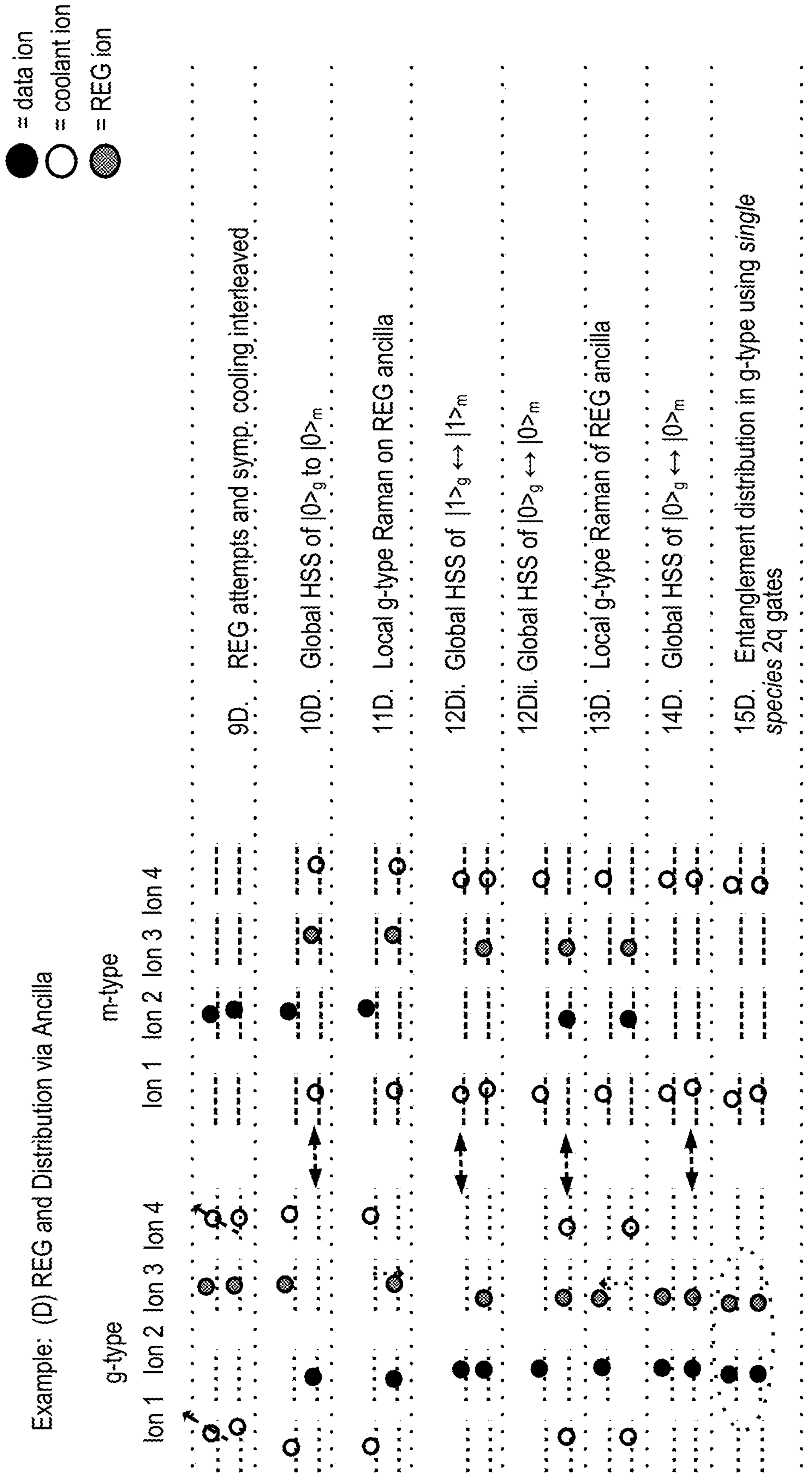

FIG. 9

Clock-imposed phases: $Ø_A = Ø_i$, $Ø_B = Ø_i + δT + ½ d'T^2$, $Ø_C = Ø_i + δ(2T) + ½ δ'(2T)^2$ δ = clock laser detuning Error: $ΔØ = Ø_0 - Ø_1 = (Ø_B - Ø_A) - (Ø_C - Ø_B)$ $= 2(Ø_i + δT + ½ δ'T^2) - Ø_i - (Ø_i + 2δT + 2δ'T^2) = - δ'T^2$ Similar for $Ø_{A'}$, $Ø_{B'}$, $Ø_{C'}$ Ø is positive for S®D and negative for D®S Steps 1-4: $Ø_{0,i} = Ø_A - Ø_B + Ø_C \quad Ø_{1,i} = Ø_B \longrightarrow \Delta Ø_1 = Ø_{0,i} - Ø_{1,i} = \delta_1 T^2$ Steps 6-10: $Ø_{0,2} = -Ø_D + Ø_F \quad Ø_{1,2} = -Ø_D + Ø_E - Ø_F + Ø_G$ $Ø_E = Ø_2 \quad Ø_F = Ø_2 + \delta_2 T + ½ \delta_2' T^2 \quad Ø_G = Ø_2 + \delta_2 (2T) + ½ \delta_2' (2T)^2$ $\Delta Ø_2 = Ø_{0,2} - Ø_{1,2} = [-Ø_D + \delta_2 T + ½ \delta_2' T^2)] - [-Ø_D + Ø_D - (Ä_2 + \delta_2 T + ½ \delta_2' T^2) + (Ø_2 + 2\delta_2 T + 2\delta_2' T^2)] = -\delta_2' T^2$ Global HSS beam
- Beam travels 45 degrees to the ion chain axis and 45 degrees to the magnetic field direction Magnetic field direction polarization Ion chain polarization Individual addressing Raman beams
- Beams travel perpendicular to the ion chain axis and parallel to magnetic field

METHODS AND APPARATUSES FOR RAPID MEASUREMENT OF THE MOTIONAL MODE PHASE IN TRAPPED ION CHAINS

TECHNICAL FIELD

Aspects of the present disclosure relate generally to quantum information processing (QIP) architectures, and more particularly, to dual-space, single-species architecture for trapped-ion QIP.

BACKGROUND

Trapped atoms are one of the leading implementations for quantum information processing or quantum computing. Atomic-based qubits can be used as quantum memories, as quantum gates in quantum computers and simulators, and can act as nodes for quantum communication networks. Qubits based on trapped atomic ions enjoy a rare combination of attributes. For example, qubits based on trapped atomic ions have very good coherence properties, can be prepared and measured with nearly 100% efficiency, and are readily entangled with each other by modulating their Coulomb interaction with suitable external control fields such as optical or microwave fields. These attributes make atomic-based qubits attractive for extended quantum operations such as quantum computations or quantum simulations.

It is therefore important to have architectures that take advantage of atomic-based qubits, including architectures that support different types of trapped-ion techniques.

SUMMARY

The following presents a simplified summary of one or more aspects to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

The dual-space, single-species architecture for trapped-ion for quantum information processing described herein is flexible and has several advantages over architectures that rely on dual species. For example, a single chain of ions is reconfigurable as needed without physical shuttling. Also, sympathetic cooling can be perfectly mass-matched. The exemplary aspect does not require narrow line cooling, which itself may be a risk, and may not get as cold as (electromagnetically-induced-transparency) EIT cooling. This exemplary aspect also enables mid-algorithm readout and remote entanglement generation (REG) on dipole-allowed (broad) transitions for high speed. Moreover, no mixed-species two-qubit (2q) gate is needed for remote entanglement (RE) distribution.

The use of a global 1762-nm optical beam for dual-space, single-species architectures is already considered for shelving during readout. Only the short-wavelength Raman beam need be focused tightly for addressing. But for the approach using g-type gates (ground qubit gates), another independent tone may be needed 10 GHz away. This may be accomplished with an electro-optic modulator (EOM) and/or a second laser and a high frequency acousto-optic modulator (AOM). AC Stark shifts of the m-type (metastable qubit), including from the ion trap RF, needs to be considered/managed. The global 1762 optical beam would also allow for integrated photonics down the road.

The dual-space, single-species architecture described herein can also support m-type Raman operations, which can produce higher-fidelity and more efficient gates. Such an approach only needs the 1762 tones spaced by ~80 MHz (not 10 GHz) with local m-type and g-type Raman. Additionally, exemplary aspects of the present disclosure includes using a continuous wave (CW) Raman system. An advantage includes that, since EIT cooling occurs in the g state, performing circuits in the m state may obviate the need to shuttle the qubits and the ancillae back and forth between the g state and the m state during computation.

Aspects of the present disclosure may include a method and/or a system for identifying an ion chain having a plurality of trapped ions, selecting at least two non-consecutive trapped ions in the ion chain for implementing a qubit, applying at least a first Raman beam to shuttle at least one neighbor ion of the at least two non-consecutive trapped ions from a ground state to a metastable state, and applying at least a second Raman beam to one or more of the at least two non-consecutive trapped ions, after shuttling the at least one neighbor ion to the metastable state, to transition from a first manifold to a second manifold.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 5 illustrates an example of an alternative sympathetic cooling/calibration in connection with aspects of this disclosure.

FIGS. 8 and 9 illustrate an example of a REG and distribution via ancilla in connection with aspects of this disclosure.

DETAILED DESCRIPTION

Figure 1:
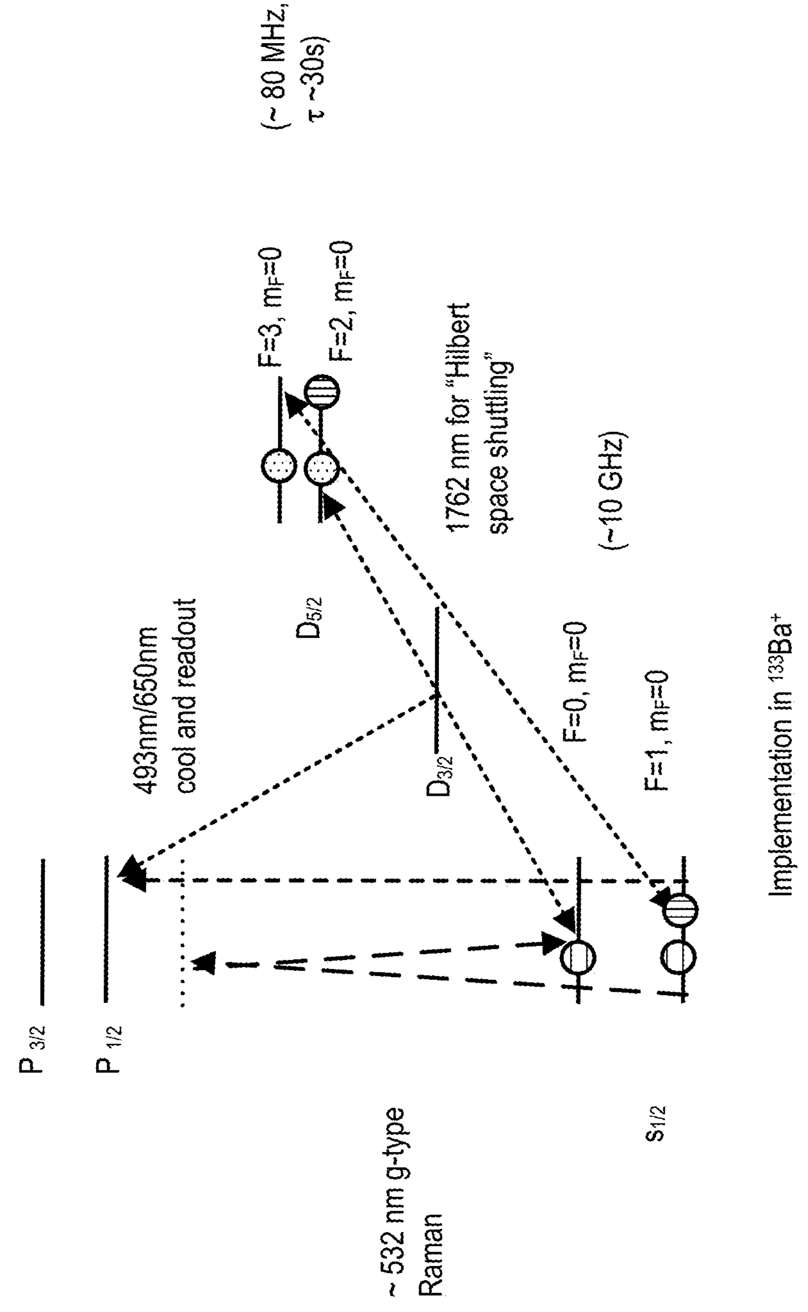
FIG. 1 illustrates an example of a dual-space, single species implementation in 133Ba+ in connection with aspects of this disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

In general, dual-species trapped-ion quantum computing is considered advantageous for practical, high-fidelity systems. This approach can be used to mitigate decoherence of data and syndrome qubits during sympathetic cooling in the middle of long algorithms and/or after ion transport, mid-algorithm qubit readout of a subset of the quantum processor, mid-algorithm remote entanglement generation (REG), and mid-algorithm calibration. This approach relies on having different species with very different transition frequencies. These differences need to be large compared with transition linewidths and transition rates.

But the use of dual-species in trapped-ion quantum computing can have some challenges. For example, more lasers and optical beams are needed, chain (e.g., linear arrangement of ions) order matters both for ion addressability and mode structure, and more complicated loading, and unintended chain reordering may cause some issues. Moreover, sympathetic cooling in mixed species chains (especially radial modes) can be inefficient, while shuttling and split/merge operations in mixed species chains is challenging due to different pseudopotentials seen by ions of different mass. Mixed-species two-qubit (2q) gates (needed for REG distribution) can have lower fidelity.

The Dual-Space Concept

The dual-space concept is described in connection with FIG. 1. For this approach, there is the use of two Hilbert spaces in one ion species to gain dual-species functionality. These spaces are naturally decoupled but can be coupled through application of optical fields. Spaces either consist of ground state or metastable state.

This approach is sometimes referred to as the “omg” or “OMG” concept because it involves an optical qubit (i.e., o-type, shown as a circle with vertical lines in FIG. 1) for high-fi measurement, a metastable qubit (i.e., m-type, shown as a circle with dots in FIG. 1) for protected memory with low-field clock states, T1~30 s, and a ground qubit (i.e., g-type, shown as a circle with horizontal lines in FIG. 1) for processing, cooling, and remote entanglement generation. This approach involves arrow quadrupole transitions for changing types: “Hilbert space shuttling” (HSS).

Sympathetic Cooling

In a trapped-ion quantum computer, the collective motional modes of a chain of ions must be cooled to enable high-fidelity manipulation of the atomic qubits. However, during a calculation, electric field noise leads to heating of these motional modes, which can degrade the system's performance over the course of the calculation. Additionally, to perform a calculation that involves ions in multiple chains, the chains must be shuttled spatially during the calculation, which can also lead to heating of the motional modes. Sympathetic cooling is typically used to cool these motional modes during a calculation. This involves performing the calculation using one set of “qubit” ions while simultaneously performing laser-cooling operations on a separate set of “coolant” ions, which has the effect of cooling the collective motional modes of the entire chain. This has been demonstrated by using two separate elements (e.g., Yb and Ba) or two isotopes of the same element (e.g., Yb-171 and Yb-172) for the qubit and coolant ions.

However, one problem is that the coupling of individual ions to the collective motional modes depends on those ions' masses, and so ions that have different masses—as different elements or isotopes do—couple differently to the motional modes, degrading the effectiveness of the sympathetic cooling scheme. Further, the presence of ions with different masses complicates the design of quantum gates, which are highly sensitive to properties of the collective motional modes. A second significant technical problem is that collision with background gas molecules can cause the ions in the chain to reorder, scrambling the qubit and coolant ions and forcing the slow and costly operation of either reordering or rebuilding the chain. A third problem, for chains composed of two isotopes of the same element, is that the frequencies of the optical transitions involved in cooling the coolant ions are typically close to those of the qubit ions, and so light that is emitted by the coolant ions can be absorbed by the qubit ions, degrading the calculation.

There are some of the advantages to the approach described herein in connection with sympathetic cooling. Because the qubit and coolant ions are identical, the problems related to different masses and chain reordering are eliminated. Further, because all ions in the chain are identical until they are assigned to be either qubit or coolant ions, the assignment can be determined dynamically for each calculation to optimize the number and positions of coolant ions without reloading a new chain.

High-Fidelity Readout

At the end of a computation the states of all qubit ions must be read out optically. Generally, this is done by applying a global detection laser, which will cause ions that are in the "bright" state to fluoresce but not ions that are in the "dark" state. Because the bright and dark states for a hyperfine qubit are generally part of the same manifold (i.e., the $S_{1/2}$ states in $^{133}Ba^+$ or $^{171}Yb$), the transition(s) addressed by the detection laser must be chosen carefully to avoid exciting the ion out of the dark state, thereby leading to erroneous fluorescence, and also to avoid pumping the ion from the bright state to the dark state, thereby leading to an erroneous lack of fluorescence. Often, the rates at which these errors occur are set by the intrinsic atomic properties of the ion, placing a fundamental limit on the fidelity with which the ion's state can be read out.

There are various advantages to the approach described herein in connection with the read out. For example, these errors can be avoided by transferring one of the qubit states into a separate manifold (i.e., the $D_{5/2}$ states in $^{133}Ba^+$), a process known as shelving. The ion can then be illuminated in such a way so that all states in the original manifold fluoresce. Because the two manifolds are decoupled, the rate at which the dark state (the state that has been shelved) can be caused to erroneously fluoresce and the rate at which the bright state (the state that has not been shelved) can erroneously stop fluorescing are extremely small. As a result, the readout fidelity can be made to be extremely high.

Mid-Circuit Calibration

The fidelity of a quantum computation is extremely sensitive to a wide variety of experimental factors, such as optical beam alignment, laser intensity at the ions, the strength of the confining potential that traps the ions, the presence of stray electric fields, and many others. These factors are likely to drift or change over time, so calibrations need to be performed to account for this drift.

Because these calibrations require reading the states of the ions to extract information about these factors, they are typically performed between computations, during which it is forbidden to read the states of the qubit ions involved in the computation. However, this limits the speed at which these calibrations can be performed, limiting the bandwidth of the calibration feedback.

Alternatively, calibrations can be performed during the computation using ancilla ions that are not involved in the computation itself. However, because these calibration routines collect fluorescence from the ancilla ions to read out their states, it has formerly been required to use either a different atomic element or different isotope for the ancilla ions so that this fluorescence does not disturb the states of the qubit ions that are involved in the computation. Consequently, various properties of the ancilla ions may be different from those of the qubit ions, which causes them to be influenced by these experimental factors in subtly different ways and may limit the predictive value of ancilla-based calibrations.

There are various advantages to the approach described herein in connection with mid-circuit calibration. For example, the ancilla and qubit ions are identical, and the calibration routines are performed by precisely the same techniques that are used to run the computation. Therefore, the calibration results do not need to be adjusted to account for physical differences between the calibration routines run on the ancilla ions and the computation run on the qubit ions.

Mid-Circuit Partial Readout

Many quantum algorithms or circuits involve measuring a fraction of the qubits mid-circuit while requiring that the unmeasured fraction remain coherent. Such mid-circuit measurement can be a critical component of quantum error correction (QEC). In QEC, ancilla qubits, which are entangled with data qubits, are measured to herald and identify errors in the data qubits. The error in the data qubits can then be corrected by subsequent quantum operations, but this only works if the quantum information in the data qubits is not destroyed during the measurement of the ancillas. This presents a challenge for single-species trapped-ion-qubit systems because measurement of ancillas typically requires the scattering of many photons from a readout laser, and these photons can be reabsorbed by nearby data ions causing their quantum information to be lost. One standard approach to solve this problem is to move the ancilla ions far away from the data ions after they are entangled with them, but before (and during) measurement. However, this dynamic, mid-circuit reconfiguration of ion-qubit positions can be impractical or undesirable in many situations. The use of dual-species trapped-ion systems, where ancillas and data ions are different species, also mitigates this problem and allows ions to stay close to one another. However, the disadvantages of dual species operation have already been elucidated earlier. In this mid-circuit partial readout protocol for QEC, dual-species entangling (two-qubit) gates may be required, which may typically have a fidelity that is not as good as that of single-species entangling gates.

There are various advantages to the approach described herein in connection with mid-circuit partial readout. For example, data qubits can be stored in the m-type space while ancillas are measured. This protects the quantum information in the data qubits from absorption of photons emitted from nearby ancilla qubits. As a result, there is no decoherence from this measurement process and mid-circuit partial readout of the ion register can be performed without any constraints on the distance between data and ancilla ion qubits. Furthermore, only a single species ion is used, so entangling gates between data and ancilla ions will typically be of higher fidelity.

Mid-Circuit Remote Entanglement Generation

Ion-based quantum computers will need to scale to numbers of qubits that are larger than can be worked with in a single trap. A technique called "remote entanglement generation" (REG) may be required to enable communication between the registers of ions held in separate traps. A common method of remote entanglement generation involves combining single photons emitted by "ancilla" ions in separate traps onto a beamsplitter and measuring the output of that beamsplitter. During the process of REG, ancilla ions are typically kept in the g-type space and emit many photons, only a small fraction of which can be typically collected and used in the beamsplitter interference protocol mentioned above. The remainder of these photons are scattered in all directions and can be reabsorbed by neighboring quantum data ions that are also in the g-type space. If these neighboring data ions have quantum information in them (as would be the case for REG attempted in the middle of a quantum algorithm as might often be desirable), this information will be lost. If all ions are in the g-type space (which is the standard approach), REG cannot be carried out without suffering decoherence or without keeping the ancilla ions very far away from the data ions (the latter of which is not practical or desirable in many situations). The use of dual-species trapped-ion systems, where ancillas and data ions are different species, also mitigates this problem and allows ions to stay close to one another. However, the disadvantages of dual-species operation have already been elucidated earlier. In mid-circuit REG using dual-species, entangling (two-qubit) gates would be required to distribute the quantum information around the quantum register, and such dual-species gates typically have worse fidelity than single-species entangling gates.

There are various advantages to the approach described herein in connection with mid-circuit remote entanglement generation. For example, it is possible to protect the neighboring ions in the m-type space during REG, as the m-type ions cannot absorb photons emitted from g-type ions. As a result, REG can be performed in the middle of a quantum circuit using REG ancilla ions without causing decoherence of nearby quantum data ions. Furthermore, in our approach, only a single species ion is used, so entangling gates between data and ancilla ions will typically be higher fidelity.

Advantages of Dual Spaces Over Dual Species

The advantages of dual spaces over dual species are described, at least partially, in connection with FIG. 1. For example, using the dual-space approach, m-type qubits are protected from stray control or scattered light in entropic operations (e.g., sympathetic Doppler, EIT cooling, REG) in neighbors. The dual-space approach enables mid-circuit cooling, calibration, readout, REG. The use of one species means fewer lasers and optical paths, standard, efficient sympathetic cooling, more straightforward shuttling, chain reordering accomplished via HSS (dynamic reconfigurability of the chain with lasers), and RE distribution accomplished via HSS and not a mixed-species two-qubit (2q) gate.

Two Classes of Features: Class I-Qubits Plus Coolant/Calibration Ions

Figure 2:
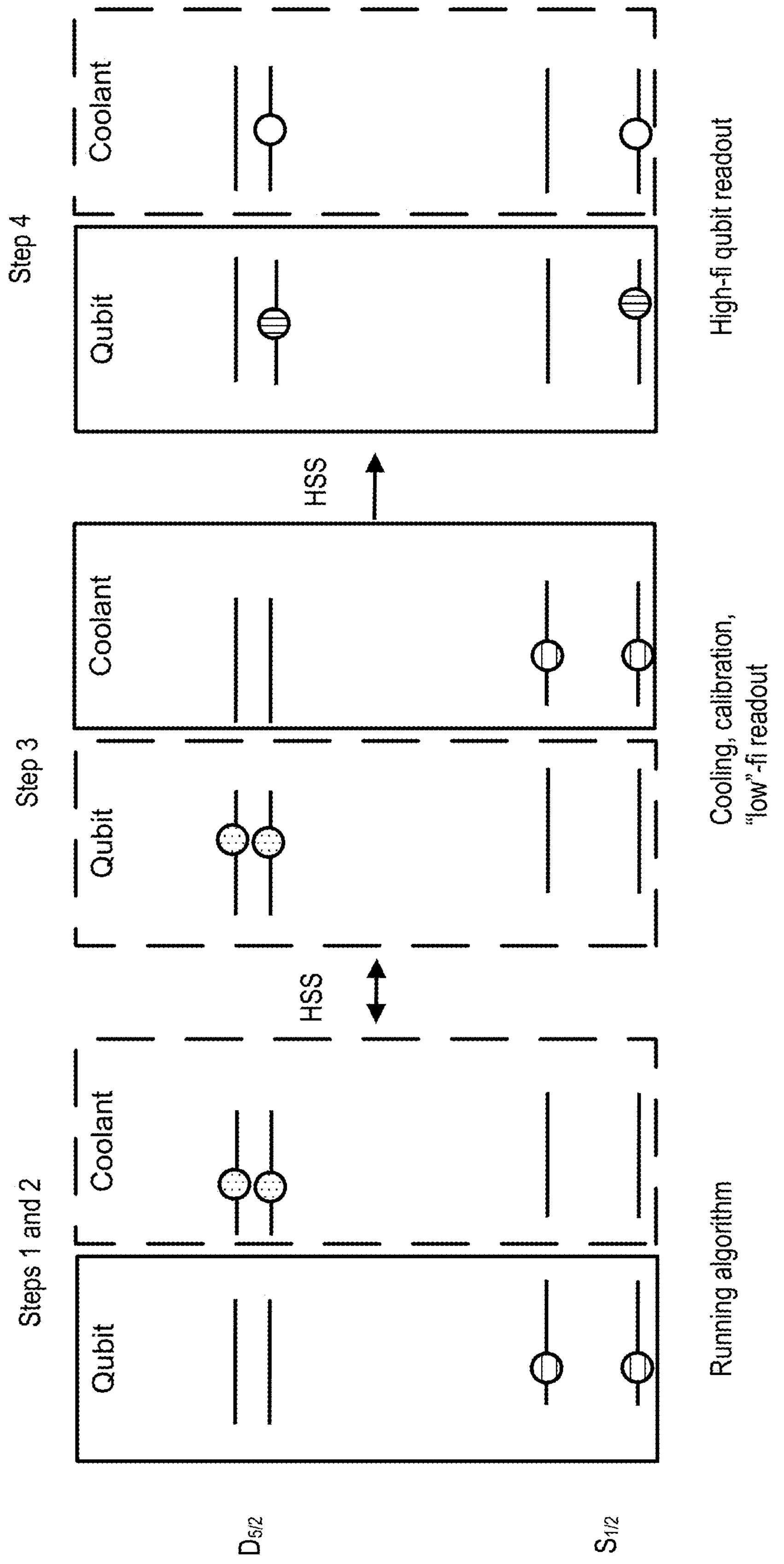
FIG. 2 illustrates a first class of features related to qubits plus coolant/calibration ions in connection with aspects of this disclosure.

The first class of features, CLASS I, is described in connection with FIG. 2. In connection with CLASS I the following scheme can be performed (as illustrated in FIG. 2):

(1) Initialize: Separate qubits and coolant ions into g (e.g., $S_{1/2}$ in $^{133}Ba^{+}$) and m (e.g., $D_{5/2}$) manifolds. Transfer only coolant ions to m manifold.

(2) Perform part of algorithm on g-type qubits.

(3) Mid-algorithm, flip-flop (HSS) all ions between g and m manifolds, with qubits and coolant ions in opposite manifolds at all times. The g-type has Raman, laser cooling, low-fidelity readout, pumping. The m-type has storage. Repeat 2-3 until the algorithm completes.

(4) Transfer qubits to o-type for high-fidelity readout.

The use of CLASS I enables: (1) Sympathetic cooling of any flavor with perfect mass-matching, coolant ion placement reconfigurable on a per-circuit basis without physical shuttling, and (2) mid-circuit calibration routines on coolant ions that have hyperfine qubit states identical to those of the qubits.

Two Classes of Features: Class II-Qubits Plus Ancillas Plus Coolant Ions

Figure 3:
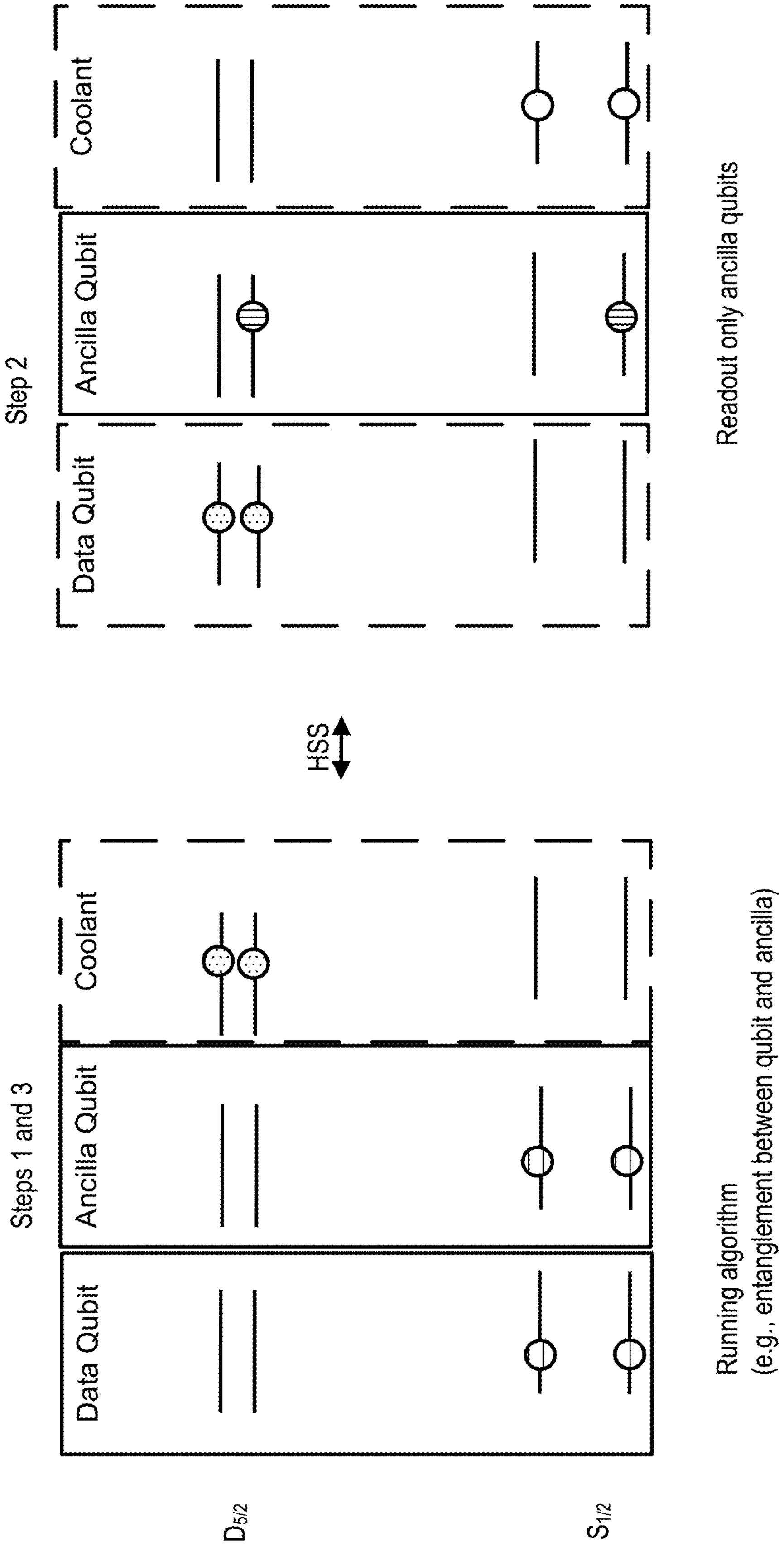
FIG. 3 illustrates a second class of features related to qubits plus ancillas plus coolant ions in connection with aspects of this disclosure.

The second class of features, CLASS II, is described in connection with FIG. 3. In connection with CLASS II the following scheme can be performed (as illustrated in FIG. 3):

(1) Perform partial algorithm with data qubits and ancillas in g-type.

(2) Transfer only ancillas to o-type and data to m-type via HSS and hi-fidelity readout of ancillas.

(3) Move ancilla qubits back to qubit manifold and continue circuit.

(4) Sympathetic cooling/calibration can also be interspersed at any time (See Classes I and II).

CLASS II functions require more HSS than CLASS I, but both need ONLY local g-type Raman and global HSS, cooling, and readout.

The use of CLASS II enables: (1) Mid-circuit partial high-fi readout of quantum register without physical shuttling, and (2) mid-circuit REG without physical shuttling (not depicted).

EXAMPLE—(A) SYMPATHETIC COOLING/CALIBRATION

Figure 4:
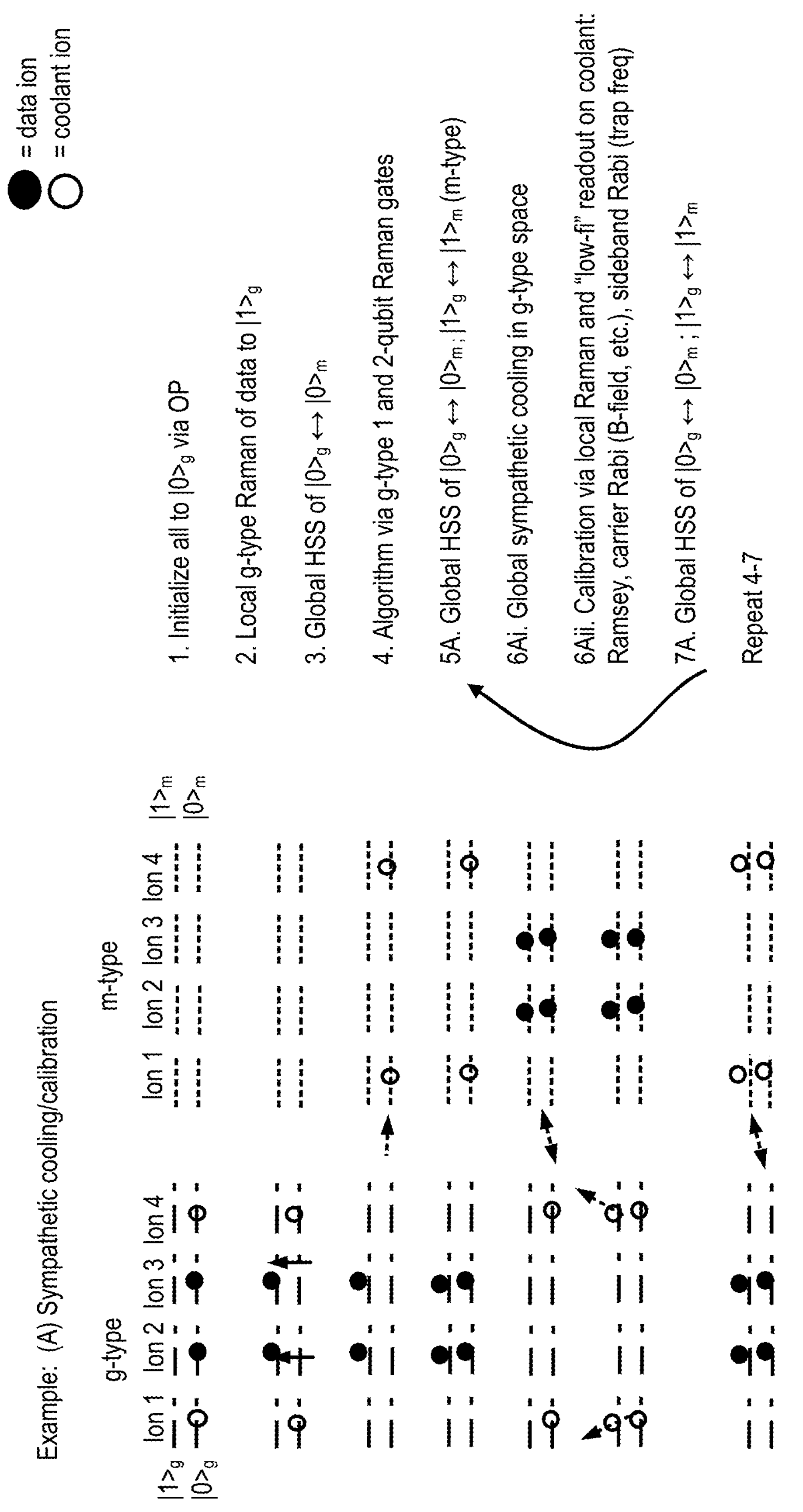
FIG. 4 illustrates an example of sympathetic cooling/calibration in connection with aspects of this disclosure.

An example of sympathetic cooling/calibration is described in connection with FIG. 4. In connection with FIG. 4 the following scheme can be performed (which follows the diagrammatic flow in FIG. 4 from top to bottom):

(1) Initialize all to $|0>_g$ via optical pumping (OP).

(2) Local g-type Raman of data to $|1>_g$.

(3) Global HSS of $|0>_g \leftrightarrow |0>_m$.

(4) Algorithm via g-type 1 and 2-qubit Raman gates.

(5A) Global HSS of $|0>_g \leftrightarrow |0>_m$; $|1>_g \leftrightarrow |1>_m$ (m-type).

(6Ai) Global sympathetic cooling in g-type space.

(6Aii) Calibration via local Raman and "low-fi" or low-fidelity readout on coolant: Ramsey, carrier Rabi (B-field, etc.), sideband Rabi (trap frequency).

(7A) Global HSS of $|0>_g \leftrightarrow |0>_m$; $|1>_g \leftrightarrow |1>_m$.

Repeat 4-7.

EXAMPLE—(A—ALTERNATIVE) SYMPATHETIC COOLING/CALIBRATION

An example of an alternative sympathetic cooling/calibration requiring HSS beam with only m-type splitting is described in connection with FIG. 5. In connection with FIG. 5 the following scheme can be performed (which follows the diagrammatic flow in FIG. 5 from top to bottom):

(1) Initialize all to $|0>_g$ via OP.

(2) Local g-type Raman of data to $|1>_g$.

(3) Global HSS of $|0>_g \leftrightarrow |0>_m$.

(4) Algorithm via g-type 1 and 2-qubit Raman gates.

(5A) Global HSS of $|0>_g \leftrightarrow |0>_m$ (o-type).

(6A) Local OR global g-type Raman of all ions; since global is OK, this could be u-wave driven.

(7A) Global HSS of $|0\rangle_g \leftrightarrow |1\rangle_m$ (m-type).
(8Ai/ii) Global sympathetic cooling in g-type space/cal.
(9A) Reverse steps 7A-5A.

EXAMPLE—(B) ANCILLA READOUT

Figure 6:
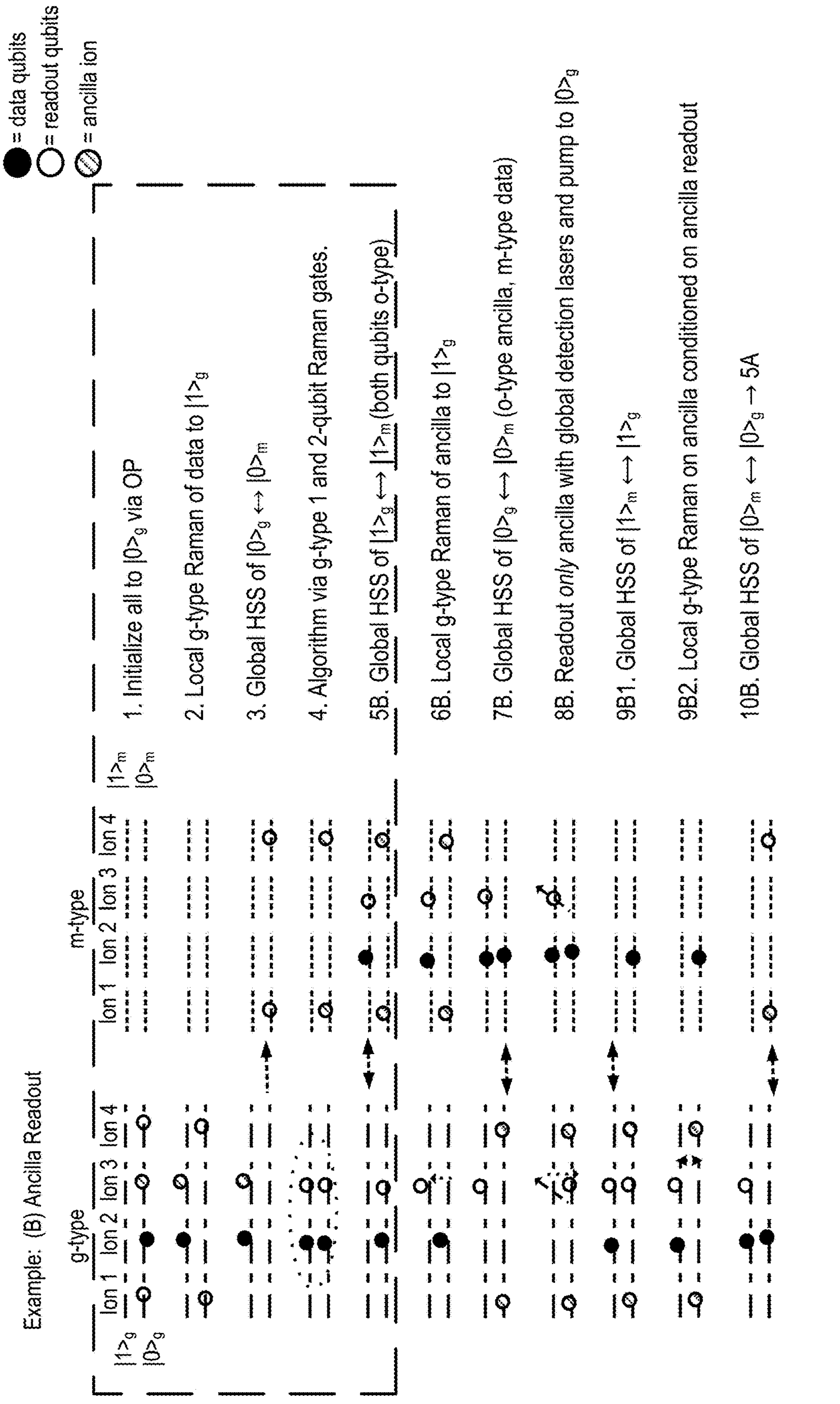
FIG. 6 illustrates an example of an ancilla readout in connection with aspects of this disclosure.

An example of an ancilla readout is described in connection with FIG. 6. In connection with FIG. 6 the following scheme can be performed (which follows the diagrammatic flow in FIG. 6 from top to bottom):

(1) Initialize all to $|0\rangle_g$ via OP.
(2) Local g-type Raman of data to $|1\rangle_g$.
(3) Global HSS of $|0\rangle_g \leftrightarrow |0\rangle_m$.
(4) Algorithm via g-type 1 and 2-qubit Raman gates.
(5B) Global HSS of $|1\rangle_g \leftrightarrow |1\rangle_m$ (both qubits o-type).
(6B) Local g-type Raman of ancilla to $|1\rangle_g$.
(7B) Global HSS of $|0\rangle_g \leftrightarrow |0\rangle_m$ (o-type ancilla, m-type data).
(8B) Readout only ancilla with global detection lasers and pump to $|0\rangle_g$.
(9B1) Global HSS of $|1\rangle_m \leftrightarrow |1\rangle_g$.
(9B2) Local g-type Raman on ancilla conditioned on ancilla readout.
(10B) Global HSS of $|0\rangle_m \leftrightarrow |0\rangle_g \rightarrow$5A.

EXAMPLE—(C) MID-ALGORITHM CALIBRATION VIA ANCILLA

Figure 7:
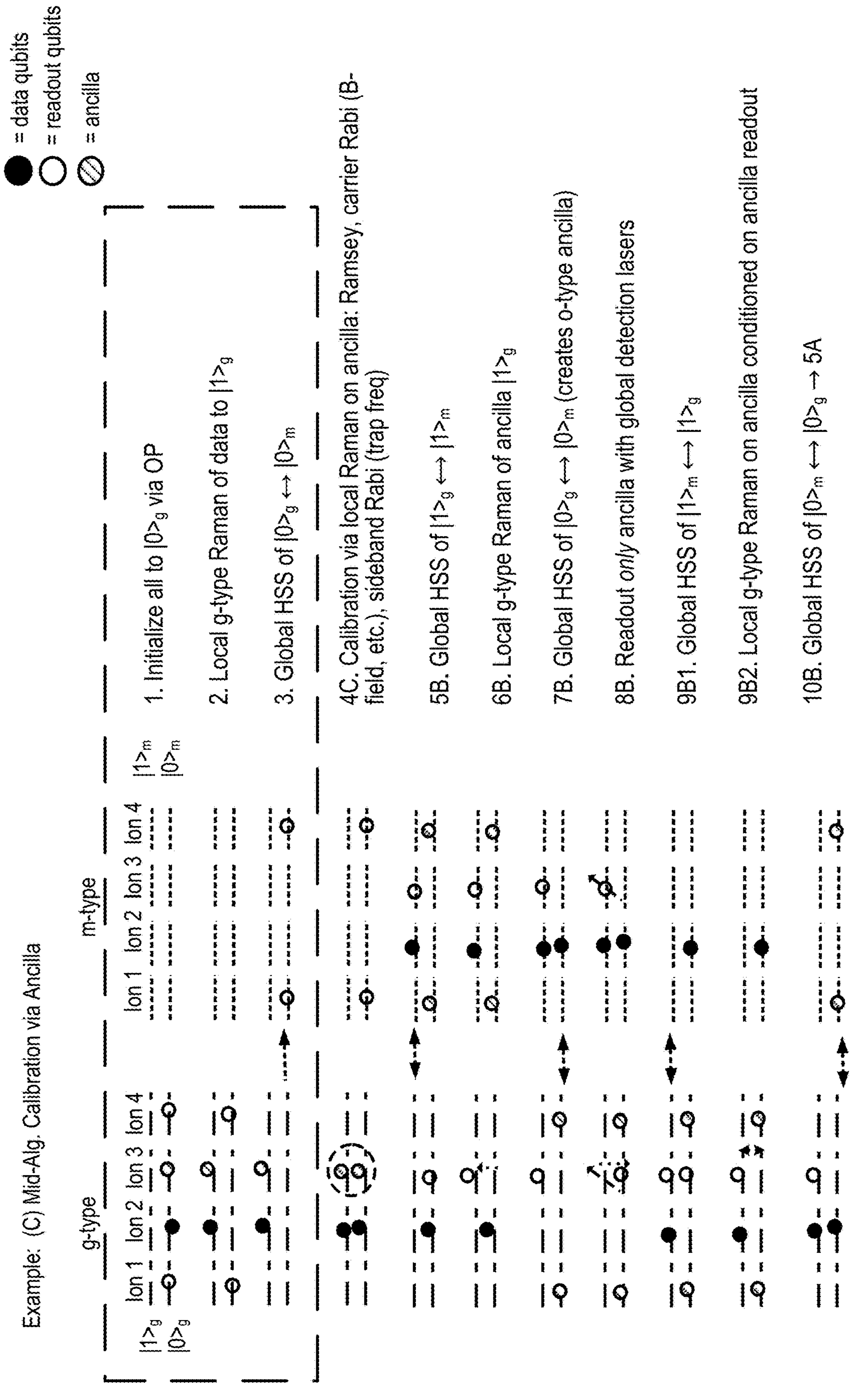
FIG. 7 illustrates an example of mid-algorithm calibration via ancilla readout in connection with aspects of this disclosure.

An example of a mid-algorithm calibration via ancilla is described in connection with FIG. 7. In connection with FIG. 7 the following scheme can be performed (which follows the diagrammatic flow in FIG. 7 from top to bottom):

(1) Initialize all to $|0\rangle_g$ via OP.
(2) Local g-type Raman of data to $|1\rangle_g$.
(3) Global HSS of $|0\rangle_g \leftrightarrow |0\rangle_m$.
(4C) Calibration via local Raman on ancilla: Ramsey, carrier Rabi (B-field, etc.), sideband Rabi (trap frequency).
(5B) Global HSS of $|1\rangle_g \leftrightarrow |1\rangle_m$.
(6B) Local g-type Raman of ancilla $|1\rangle_g$.
(7B) Global HSS of $|0\rangle_g \leftrightarrow |0\rangle_m$ (creates o-type ancilla).
(8B) Readout only ancilla with global detection lasers.
(9B1) Global HSS of $|1\rangle_m \leftrightarrow |1\rangle_g$.
(9B2) Local g-type Raman on ancilla conditioned on ancilla readout.
(10B) Global HSS of $|0\rangle_m \leftrightarrow |0\rangle_g$>5A.

EXAMPLE—(D) REG AND DISTRIBUTION VIA ANCILLA

Figure 8:
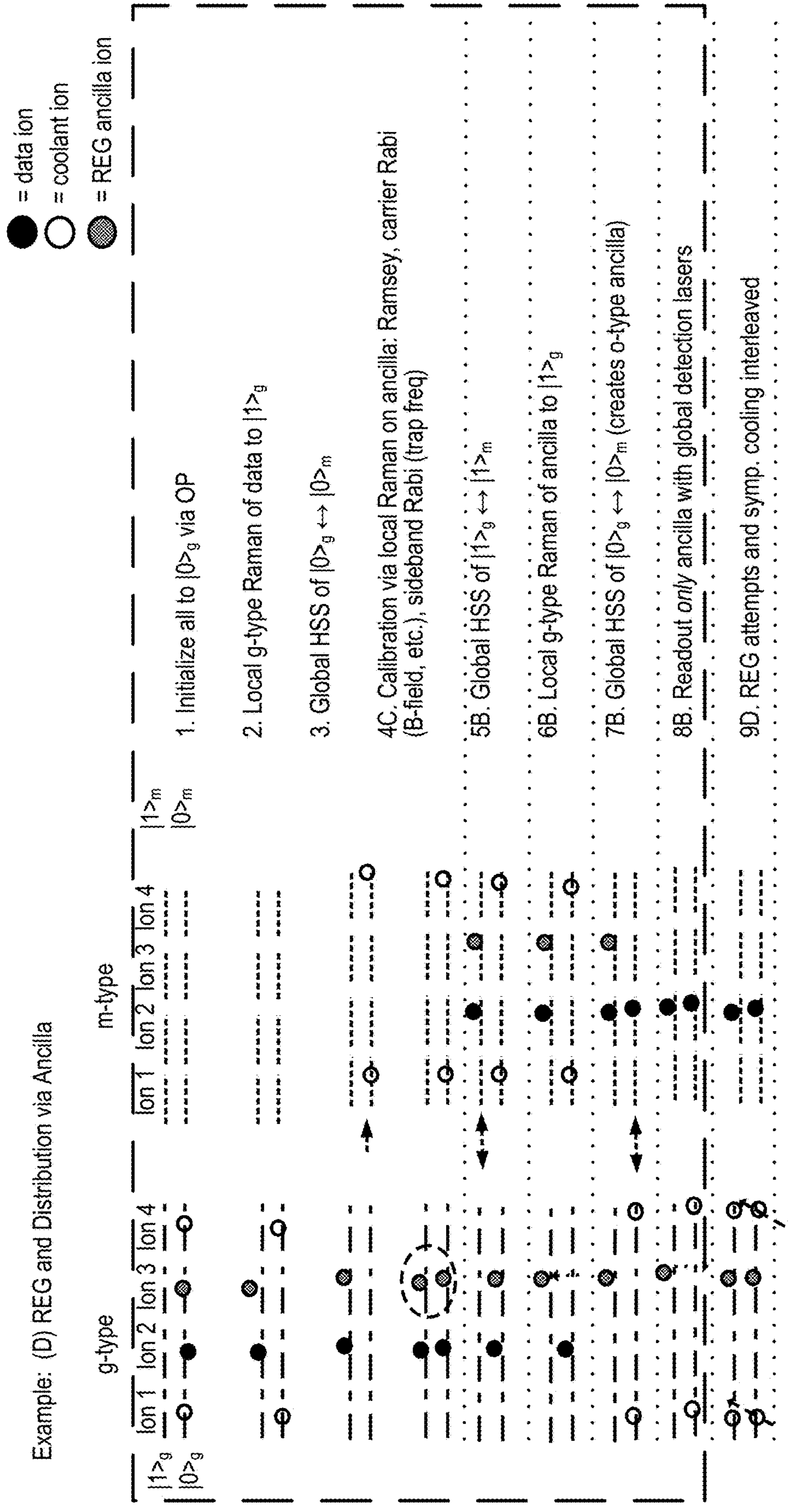

An example of a REG and distribution via ancilla is described in connection with FIGS. 8 and 9. In connection with FIG. 8 the following scheme can be performed (which follows the diagrammatic flow in FIG. 8 from top to bottom):

(1) Initialize all to $10\rangle_g$ via OP.
(2) Local g-type Raman of data to $|1\rangle_g$.
(3) Global HSS of $|0\rangle_g \leftrightarrow |0\rangle_m$.
(4C) Calibration via local Raman on ancilla: Ramsey, carrier Rabi (B-field, etc.), sideband Rabi (trap frequency).
(5B) Global HSS of $|1\rangle_g \leftrightarrow |1\rangle_m$.
(6B) Local g-type Raman of ancilla $|1\rangle_g$.
(7B) Global HSS of $|0\rangle_g \leftrightarrow |0\rangle_m$ (creates o-type ancilla).
(8B) Readout only ancilla with global detection laser.
(9D) REG attempts and sympathetic cooling interleaved.

In connection with FIG. 9 the scheme described above is continued (by following the diagrammatic flow in FIG. 9 from top to bottom):

Step (9D) is now shown at the top and was last step shown in FIG. 9. (9D) REG attempts and sympathetic cooling interleaved.
(10D) Global HSS of $|0\rangle_g \leftrightarrow |0\rangle_m$
(11D) Local g-type Raman on REG ancilla.
(12Di) Global HSS of $|1\rangle_g \leftrightarrow |1\rangle_m$
(12Dii) Global HSS of $|0\rangle_g \leftrightarrow |0\rangle_m$
(13D) Local g-type Raman on REG ancilla.
(14D) Global HSS of $|0\rangle_g \leftrightarrow |0\rangle_m$
(15D) Entanglement distribution in g-type using single species 2q gates.

Hilbert Space Shuttling (HSS)

In connection with HSS, questions may come up about how good the 1762-nm pulses are. Blatt/Home claim fidelities of $5e^{-5}$ in $^{40}Ca^+$ (729 nm) and others have been able to do $\sim 4e^{-4}$ in $^{88}Sr^+$ (674 nm, GST). One aspect includes potentially using composite pulses to improve. Moreover, the 1762 pulse is likely to be better than 674, 729 pulses due to smaller Debye-Waller factors (DWs). But probably may want to use the global 1762 along radial direction to keep DWs low.

Another possible consideration relates to the 1762 pulse phase. The optical phase gets imprinted on the o-type but gets removed when converting back to g-type as long as laser is coherent over o-type dwell time. For the o-type, coherence times of 10-100 milliseconds (ms) are achievable.

For the m-type, only the phase difference between the $|0\rangle_g \leftrightarrow |0\rangle_m$ and $|1\rangle_g \leftrightarrow |1\rangle_m$ beams matters. One approach is to derive both beams from same laser, minimize path length differences.

Another question that may come up is the AC Stark shifts from global 1762 pulses. For the g-type: $\Delta$=10 GHz gives $\delta_{AC}$~25 Hz. For the m-type $\Delta$=80 MHz gives $\delta_{AC}$~3 kHz. Only occurs for F=1 to F'=3 beam (F=0 to F'=3 is quadrupole forbidden). Can potentially use spin echo to cancel, or just keep track of the Zgate rotation Yet another question that may come up is the number of 1762 tones/lasers that may be needed. The scheme described above needs independent 1762 tones separated by ~10 GHz. An example of such implementation is described below. A modified version only requires 1762 tones separated by ~80 MHz mid-circuit REG is given up. However, REG is a longer-term goal with other technical challenges to consider.

M-Type Raman Gates

Figure 10:
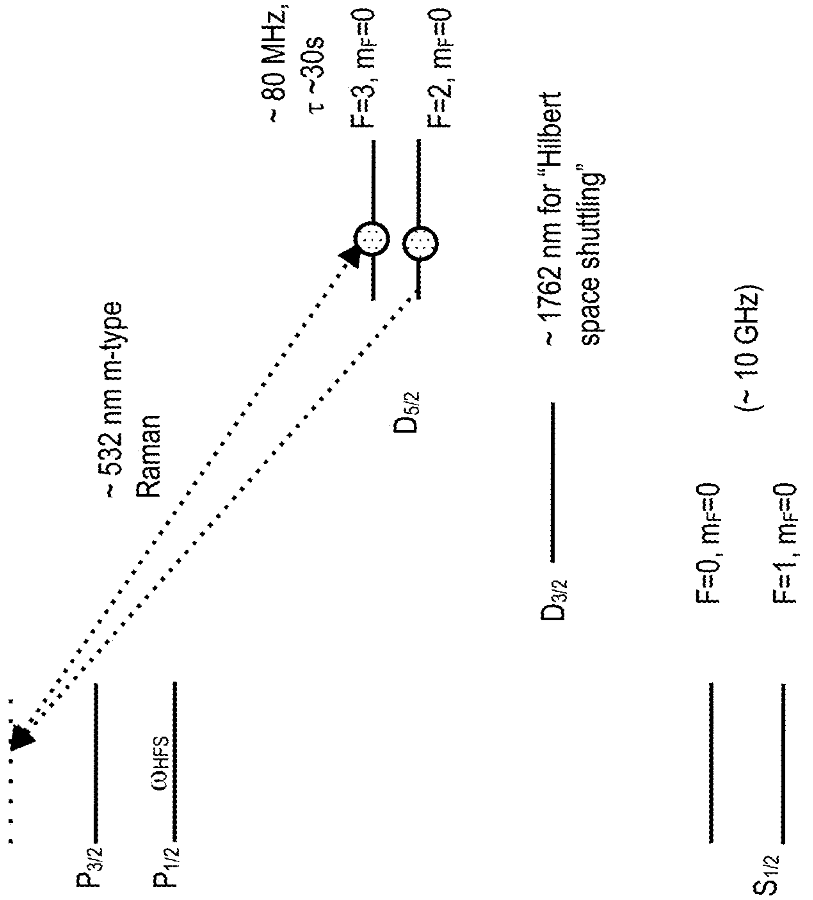
FIG. 10 illustrates an example of m-type Raman gates in connection with aspects of this disclosure.

Other aspects of the present disclosure may include implementing m-type Raman gates. M-type Raman gates may implement the same classes of features as in the g-type Raman scheme as described below. An example of m-type Raman gates is described in connection with FIG. 10. Fundamentally higher-fidelity gates for $^{133}Ba^+$ with Raman laser at 532 nm. $D_{5/2}$ only couples to $P_{3/2}$ so it is possible to get 1/$\Delta$ Rabi rate even for $\Delta \gg \omega_{HFS}$. Wins the war against spontaneous emission ($\sim 1/\Delta^2$)$\rightarrow$~5× error reduction.

This approach is technically simpler, with straightforward CW Raman if desired. CW Raman also can be used for g-type Raman. Can use AOM instead of EOM to span qubit frequency.

In addition, circuit performance is largely insensitive to imperfect HSS. The need for HSS transfers during the computation is either reduced (Class II functions) or eliminated altogether (Class I functions), which significantly reduces the impact of imperfect HSS transfer on the computation fidelity.

Figure 11:
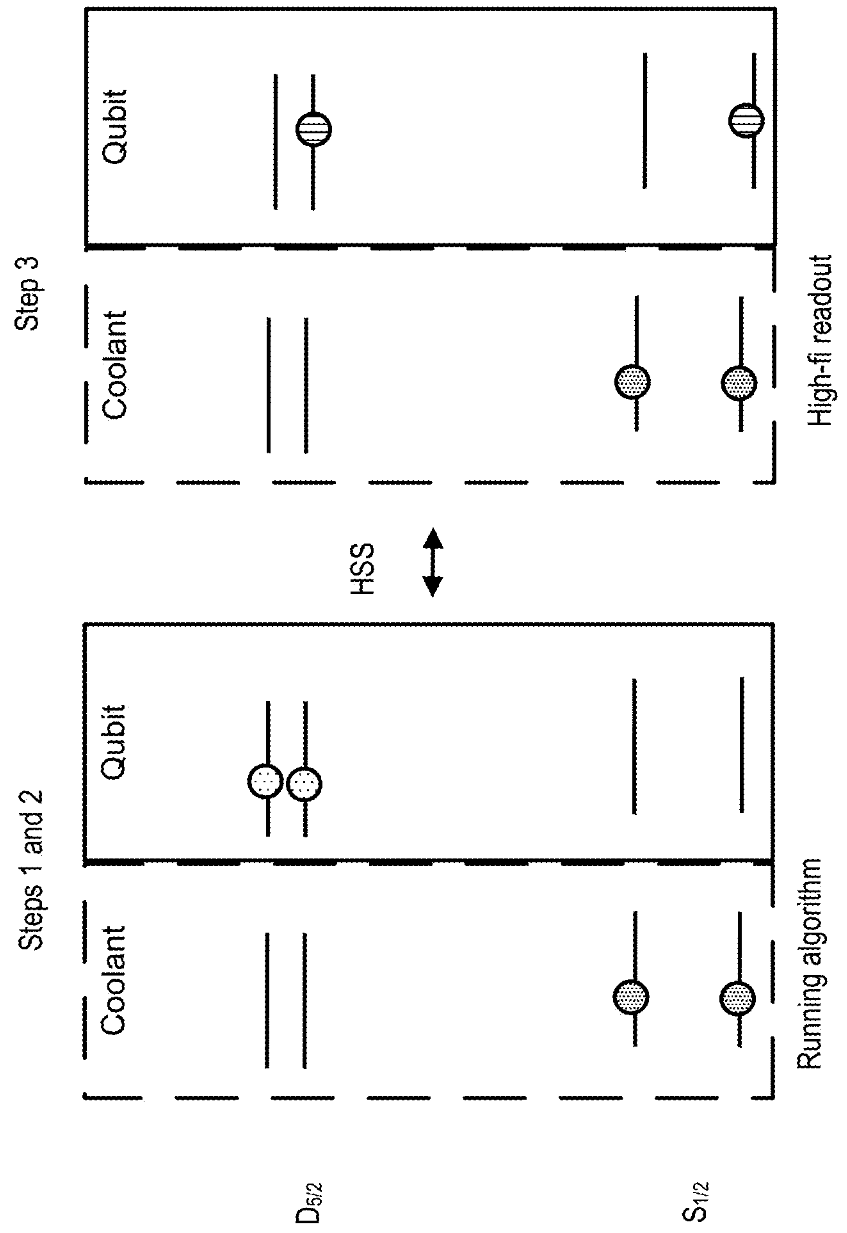
FIG. 11 illustrates a first class of features with m-type Raman related to qubits plus coolant/calibration ions in connection with aspects of this disclosure.

Two Classes of Features with M-Type Raman: Class I-Qubits Plus Coolant/Calibration Ions The first class of features with m-type Raman, CLASS I, is described in connection with FIG. 11 shown below. In connection with CLASS I the following scheme can be performed (as illustrated in FIG. 11):

(1) Initialize: Separate qubits and coolant ions into g ($S_{1/2}$) and m ($D_{5/2}$) manifolds with global HSS. Transfer only qubit ions to m manifold.

(2) Run circuit in m manifold (now has Raman) while interspersing cooling/calibration with ions in g manifold (has Raman, EIT cooling, readout, pumping). No HSS required during circuit/cooling/calibration.

(3) Transfer one qubit state to o-type for high-fidelity readout of qubits with global HSS.

The use of CLASS I enables (without HSS during circuit/cooling/calibration): (1) Sympathetic cooling of any flavor with perfect mass-matching, coolant ion placement reconfigurable on a per-circuit basis without physical shuttling, and (2) Mid-circuit calibration routines on coolant ions that have hyperfine qubit states identical to those of the qubits. The use of CLASS I requires only $|0>_g \leftrightarrow |0>_m$ transitions for HSS, no m-type AC Stark shifts. Also, it requires only m-type Raman, not g-type.

Figure 12:
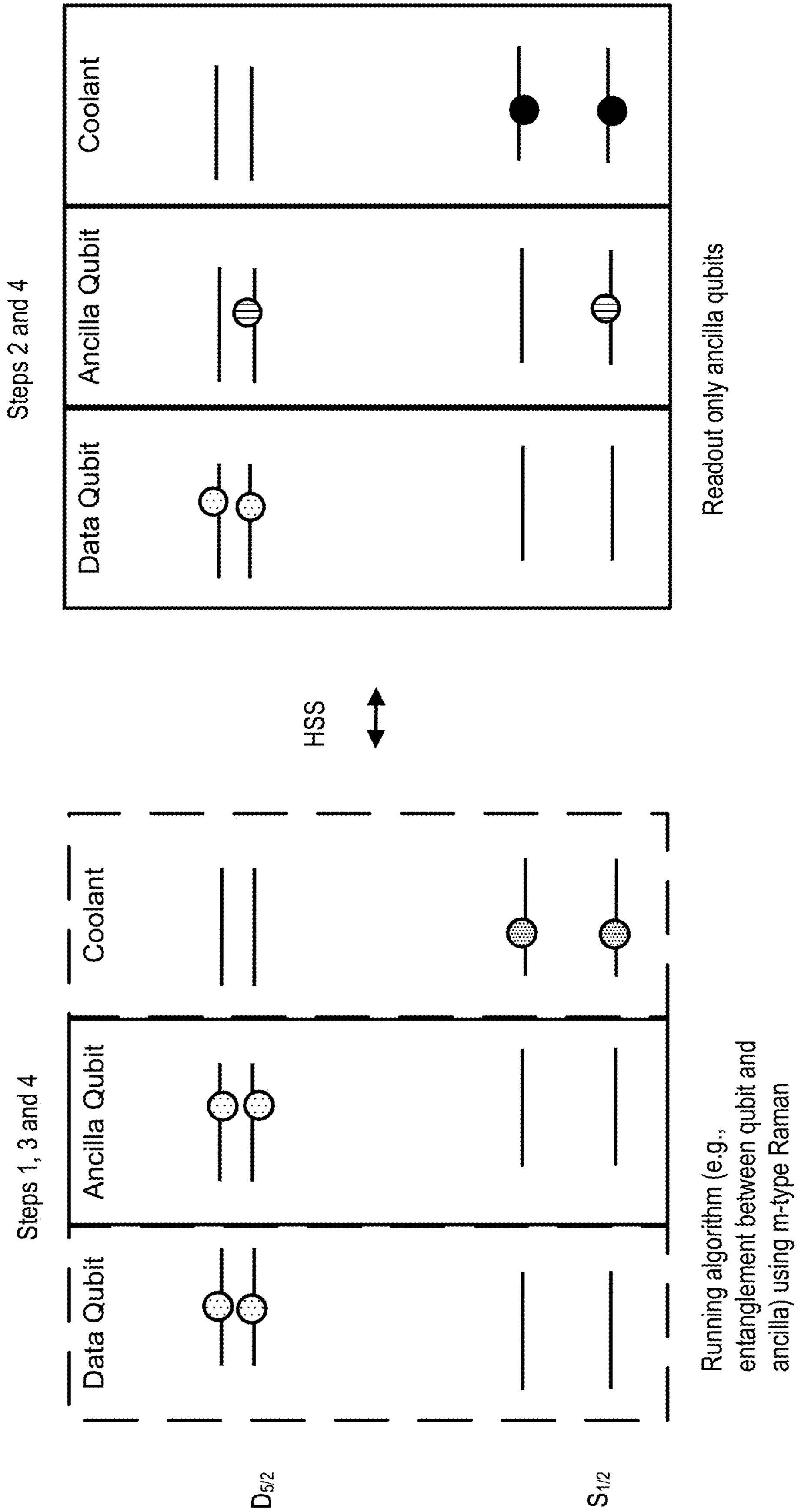
FIG. 12 illustrates a second class of features with m-type Raman related to qubits plus ancillas plus coolant ions in connection with aspects of this disclosure.

Two Classes of Features with M-Type Raman: Class II-Qubits Plus Ancillae Plus Coolant Ions The second class of features with m-type Raman, CLASS II, is described in connection with FIG. 12. In connection with CLASS II the following scheme can be performed (as illustrated in FIG. 12):

(1) Perform partial algorithm with data qubits and ancillas in m-type.

(2) Transfer only ancillas to o-type and data to m-type via HSS and hi-fi readout of ancillas.

(3) Move ancilla qubits back to qubit manifold and continue circuit.

(4) Sympathetic cooling/calibration can also be interspersed at any time (Class A is a subset of B).

As before, Class II functions require more HSS than Class I, but both need ONLY local m- and g-type Raman and global HSS, cooling, and readout.

The use of CLASS II enables: (1) Mid-circuit partial readout of quantum register without physical shuttling, and (2) mid-circuit REG without physical shuttling.

Scheme for Nulling HSS Laser Phase Noise by Driving Both HSS Transitions Simultaneously (Class I Functions)

One source of error in this approach can be phase noise in the laser used to drive the HSS transition. This noise is technical but intrinsic; it can be reduced by locking the laser phase to a suitably stable reference, but it cannot be completely eliminated. In particular, this laser phase noise might impart phase noise onto our qubits every time a swap of the ancilla and qubit ions between the g and m manifolds takes place. For example, by driving the $|0>_g$ to $|0>_m$ HSS transition followed sequentially by the $|1>_g$ to $|1>_m$ transition (or vice versa), then any drift in the laser phase between the times of these two transitions is imprinted into a relative phase between $|0>_m$ and $|1>_m$, which enters into and degrades the fidelity of the calculation.

In other words, in performing the two HSS transitions sequentially, there is a brief storage of the qubit information in the optical qubit, when the qubit is divided between the g and m manifolds. During this time, any drift between the phases of the optical qubit and laser is imprinted on the qubit phase when the transfer is completed to the m manifold.

The techniques described herein can be used as a solution to the problem outlined above. The impact of laser phase noise on the qubit phase can be nulled by driving the $|0>_g$ to $|0>_m$ and $|1>_g$ to $|1>_m$ transitions simultaneously. The laser phase at the transition is common to both $|0>_m$ and $|1>_m$ and therefore does not introduce an erroneous phase into the calculation. In other words, the qubit information is at no time stored in the optical qubit, eliminating the opportunity for laser phase noise to be converted into qubit phase error.

If the laser phase noise is sufficiently large, it can cause imperfect transfer (i.e., the population in $|0>_g$ is not fully transferred to $|0>_m$), but, as elucidated elsewhere, this scheme is sufficiently general so as to enable to use BB1 or other pulse sequences, which are designed to optimize transfer even in the presence of experimental imperfections like phase noise. Further, an error of imperfect transfer, unlike an error of laser phase being imprinted onto the qubit, can be easily detected, in which case it is possible to choose to either reject the calculation result if it is impacted by the error or accept the calculation result if it is not.

This solution is particularly useful for the Class I functions in the scheme that does not use m-state Raman, wherein it always drives the two HSS transitions together in the midst of the calculation (i.e., not during initialization and readout). Therefore, this technique can eliminate the impact of laser phase noise on the qubit phase for algorithms that use only Class I functions.

Scheme for Nulling HSS Laser Phase Noise by Performing an Echo Sequence (Class II Functions)

The technique of driving the $|0>_g$ to $|0>_m$ and $|1>_g$ to $|1>_m$ transitions simultaneously to prevent laser phase noise from being imprinted on the qubit only works when no other operations need to be performed in between these two transitions. This is not the case for Class II transitions. For example, for ancilla readout, one HSS transition (either $|0>_g$ to $|0>_m$ or $|1>_g$ to $|1>_m$) is driven, then select out the ancilla ions to read out by applying a Raman pulse to those ions, and then drive the other HSS transition. Because the Raman transition inevitably has a finite duration, this sequence is susceptible to imprinting laser phase noise onto the qubit phase noise.

In other words, storing the qubit information in an optical qubit for a finite amount of time will be needed, creating the opportunity for laser phase noise to be converted into qubit phase error.

The techniques described herein can be used as a solution to the problem outlined above. For example, a technique called "spin echoing," which is common in the NMR and quantum information communities, can be adapted for use with the scheme/architecture described herein. The basic concept is that the phase noise in the laser is transferred to the qubit when the qubit information is imprinted on the optical qubit during the Raman pulse. To "echo out" this phase error, an echo pulse is applied to the optical qubit after the Raman pulse by driving the $|0>_g$ to $|0>_m$ and $|1>_g$ to $|1>_m$ transitions simultaneously, which has the effect of flipping the optical qubit. This causes the laser phase noise to be imprinted on the optical qubit with the opposite sign. There is a wait after the echo pulse for a period of time equal to the duration of the Raman pulse before completing the transition to the m manifold, so the errors imprinted before and after the echo pulse cancel each other. If the rate at which the laser phase drifts is constant, then this cancellation can, in principle, be perfect. This echo technique therefore eliminates the OMG scheme's susceptibility to a laser phase that drifts at a constant rate, rendering the scheme instead susceptible only to the change in the rate at which the laser phase drifts over the course of the echo sequence.

An additional level of echoing can be applied to further reduce the OMG's scheme's susceptibility to laser phase noise over the course of performing a Class II function. In the case of mid-circuit ancilla readout, it is possible to echo the phase noise as described above while separating out the readout ancillae from the other qubits. We also Aspects of the present disclosure may also include reversing this operation after performing the readout in order to fold the readout ancillae back into the qubit register. By applying additional echo pulses to this second operation, it is possible to null the scheme's susceptibility not only to a laser phase that drifts at a constant rate but also to a laser phase that drifts at a rate that is itself changing at a constant rate over the course of the entire readout operation. Essentially, the sequence of HSS transitions is driven in such a way that if, for example, the optical qubit acquired phase noise with a positive sign followed by a negative sign for the initial ancillae-separation sequence, it acquires phase error with a negative sign followed by a positive sign for the ancillae-refolding sequence. Therefore, not only are the ancillae-separation and ancillae-refolding sequences themselves individually echoed to cancel phase error acquired within each sequence, but they are constructed in such a way that the phase noise acquired during the ancillae-refolding sequence cancels that acquired during the ancillae-separation sequence.

Figure 13:
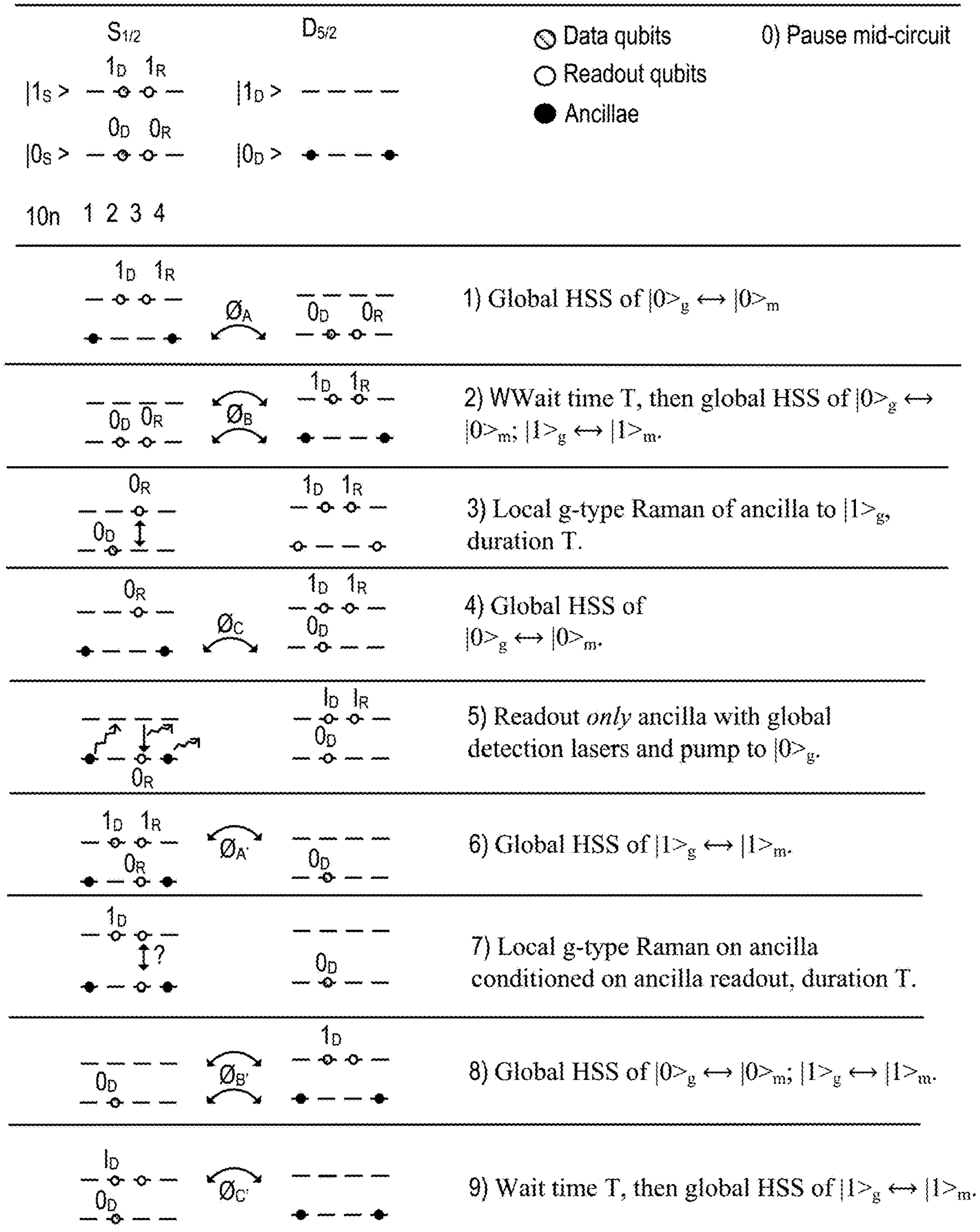
FIG. 13 illustrates an example of scheme for performing an echo sequence according to aspects of the present disclosure

FIG. 13 illustrates an example of scheme for performing an echo sequence according to aspects of the present disclosure. Specifically, FIG. 13 may illustrate an example of in-circuit, echoed partial readout without shuttling or D-state Raman. In connection with FIG. 13 the following scheme may be performed (which follows the diagrammatic flow in FIG. 13 from top to bottom):

1) Global HSS of $|0\rangle_g \leftrightarrow |0\rangle_m$.
2) Wait time T, then global HSS of $|0\rangle_g \leftrightarrow |0\rangle_m$; $|1\rangle_g \leftrightarrow |1\rangle_m$.
3) Local g-type Raman of ancilla to $|1\rangle_g$, duration T.
4) Global HSS of $|0\rangle_g \leftrightarrow |0\rangle_m$.
5) Readout only ancilla with global detection lasers and pump to $|0\rangle_g$.
6) Global HSS of $|1\rangle_g \leftrightarrow |1\rangle_m$.
7) Local g-type Raman on ancilla conditioned on ancilla readout, duration T.
8) Global HSS of $|0\rangle_g \leftrightarrow |0\rangle_m$; $|1\rangle_g \leftrightarrow |1\rangle_m$.
9) Wait time T, then global HSS of $|1\rangle_g \leftrightarrow |1\rangle_m$.

Figure 14:
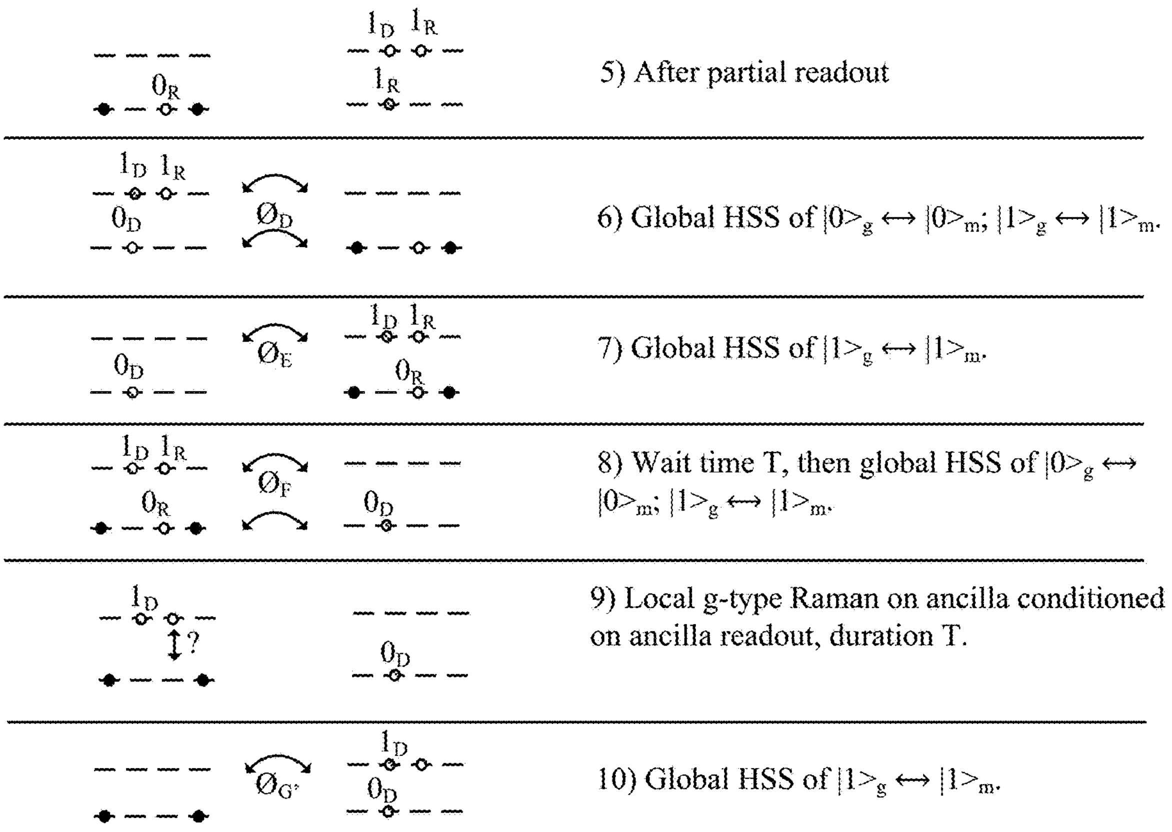
FIG. 14 illustrates an example of an alternative scheme for performing a double echoed sequence according to aspects of the present disclosure.

FIG. 14 illustrates an example of an alternative scheme for performing a double echoed sequence according to aspects of the present disclosure. The scheme may continue after step 4 of the scheme shown in FIG. 13. In connection with FIG. 14 the following scheme may be performed (which follows the diagrammatic flow in FIG. 14 from top to bottom):

5) After partial readout.
6) Global HSS of $|0\rangle_g \leftrightarrow |0\rangle_m$; $|1\rangle_g \leftrightarrow |1\rangle_m$.
7) Global HSS of $|1\rangle_g \leftrightarrow |1\rangle_m$.
8) Wait time T, then global HSS of $|0\rangle_g \leftrightarrow |0\rangle_m$; $|1\rangle_g \leftrightarrow |1\rangle_m$.

9) Local g-type Raman on ancilla conditioned on ancilla readout, duration T.
10) Global HSS of $|1\rangle_g \leftrightarrow |1\rangle_m$.

Schemes for Lock-and-Key Clock Pulses for DSSS Architecture

In the implementation of the DSSS architecture, there is a class of features that may require separating a set of ancillae qubits out of the qubit register, performing an operation on them, and then folding them back into the register. These operations include reading out the states of the ancillae qubits and using the ancillae qubits to generate remote entanglement between distant qubit registers.

As described above, the processes of separating out the ancillae and then folding them back into the register may require us to apply a sequence of global clock pulses, Raman pulses on the ancillae only (and not the other qubits, such as the data qubits), and/or then more global clock pulses. If the global clock pulses and individual Raman pulses are applied separately and in sequence, then there may be periods of time when both the ancilla and data qubits are stored as optical qubits, with parts of their population in the ground and metastable manifolds. As a result, any optical phase noise on the clock laser during these periods may be imprinted as either phase or population error on the data qubits, which may be undesirable. Some aspects include using a series of additional wait times and clock pulses to echo out the impact of optical phase noise to successive orders. However, these additional waits and clock pulses may slow the computation and/or introduce more opportunities for errors to occur. Therefore, improvements may be desirable.

An aspect of the present disclosure is to devise a method to separate out the ancilla qubits without the need to transfer portions of the population of the data qubits between the ground and metastable manifolds. For example, one aspect of the present disclosure includes applying the global clock and individual Raman pulses contemporaneously, with the clock pulses designed to suppress driving the clock transition except in ions that are also being addressed by a Raman beam. Here, the clock transition may be "locked" but can be driven by using the Raman beam as the "key."

Figure 15:
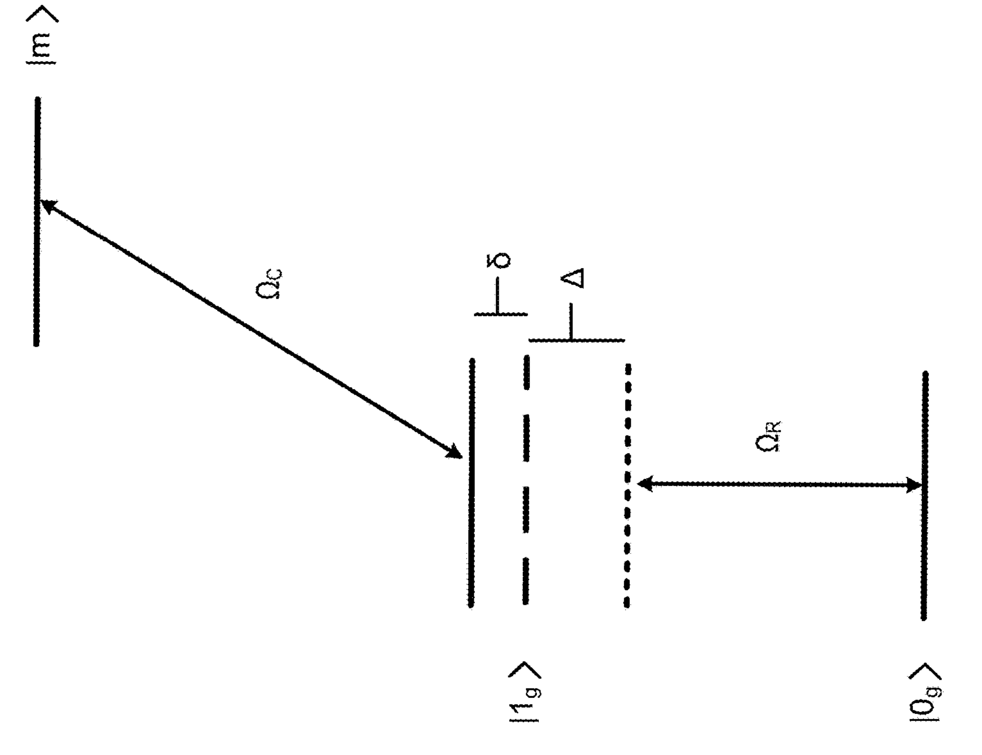
FIG. 15 illustrates an example of a first lock and key scheme according to aspects of the present disclosure.

Turning to FIG. 15, a first aspect of the present disclosure may include selectively driving a narrow optical transition in ions or trapped atoms by using an individually-addressed beam to apply a Stark shift to the specific ions or trapped atoms, which may bring them into resonance with a narrow optical transition that is driven by a global beam. Specifically, the Stark shift scheme discusses herein may include using a detuned Raman beam to cause a Stark shift in the $|1\rangle_g$) state from the unshifted energy (dashed line in FIG. 15). For example, aspects of the present disclosure start with both the data and ancilla qubits shelved in the metastable manifold, and the transfer of the population of the ancilla qubits only from the metastable state $|m\rangle$ to one of the ground qubit states. In this technique, the Raman beam may be detuned away from the transition between the ground qubit states $|0_g\rangle$ and $|1_g\rangle$ by a frequency Δ. This may have the effect of applying a Stark shift δ to the $|1_g\rangle$ state, which is given by $$\delta = -\Omega_R^2/\Delta, \qquad (1)$$

where $\Omega_R$ is the Raman Rabi frequency. Next, the clock laser is detuned, which couples the metastable state |m> with the Stark-shifted state $|1_g>$ to match. The clock transition is then driven at its Rabi rate Qc in the ion that is addressed by the Raman beam, but the off-resonant transition may be suppressed in the other ions to which a Stark shift is not applied.

In some aspects, there may be a probability of $$\varepsilon \sim (\Omega_C/\delta)^2 \quad (2)$$

that the data qubits are erroneously transferred to $|1_g>$. It may be desirable to increase δ to as large as possible by raising the Raman Rabi frequency $\Omega_R$ while lowering the Raman detuning Δ. However, this may be limited by a limitation of not actually driving the Raman transition while attempting to drive the clock transition. If the ratio $(\Omega_R/\Delta)^2$ is not sufficiently small, an aspect may include transferring the population from $|1_g>$ to $|0_g>$ while transferring the population from |m> to $|1_g>$. The dynamics of this three-level system may be more complex, and it may be difficult to find a region in parameter space that satisfies the simultaneous criteria for driving the clock transition in the ancilla qubits and not driving the clock transition in the data qubits with very high fidelities.

However, the DSSS architecture is relatively forgiving of the error where population is transferred from |m> to $|0_g>$ instead of $|1_g>$. If this error occurs as we are separating out the ancilla qubit from the register prior to performing partial readout or REG, then it is immaterial whether the ancilla qubit ends up in $|0_g>$ or $|1_g>$ because the next step is to either perform a projective readout of whether the ancilla qubit is in the ground manifold or initialize the ancilla qubit in order to generate remote entanglement, both of which are insensitive to which S-manifold qubit state the ancilla is in.

If, on other hand, this error occurs as we are folding the ancilla qubit back into the register, then having the ancilla end up in $|0_g>$ instead of $|1_g>$ does represent an error. However, this error can be detected by performing a projective readout that determines which ions are in the ground manifold while the data qubits are shelved in the metastable manifold. This concept is expanded upon elsewhere, but this technique would enable us to detect a failure in the transition technique we describe here. Upon detecting this failure, we could disregard the result of the run on which the failure occurred. Alternatively, we could correct the failure in real time by reinitializing the ancilla qubit or regenerating remote entanglement and then attempting to fold the ancilla qubit into the register again.

Figure 16:
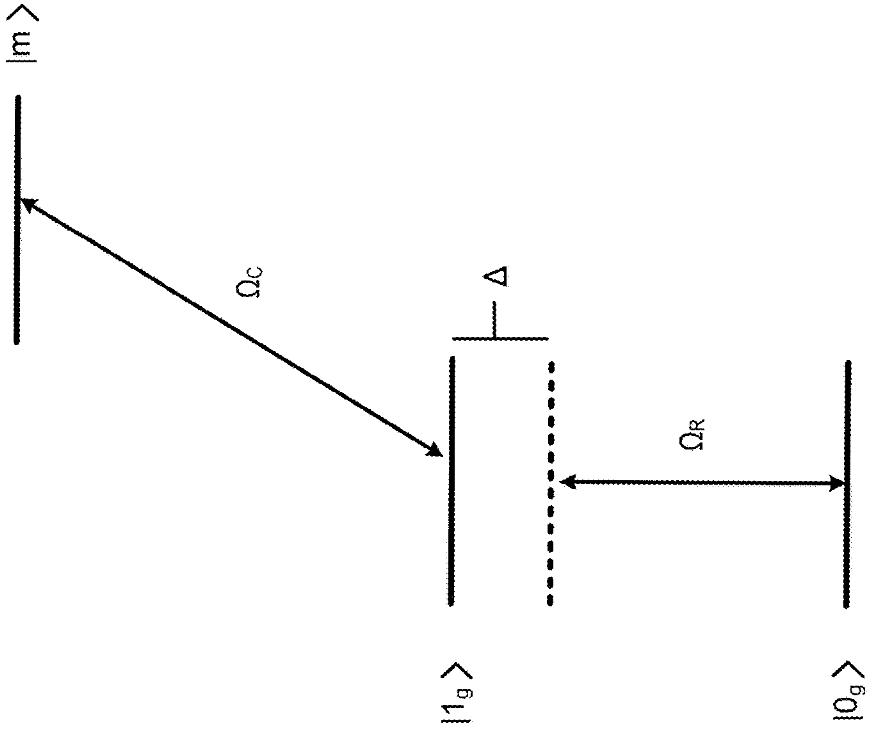
FIG. 16 illustrates an example of a second lock and key scheme according to aspects of the present disclosure.

Turning to FIG. 16, a second aspect of the present disclosure may include a three-photon scheme where the Raman and clock beams are both detuned by A and the population may be transferred directly from |m> to $|0_g>$, where the signs of A for the Raman and clock beams are selected so that the Raman and clock beams together are resonant with the frequency difference between |m> and $|0_g>$. An aspect of the present disclosure may include taking advantage of the three-level nature of the $|0_g>$-$|1_g>$-|m> system. In this method, both the Raman and clock beams may be detuned by the same frequency Δ, which is larger than $\Omega_R$ and $\Omega_C$. In this regime, the population may be transferred directly from |m> to $|0_g>$ at a rate of $$\Omega_{m0} = \Omega_R * \Omega_C/\Delta. \quad (3)$$

Aspects of the present disclosure may be a three-photon Raman process where one of the two interactions is itself a two-photon Raman process.

In this scheme, the probability of erroneously transferring a data qubit to the ground state is $$\varepsilon \sim (\Omega_C/\Delta)^2. \quad (4)$$

To minimize this error, aspects of the present disclosure include increasing the magnitude of Δ, which may undesirably reduce the transition rate. It may be possible to mitigate this slowdown by increasing $\Omega_R$, but that comes at the cost of degrading the assumption that $|1_g>$ is populated only virtually. As a result, it might be challenging to reduce ε to an acceptable level in the data qubits while transferring the ancilla qubits from |m> to $|0_g>$ with an acceptable fidelity in an acceptable time.

Figure 17:
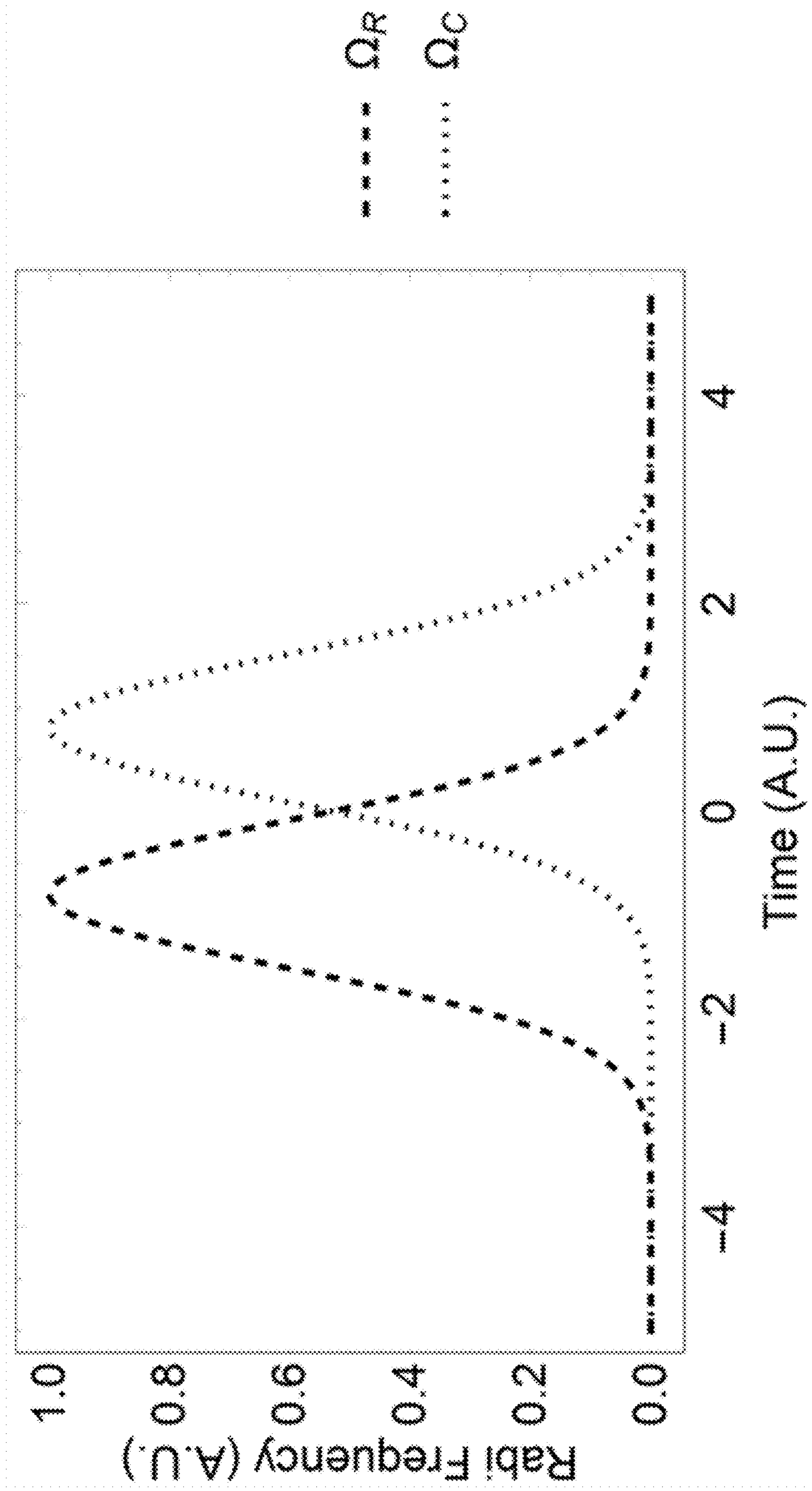
FIG. 17 illustrates examples of trajectories of $\Omega_R$ and $\Omega_C$ according to aspects of the present disclosure.

In a third aspect of the present disclosure, the Raman and clock pulses may be offset in time and have variable intensities. In the second aspect, the Raman and clock pulses may be applied simultaneously with static amplitudes, which results in population oscillating between |m> and $|0_g>$. If the pulses are offset and applied with slowly-varying amplitudes that result in $\Omega_R$ and $\Omega_C$ following trajectories that are similar to those depicted in FIG. 17, then the population may be transferred adiabatically from |m> to $|0_g>$ and no population may be transferred to $|1_g>$. This may be referred to as the stimulated Raman adiabatic passage (STIRAP) process.

In some aspects, both the Raman and clock drives may be detuned away from resonance by a nonzero frequency Δ in order to avoid driving any unwanted clock transitions in the data qubits. The STIRAP process may be the most efficient at Δ=0, so the nonzero detuning may result in a slower transition. In general, the Rabi frequency trajectories may be traversed at a rate that is slower than the Rabi frequencies themselves. Specifically, to drive a faster transition, Δ should be small and both $\Omega_R$ and $\Omega_C$ (at the maximum points of their respective trajectories) should be large, but this may cause larger errors in the form of transferring some proportion of the ancilla qubits to $|1_g>$ rather than $|0_g>$ or driving the clock transition in the data qubits.

A fourth aspect of the present disclosure includes using an echoing technique to coherently cancel erroneous transfer of the data qubits from |m) to the ground state manifold. This cancellation may relax the requirements on $\Omega_R$, $\Omega_C$, and Δ, enabling the optimization for speed and minimizing the unwanted population in $|1_g>$.

Aspects of the present disclosure include the second aspect above, and periodically changing the phase of the optical beam by π and simultaneously change the sign of the detuning Δ that is applied to both the clock and Raman beams. This may reverse any unwanted population transfer in the data qubits. The optical beam may cause a small rotation on the Bloch sphere about an axis that, because $\Delta >> \Omega_C$, may be close to the z axis. Changing both the phase and detuning of the optical beam may invert this rotation axis through the origin, so any small rotation that occurred in the first period may be canceled in the second period.

In certain aspects, this echoing process described above may be performed at a high frequency (e.g., 1, 10, or 100 kilohertz) pursuant to technical limitations and the requirement of applying an even number of segments. This cancellation is susceptible to phase or amplitude noise on the clock beam that is faster than the inverse of the echo period, so echoing faster may enhance the degree of cancellation that can be achieved.

In some aspects, this scheme may have the ancillary benefit of canceling any Stark shift in the data qubits due to off-resonant driving of the specific optical transition we are using. Note that smaller Stark shifts in the data qubits due to other clock transitions may not be canceled, and they may be required to be calibrated and compensated. However, these shifts may be small because those transitions should be several megahertz away relative to a typical Rabi frequency of a few tens of kilohertz.

In some aspects, this echoing does not inhibit transfer of the ancilla qubits from |m> to $|0_g>$ because, with reference to Eq. (3), this echoing process inverts the signs of both $\Omega_C$ and $\Delta$, which together leave the sign of $\Omega_{m0}$ unchanged. The echoing of the clock beam may an odd-parity process that nulls the unwanted transfer of the data qubits due to the clock beam alone, but combining that echoing with the odd-parity process of flipping the detuning of the Raman beam may result in the desired transition from |m> to $|0_g>$ remained allowed.

In a fifth aspect of the present disclosure, the STIRAP procedure described in the third aspect can be echoed in a similar way. If the phase of the clock drive is reversed and the sign of $\Delta$ is changed at a rate is much faster than the rate of change of $\Omega_C$, then the clock transition may be suppressed for the data qubits.

Similar to the fourth aspect above, the Raman drive may be modulated in such a way as to allow the STIRAP transition for the ancilla qubits that are addressed by the Raman beams. STIRAP functions because the Raman and clock interactions together create a dark state $$|D\rangle = (\Omega_C(t)|0_g\rangle - \Omega_R(t)|m\rangle)/(\Omega_C(t)^2 + \Omega_R(t)^2)^{1/2} \quad (5)$$

that evolves in time as $\Omega_R$ and $\Omega_C$ traverse their respective trajectories. If the phases of $\Omega_C$(t) and $\Omega_R$(t) are both changed simultaneously, then the dark state will remain unchanged (other than an irrelevant global phase).

Aspects of the present disclosure includes an advantage such that the echoing, in suppressing the clock transition in the data qubits, relaxes the requirements on $\Omega_C$ and $\Delta$, and enabling the optimization for speed and the minimization of the unwanted population in $|1_g\rangle$.

In some implementations, the aspects described above may be integrated into the DSSS architecture. Any one or more of the described techniques may be extended to enable 1) the simultaneous transfer of multiple ancilla qubits by the simultaneous application of individual Raman beams to each ancilla qubit, 2) the transfer of population from one of the ground states to one metastable state rather vice versa, as is described here, and/or 3) an echoing technique that is implemented by applying two simultaneous, symmetrically detuned tones on both the Raman and clock drives rather than one tone on each whose phase and detuning are periodically inverted.

An aspect of the present disclosure includes one or more of the Lock and Key techniques described above being implemented to the DSSS architecture.

An aspect of the present disclosure includes the aspects above, with two constituent transitions being a Raman transition and narrow optical transition.

An aspect of the present disclosure includes any of the aspects above, further including the fourth aspect and/or the use of an echoing technique to suppress population transfer by the first drive in a lambda system in qubits to which the second drive is not applied.

An aspect of the present disclosure includes any of the aspects above, further including the approach of applying a matching echo to the second drive in a lambda system to enable the composite transition in qubits to which both drives are applied.

An aspect of the present disclosure includes any of the aspects above, further including the STIRAP technique as described in the fifth aspect.

Schemes for High-Fidelity HSS with a Global Beam

A problem that may arise is that for a laser beam of finite size globally addressing a long chain of ions from a direction that is not along the chain axis, there will be a limit to the fidelity of the pi-pulses due to inhomogeneity of the laser intensity over the chain. For example, a 32-ion chain with 3-micron ion spacing; global beam with 85-micron radius centered on chain, propagating normal to the chain axis gives pi-pulse fidelity of only 0.84 for the edge ions (1 and 32) if the laser intensity is chosen to drive a perfect pi-pulse on the center ion.

This disclosure provides two exemplary embodiments (e.g., exemplary schemes or aspects) that address the problem outlined above.

Scheme 1: Make the laser beam larger only in the direction along the chain axis (high-eccentricity elliptical beam). In the example above, make the beam radius 600 microns to get HSS error on outer ions to <1e-4. This will require 2.66× the time for the pi-pulse HSS transfer for the same laser power.

Scheme 2: Use a coherent quantum pulse sequence to minimize pi-pulse infidelity due to inhomogeneous laser intensity. One can use the BB1 sequence (e.g., http://cds.cern.ch/record/599468/files/0301019.pdf for a general outline of BB1) and the same (e.g., 85 micron) beam size (low-eccentricity elliptical beam). This can also achieve <1e-4 HSS errors but would take 1.9× longer than scheme.

Scheme 1 vs Scheme 2: Scheme 2 is better if it is undesirable to have a large beam for optical access reasons. Scheme 1 is better if one wants faster HSS transfer (for fixed laser power) or smaller required laser power (for fixed transfer time). Another advantage of Scheme 1 is that by not requiring BB1, pulse sequences can be used that are optimized for other kinds of transfer errors (e.g., frequency or phase noise).

Laser Scheme for High-Fidelity Dual-Space Operation

A laser scheme for high-fidelity dual-space operation is described in connection with FIG. 18. This laser beam scheme (propagation direction/polarizations/B-field orientation) is very well suited to high-fidelity dual-space operation.

Individual Raman configuration minimizes deleterious AC Stark shifts when using pulsed lasers.

Global HSS is typically driven by an atomic quadrupole transition. The HSS beam orientations shown in FIG. 18 maximize the transition rate. For long-wavelength HSS laser (e.g., 1762 nanometer (nm) for Ba+ ions), the small Lamb-Dicke parameter results in small HSS transfer errors (<1e-4) even for significant thermal population of axial modes (nbar=50) in a 32-ion chain.

The polarization of the HSS beam depends on the specific states in the m-state manifold that are used during the HSS sequence. For clock states (i.e., those with $m_F=0$), a polarization perpendicular to the magnetic field may be utilized to maximize the transition rate. However, there are other states (so-called "first-order field-insensitive" or "FOFI" states) that have nonzero values of $m_F$ but whose relative frequencies are insensitive to magnetic fields to first order. For these states, which have $|m_F|=1$, the transition rate is maximized by setting the polarization to lie in the plane defined by the direction of beam propagation and the magnetic field.

Scheme to Enable Simultaneous Driving of One or Two HSS Transitions Using an AOM and EOM There is a need to implement a technical solution that enables driving either (1) the $|0\rangle_g$ to $|0\rangle_m$ and $|1\rangle_g$ to $|1\rangle_m$ transitions simultaneously or (2) transition individually. Because these transitions can be separated in frequency by many GHz for many ion species, this may be technically challenging.

In an exemplary aspect, this is accomplished by using an electro-optic modulator (EOM) to apply two sets of sidebands so that one sideband from each set addressed each transition. These two sets of sidebands could then be turned on together or individually to drive one or both transitions. However, this would unavoidably divide the optical power between five tones (two in each set of sidebands plus the carrier), which would raise the power that is required from the optical system upstream of the EOM.

Alternatively, this is accomplished in an exemplary aspect by using an acousto-optic modulator (AOM) and EOM in series. The EOM would modulate the laser frequency to address the two transitions, one with the EOM carrier and one with one sideband. This reduces the amount of power that would be wasted since only one set of sidebands would need to be generated. However, since the power in the carrier cannot be nulled, the AOM is needed to modulate the overall power in the beam. For this approach, it would be easy to address both transitions and to address only the transition addressed by the EOM carrier by turning off the EOM sideband, but it would be difficult to address only the transition addressed by the EOM sideband. To accomplish this, the drive frequencies of both the EOM and AOM could be shifted by equal amounts to detune the carrier away from its transition but leave the carrier resonant with its transition. However, in this case, the finite bandwidth of the AOM, which is often limited to a few tens of MHz unless special measures are taken, would force us to balance off-resonant excitation of the unwanted transition versus the speed at which the transition is driven.

A solution to the problem outlined above is to use an AOM and EOM in sequence, as in the second scheme listed above, but with the extension of using independent control of the AOM and EOM phases to cancel excitation of the unwanted transition. The phase of the optical tone corresponding to the EOM carrier is given by the phase of the AOM drive phase alone, but the phase of the optical tone corresponding to the EOM sideband is given by the sum of the phases of the AOM and EOM drive tones. As described elsewhere, the BB1 and related composite pulse sequences consist of a nominal rotation pulse followed by some correction pulses whose rotation angles are fixed but whose phases depend on the nominal rotation angle. Halfway through the nominal rotation pulse, it is possible to change the phases of the AOM and EOM drive tones by pi. This results in the phase of the carrier optical tone changing by pi and the phase of the sideband optical tone changing by 2*pi, which is equivalent to its phase remaining unchanged. Thus, the sideband transition gets a nominal rotation angle of pi, and the carrier transition gets a nominal rotation angle of 0. Then the correction pulses are applied on both transitions, using the same technique with the AOM and EOM phases to give the correction pulses the proper phases for nominal angles of 0 and pi.

This scheme can be extended to the case where the strengths of the two HSS transitions are equal (i.e., the two transitions are driven at equal rates for a given optical power). In this case, the two transitions can be driven with the same set of EOM sidebands, which are intrinsically power-matched. This obviates the need to precisely calibrate the power of the optical powers of the EOM sidebands to match that of the EOM carrier. In this case, the phase of one optical tone is given by the sum of the phases of the AOM and EOM drives, and the phase of the other optical tone is given by their difference. Halfway through the nominal rotation pulse, it is possible to change the phase of the AOM drive by +pi/2 and the phase of the EOM drive by either +pi/2 or −pi/2. This results in the phase of one of the optical tones changing by pi and the phase of the other remaining unchanged. As above, one of the transitions gets a nominal rotation angle of pi, and the other gets a nominal rotation angle of 0. Then the correction pulses are applied on both transitions, again setting the phases of the AOM and EOM drive to give the correction pulses the proper phases for nominal angles of 0 and pi. This technique enables to drive either transition, and it is possible to drive both by not changing the phases of the AOM and EOM drives.

In general, the dual-space, single-species architecture for trapped-ion for quantum information processing described herein is flexible and has several advantages over architectures that rely on dual species. For example, a single chain of ions is reconfigurable as needed without physical shuttling. Also, sympathetic cooling can be perfectly mass-matched. It should be appreciated that the exemplary aspects herein do not require narrow line cooling, which itself may be a risk, and may not get as cold as (electromagnetically-induced-transparency) EIT cooling. This approach also enables mid-algorithm readout and remote entanglement generation (REG) on dipole-allowed (broad) transitions for high speed. Moreover, no mixed-species two-qubit (2q) gate for RE distribution.

The use of a global 1762 optical beam for dual-space, single-species architectures is already considered for shelving during readout. Only the short-wavelength Raman need be focused tightly for addressing. But for the approach using g-type gates (ground qubit gates), another independent tone may be needed 10 GHz away. This may be accomplished with a second laser and a high frequency acousto-optic modulator (AOM). AC Stark shifts of the m-type (metastable qubit), including from the ion trap RF, needs to be considered/managed. The global 1762 optical beam would also allow for integrated photonics down the road.

The dual-space, single-species architecture can also support m-type Raman operations, which can produce higher-fidelity and more efficient gates. Such an approach only needs the 1762 tones spaced by ~80 MHz (not 10 GHz) with local m-type and g-type Raman.

Figure 19:
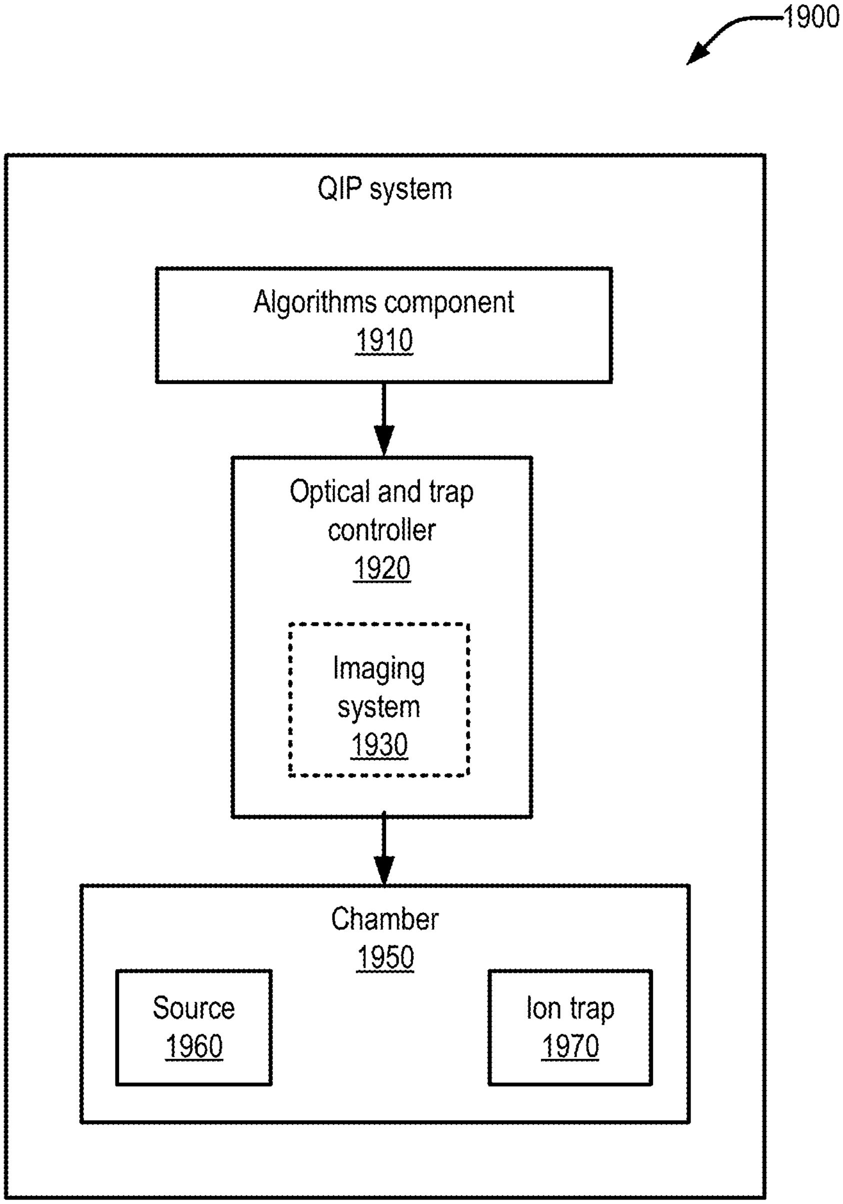
FIG. 19 illustrates an example of a quantum information processing (QIP) system in which a dual-space, single species architecture can be implemented according to aspects of the present disclosure.

FIG. 19 is a block diagram that illustrates an example of a QIP system 1900 in accordance with aspects of this disclosure in which the techniques described above for a dual-space, single species trapped-ion architecture can be implemented. The QIP system 1900 may also be referred to as a quantum computing system, a computer device, a trapped ion system, or the like.

The QIP system 1900 can include a source 1960 that provides atomic species (e.g., a plume or flux of neutral atoms) to a chamber 1950 having an ion trap 1970 that traps the atomic species once ionized (e.g., photoionized). The ion trap 1970 may be part of a processor or processing portion of the QIP system 1900. The source 1960 may be implemented separate from the chamber 1950.

The imaging system 1930 can include a high-resolution imager (e.g., CCD camera) for monitoring the atomic ions while they are being provided to the ion trap or after they have been provided to the ion trap 1970. In an aspect, the imaging system 1930 can be implemented separate from the optical and trap controller 1920, however, the use of fluorescence to detect, identify, and label atomic ions using image processing algorithms may need to be coordinated with the optical and trap controller 1920.

The QIP system 1900 may also include an algorithms component 1910 that may operate with other parts of the QIP system 1900 (not shown) to perform quantum algorithms or quantum operations, including a stack or sequence of combinations of single qubit operations and/or multi-qubit operations (e.g., two-qubit operations) as well as extended quantum computations. As such, the algorithms component 1910 may provide instructions to various components of the QIP system 1900 (e.g., to the optical and trap controller 1920) to enable the implementation of the quantum algorithms or quantum operations.

Figure 20:
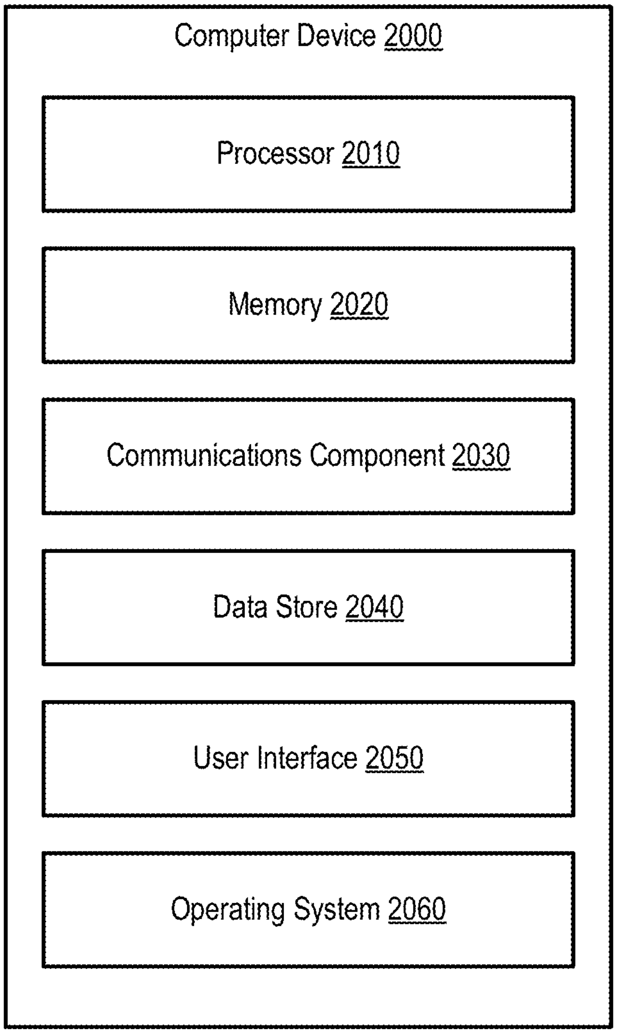
FIG. 20 illustrates an example of a computer device in which a dual-space, single species architecture can be implemented for quantum information processing according to aspects of the present disclosure.

Referring now to FIG. 20, illustrated is an example computer system or device 2000 in accordance with aspects of the disclosure. The computer device 2000 can represent a single computing device, multiple computing devices, or a distributed computing system, for example. The computer device 2000 may be configured as a quantum computer (e.g., a QIP system), a classical computer, or a combination of quantum and classical computing functions. For example, the computer device 2000 may be used to process information using quantum algorithms based on trapped ion technology and may therefore implement the dual-space, single species architecture described herein. A generic example of the computer device 2000 as a QIP system is illustrated in the QIP system 1900 shown in FIG. 19.

In one example, the computer device 2000 may include a processor 2010 for carrying out processing functions associated with one or more of the features described herein. The processor 2010 may include a single or multiple set of processors or multi-core processors. Moreover, the processor 2010 may be implemented as an integrated processing system and/or a distributed processing system. The processor 2010 may include a central processing unit (CPU), a quantum processing unit (QPU), a graphics processing unit (GPU), or combination of those types of processors. In one aspect, the processor 2010 may refer to a general processor of the computer device 2000, which may also include additional processors 2010 to perform more specific functions such as functions for individual beam control.

In an example, the computer device 2000 may include a memory 2020 for storing instructions executable by the processor 2010 for carrying out the functions described herein. In an implementation, for example, the memory 2020 may correspond to a computer-readable storage medium that stores code or instructions to perform one or more of the functions or operations described herein. Just like the processor 2010, the memory 2020 may refer to a general memory of the computer device 2000, which may also include additional memories 2020 to store instructions and/or data for more specific functions such as instructions and/or data for individual beam control.

Further, the computer device 2000 may include a communications component 2030 that provides for establishing and maintaining communications with one or more parties utilizing hardware, software, and services as described herein. The communications component 2030 may carry communications between components on the computer device 2000, as well as between the computer device 2000 and external devices, such as devices located across a communications network and/or devices serially or locally connected to computer device 2000. For example, the communications component 2030 may include one or more buses, and may further include transmit chain components and receive chain components associated with a transmitter and receiver, respectively, operable for interfacing with external devices.

Additionally, the computer device 2000 may include a data store 2040, which can be any suitable combination of hardware and/or software, which provides for mass storage of information, databases, and programs employed in connection with implementations described herein. For example, the data store 2040 may be a data repository for operating system 2060 (e.g., classical OS, or quantum OS). In one implementation, the data store 2040 may include the memory 2020.

The computer device 2000 may also include a user interface component 2050 operable to receive inputs from a user of the computer device 2000 and further operable to generate outputs for presentation to the user or to provide to a different system (directly or indirectly). The user interface component 2050 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, the user interface component 2050 may include one or more output devices, including but not limited to a display, a speaker, a haptic feedback mechanism, a printer, any other mechanism capable of presenting an output to a user, or any combination thereof.

In an implementation, the user interface component 2050 may transmit and/or receive messages corresponding to the operation of the operating system 2060. In addition, the processor 2010 may execute the operating system 2060 and/or applications or programs, and the memory 2020 or the data store 2040 may store them.

When the computer device 2000 is implemented as part of a cloud-based infrastructure solution, the user interface component 2050 may be used to allow a user of the cloud-based infrastructure solution to remotely interact with the computer device 2000.

Figure 21:
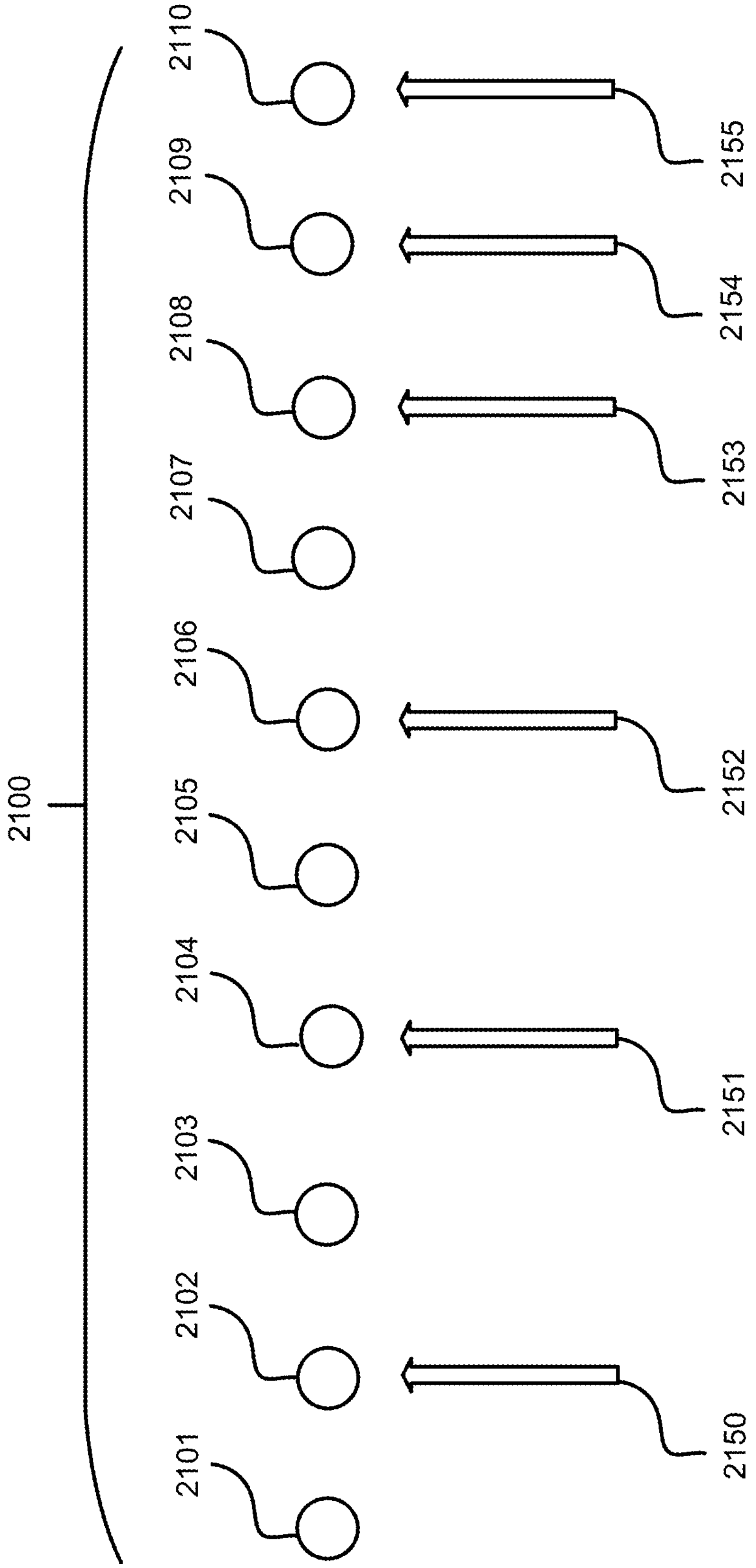
FIG. 21 illustrate an example of a scheme to mitigate cross-talk according to aspects of the present disclosure.

FIG. 21 illustrates an example of a scheme for cross-talk mitigation. In quantum computers based on the optical manipulation of a chain of trapped ions, one source of error may be caused by the optical crosstalk of the control beams. That is, when a control beam is intended to address one ion, the control beam may have non-negligible intensity at the locations of the neighboring ions. This may unintentionally drive qubit transitions in the neighboring ions, which may lead to computational error. This error may be reduced by using composite pulses sequences to drive single-qubit gates, but such a remedy is may not possible for two-qubit gates. The problem of crosstalk may worsen as the length of the ion chain increases, because a longer ion chain may require the spacing between neighboring ions to be reduced, leading to higher levels of crosstalk. Crosstalk may be minimized through careful optical engineering of the control beam, but alternative methods of mitigating the impact of optical crosstalk may be desirable.

In some aspects, one method of mitigating the impact of optical crosstalk is by selecting ions that will not serve as qubits for a particular computation and making them insensitive to optical manipulation. Therefore, if there is some crosstalk onto these ions, the crosstalk has no effect on the outcome of the computation. This can be done, for example, by making those ions different isotopes or chemical elements. However, for these methods, the number of non-qubit ions cannot be changed without reloading the entire chain, which is not feasible to do dynamically between computations.

Aspects of the present disclosure include techniques that are based on DSSS trapped-ion control with a global HSS beam plus individually addressable Raman beams. This method works by coherently transferring ions in a single-species chain between different atomic manifolds. Specifically, aspects of the present disclosure include strategically selecting qubit ions and shelving some or all remaining ions into the metastable state. Consequently, the non-qubit ions may be insensitive to the optical control beam, vastly reducing the impact of optical crosstalk.

Depending on the number of ions in the chain and/or the number of qubits needed for a particular calculation, aspects of the present disclosure include dynamically selecting the set of "buffer" ions to shelve. When fewer than half the ions in the chain are allocated as qubits, every other ion may be shelved to improve nearest-neighbor crosstalk suppression. When most but not all of the ions are needed, aspects of the present disclosure include strategically selecting the buffer ions depending on the participation of different ions in certain motional modes, particulars of the optical crosstalk profile across the chain, or any other consideration.

The technique described above may be less sensitive to the quality of the shelving pulses. In the certain techniques, the qubit ions are transferred from the ground state to the metastable state and back multiple times throughout a sequence. Such techniques may require the error rate and phase noise of the shelving pulses be low. In the current scheme, however, there is no need to retrieve the non-qubit ions from the metastable state once the non-qubit ions are shelved there. Thus, it may be possible to drive multiple shelving pulses to different metastable states. The error rate of the shelving operation is therefore the product of the error rates of the individual shelving pulses, which may be made negligibly small with very loose requirements on the quality of the individual shelving pulses.

Further, since the selective shelving operation requires only single-qubit Raman manipulation, aspects of the present disclosure may include using composite pulse sequences for the selective shelving operation, which are constructed to suppress sensitivity to crosstalk, to separate out the non-qubit ions. Therefore, the crosstalk-suppression scheme can itself be made to be relatively insensitive to crosstalk.

One aspect of the present disclosure includes selecting non-adjacent trapped ions to participate in qubit operations. The neighboring trapped ions of the non-adjacent trapped ions may be shuttled to the metastable manifold to reduce the impacts of optical cross-talk.

Still referring to FIG. 21, in some aspects, an example quantum computer implemented based on DSSS trapped ion control scheme may include an ion chain 2100 having 10 trapped ions 2101, 2102, 2103, 2104, 2105, 2106, 2107, 2108, 2109, 2110. A global HSS beam (not shown) may be applied to the trapped ions 2101-1610, with individual Raman beams applied for transitioning among the manifolds. When a first Raman beam 2150 is applied to the trapped ion 2102, a portion of the first Raman beam 2150 may "leak" into the neighboring trapped ions (trapped ions 2101, 2103), which may lead to optical cross-talk and/or noise. The "leaks" may be caused by scattering, diffusion, reflection, refraction, and/or diffraction of the first Raman beam 2150, or the spatial extent of beam 2150, independent of any optical errors, may be such that it has non-negligible intensity at the location of ions 2101 and 2103. Such "leaks" may cause errors in the states of the neighboring trapped ions. According to an aspect of the present disclosure, prior to the addressing of the trapped ion 2102, the neighboring trapped ions (i.e., trapped ions 2101, 2103) may be shuttled from the ground state manifold to the metastable manifold (e.g., using one or more m-type Raman beams). Consequently, during the addressing of the trapped ion 2102, any "leak" of the first Raman beam 2150 into the neighboring trapped ions may not negatively impact the computation since the neighboring trapped ions are in the metastable manifold.

In another aspect, a qubit may be implemented by the trapped ions 2102, 2106. As such, the trapped ion 2102 may be entangled with the trapped ion 2106. Further, the trapped ion 2102 may be slightly entangled with the trapped ions 2105 and 2107 (slightly entangled may mean less entangled than the entanglement between trapped ions 2102, 2106). The trapped ion 2106 may be slightly entangled with the trapped ions 2101, 2103. Therefore, if the neighboring trapped ions of the trapped ions 2102, 2106 are shelved to the metastable manifold, less error will be introduced into the computation during the addressing of the trapped ions 2102, 2106.

In other aspects of the present disclosure, a measurement process may be implemented to measure the severity of the cross-talk (to the neighboring trapped ions) caused by the Raman beam during the addressing of each trapped ion in an ion chain. If a qubit operation requires more than half of the available trapped ions in the ion chain, aspects of the present disclosure may including selecting the trapped ions having Raman beams that cause the less optical cross-talk to the neighboring trapped ions.

Still referring to FIG. 21, in one aspect of the present disclosure, a qubit operation may require six of the ten qubits in the ion chain 2100. During the measurement process described above, it may be determined that the addressing of the trapped ions 2102, 2104, 2106, 2108, 2109, 2110 by the corresponding Raman beams 2150, 2151, 2152, 2153, 2154, 2155 cause less optical cross-talk to the neighboring ions than the addressing of the trapped ions 2101, 2103, 2105, 2107. Consequently, aspects of the present disclosure may include selecting the trapped ions 2102, 2104, 2106, 2108, 2109, 2110 for the qubit operation to reduce overall noise/error during the qubit operation. The remaining trapped ions not participating in the qubit operation (i.e., trapped ions 2101, 2103, 2105, 2107) may be shelved to the metastable manifolds as described above.

Figure 22:
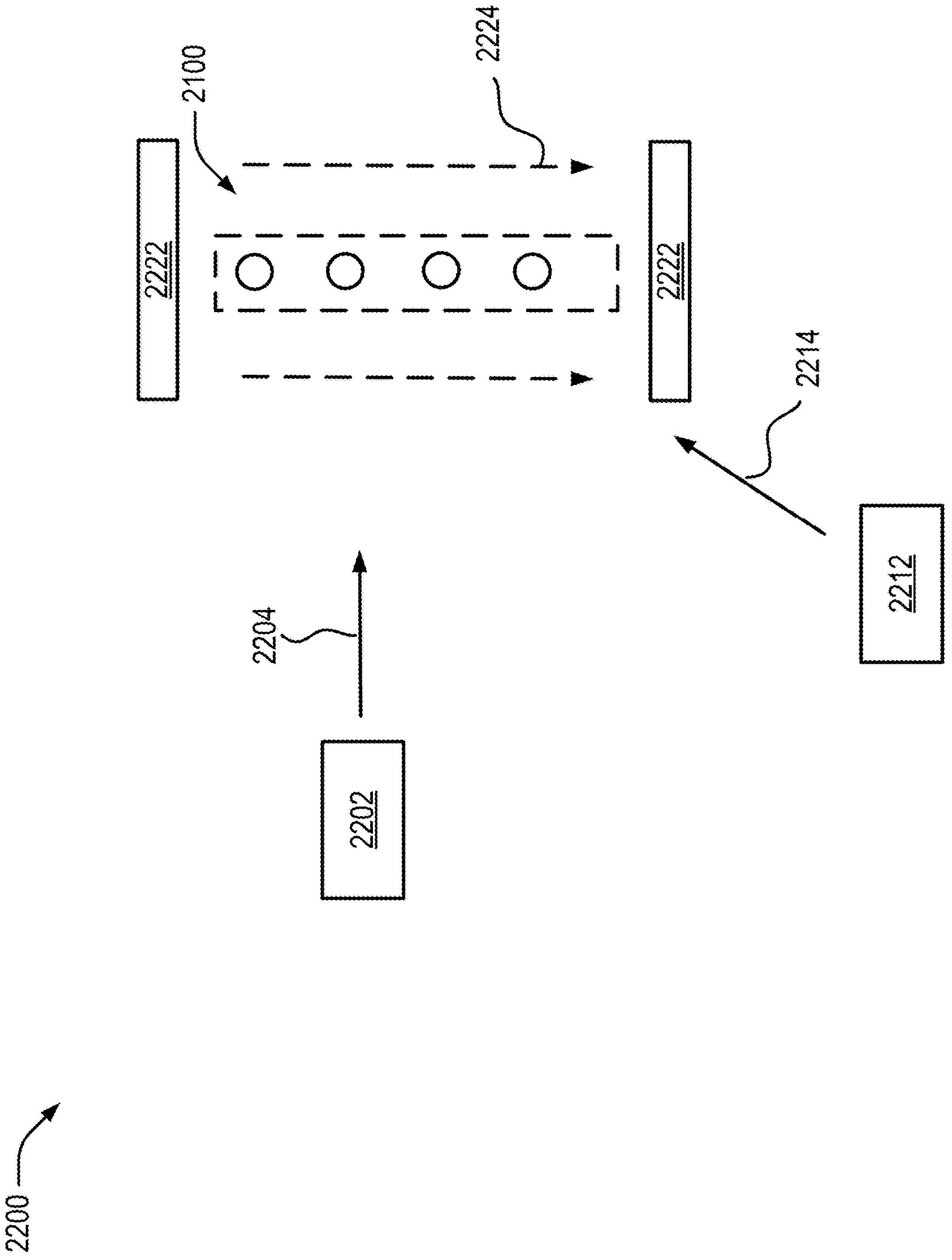
FIG. 22 illustrates an example of an illumination system according to aspects of the present disclosure.

FIG. 22 illustrates an example of an illumination system 2200 configured to illuminate and/or bias the ion chain 2100 according to aspects of the present disclosure. In some aspects, the illumination system 2200 may include first light source 2202 configured to emit a global optical beam 2204 toward the ion chain 2100. The illumination system 2200 may include a second slight source 2212 configured to emit individual Raman beams toward the ion chain 2100. The illumination system 2200 may include a magnetic system 2222 configured to apply a magnetic field 2224 across the ion chain 2100.

Figure 18:
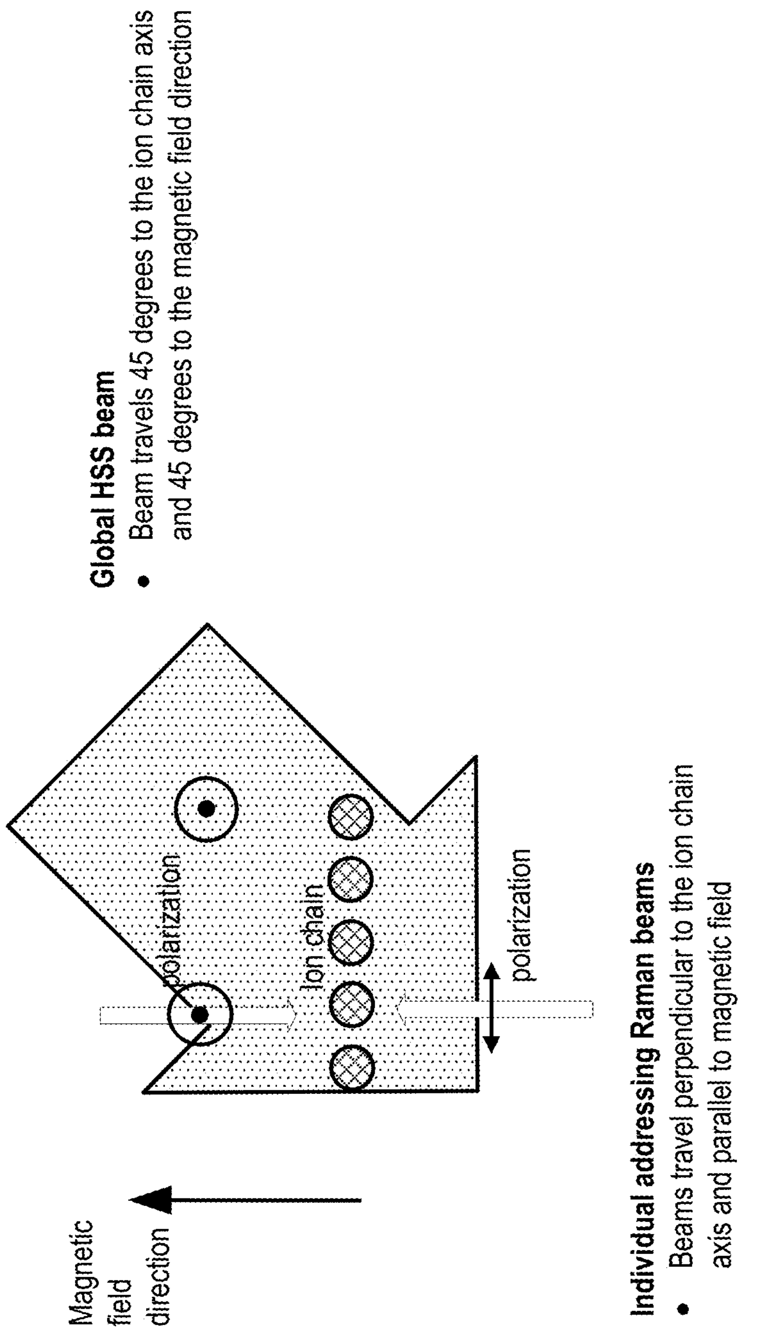
FIG. 18 illustrates a laser scheme for high-fidelity dual-space operation in connection with aspects of this disclosure.
Figure 23:
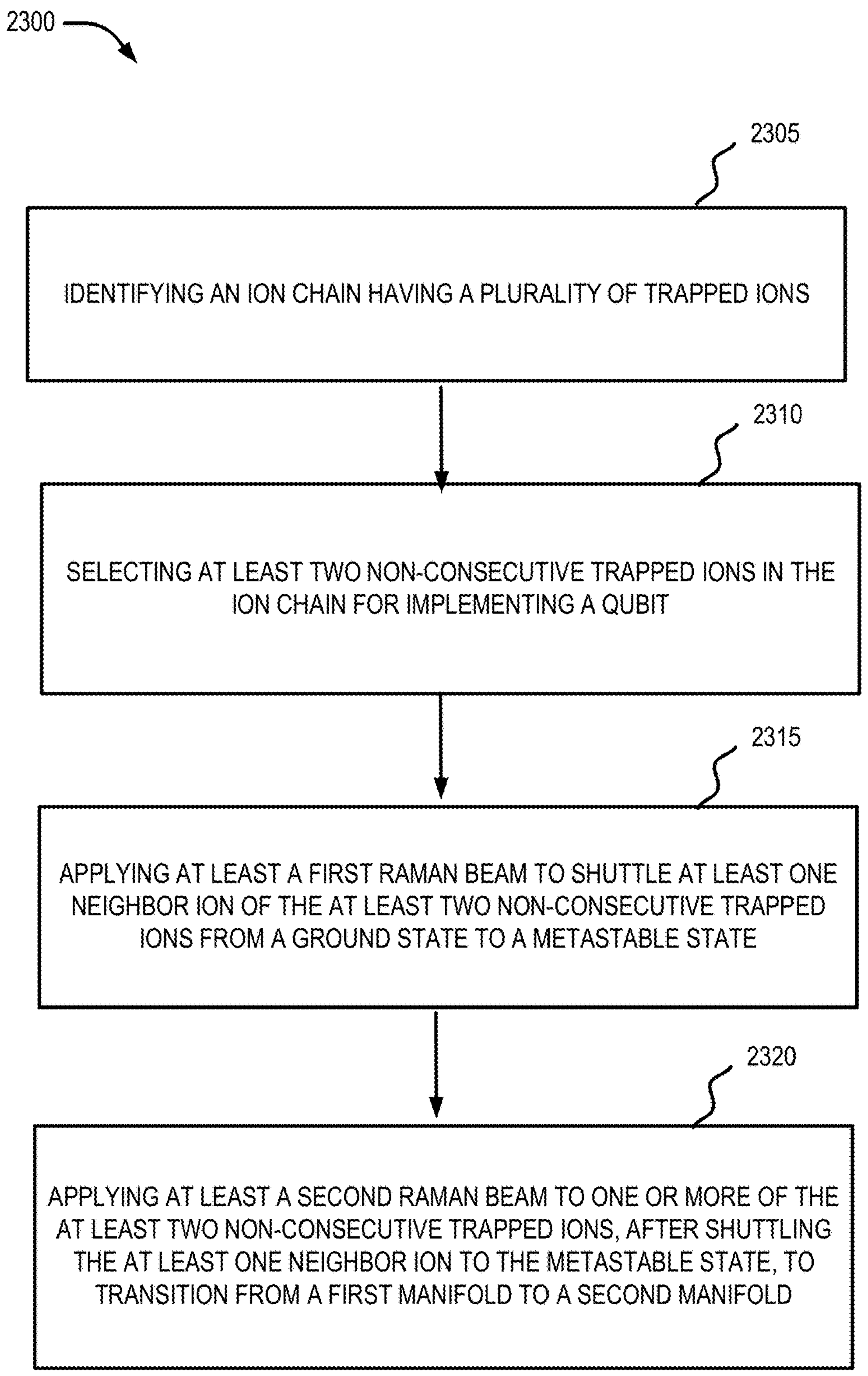
FIG. 23 illustrates an example of a method for mitigating cross-talk according to aspects of the present disclosure.
Figure 24A:
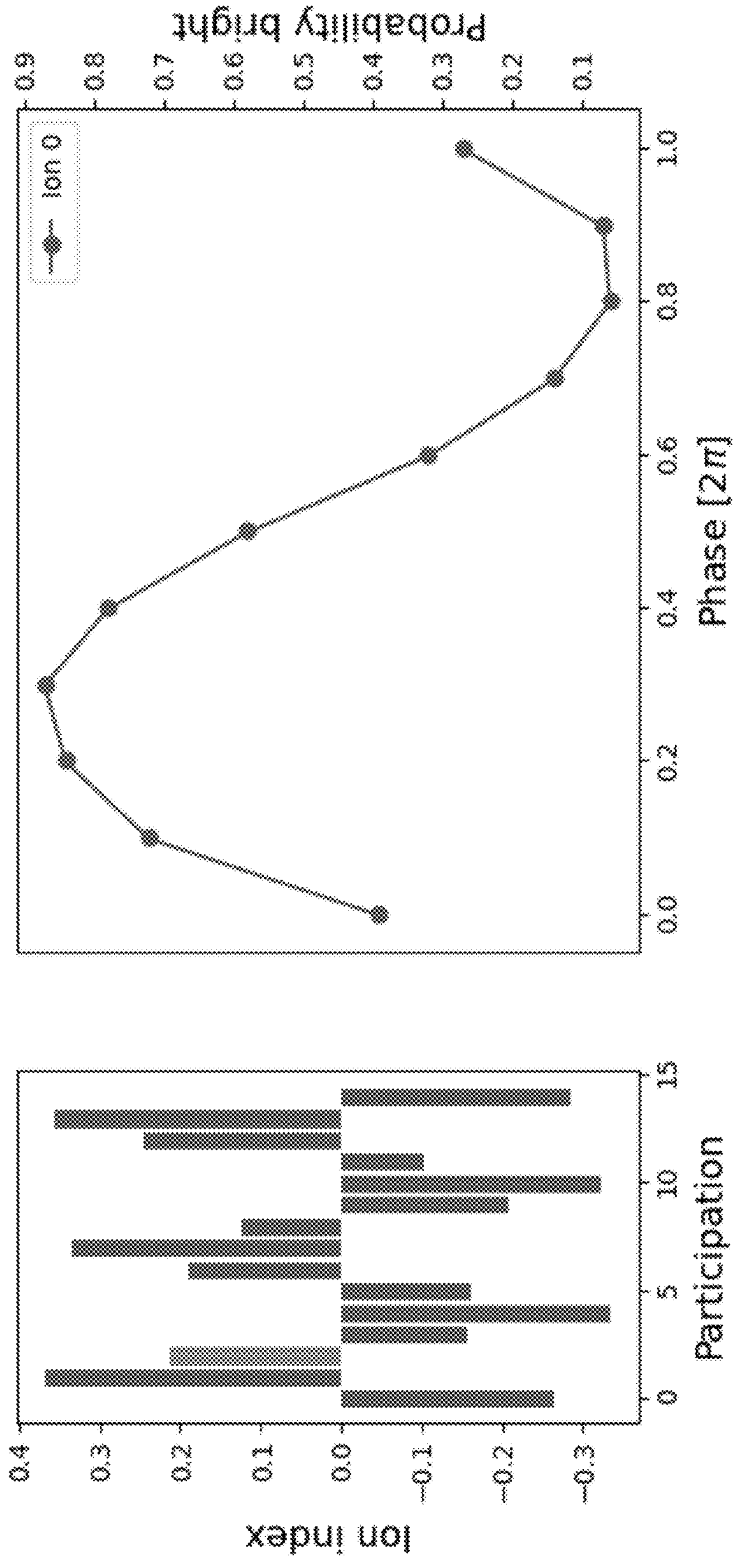
FIGS. 24A to 24K illustrate examples of mode phase scans according to aspects of the present disclosure.
Figure 24B:
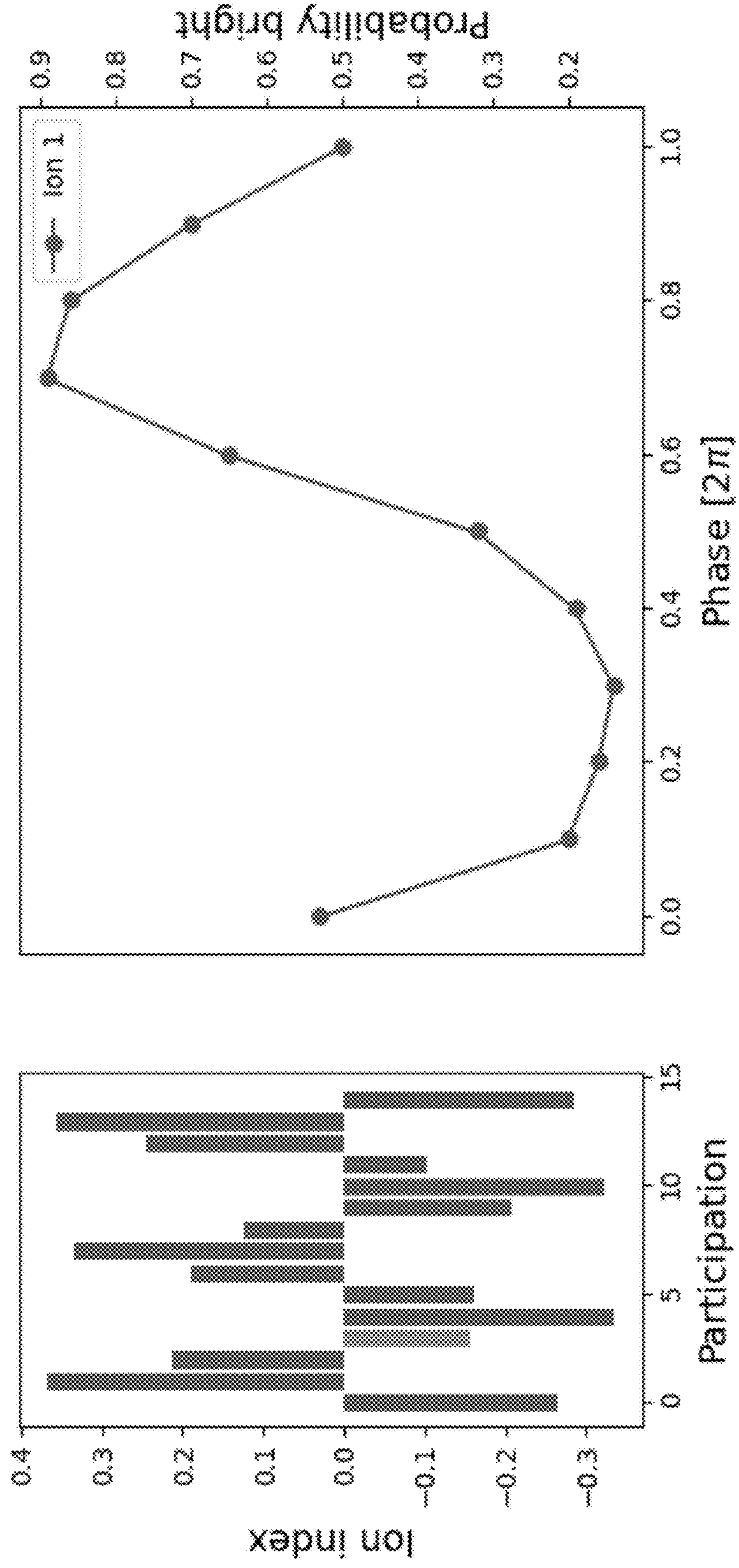
Figure 24C:
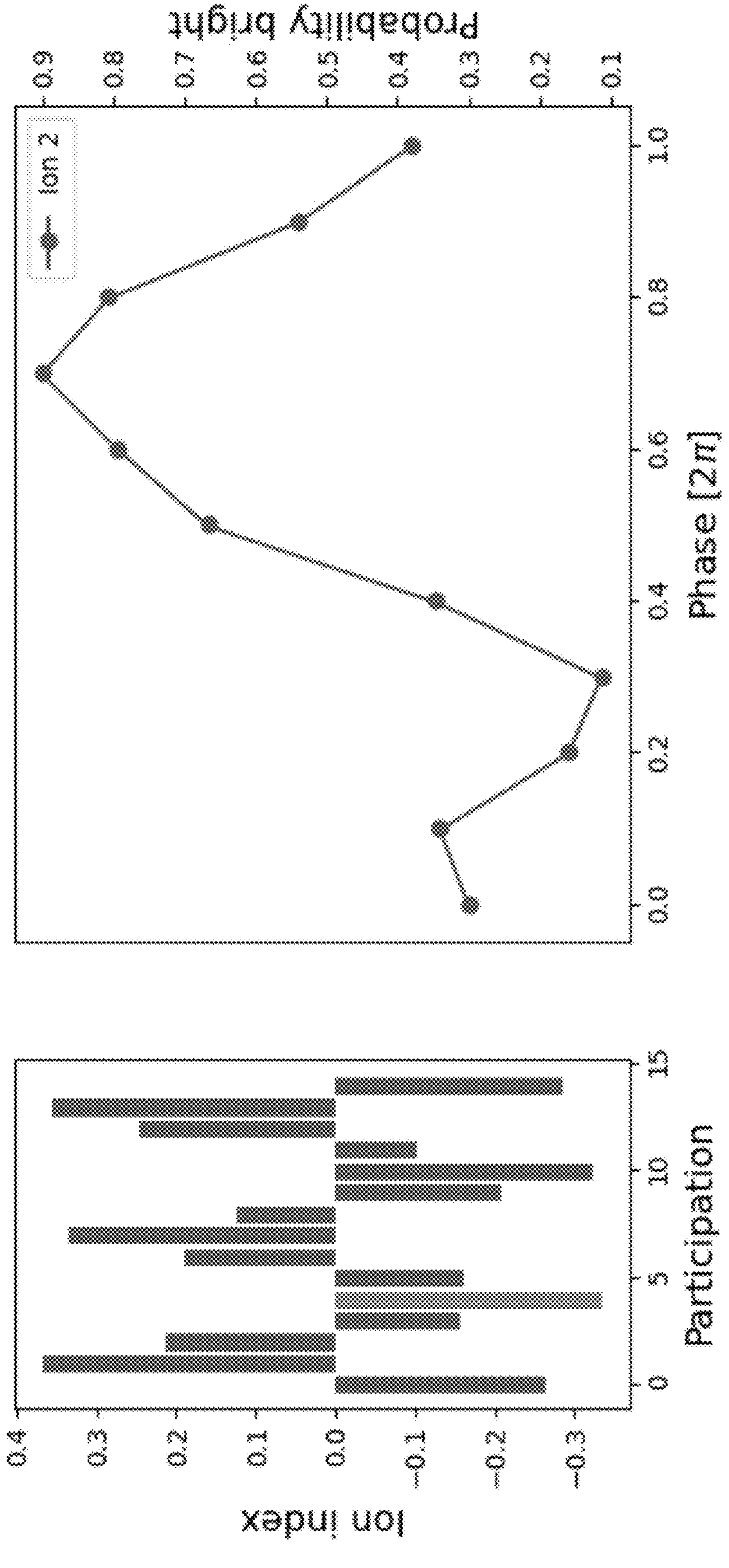
Figure 24D:
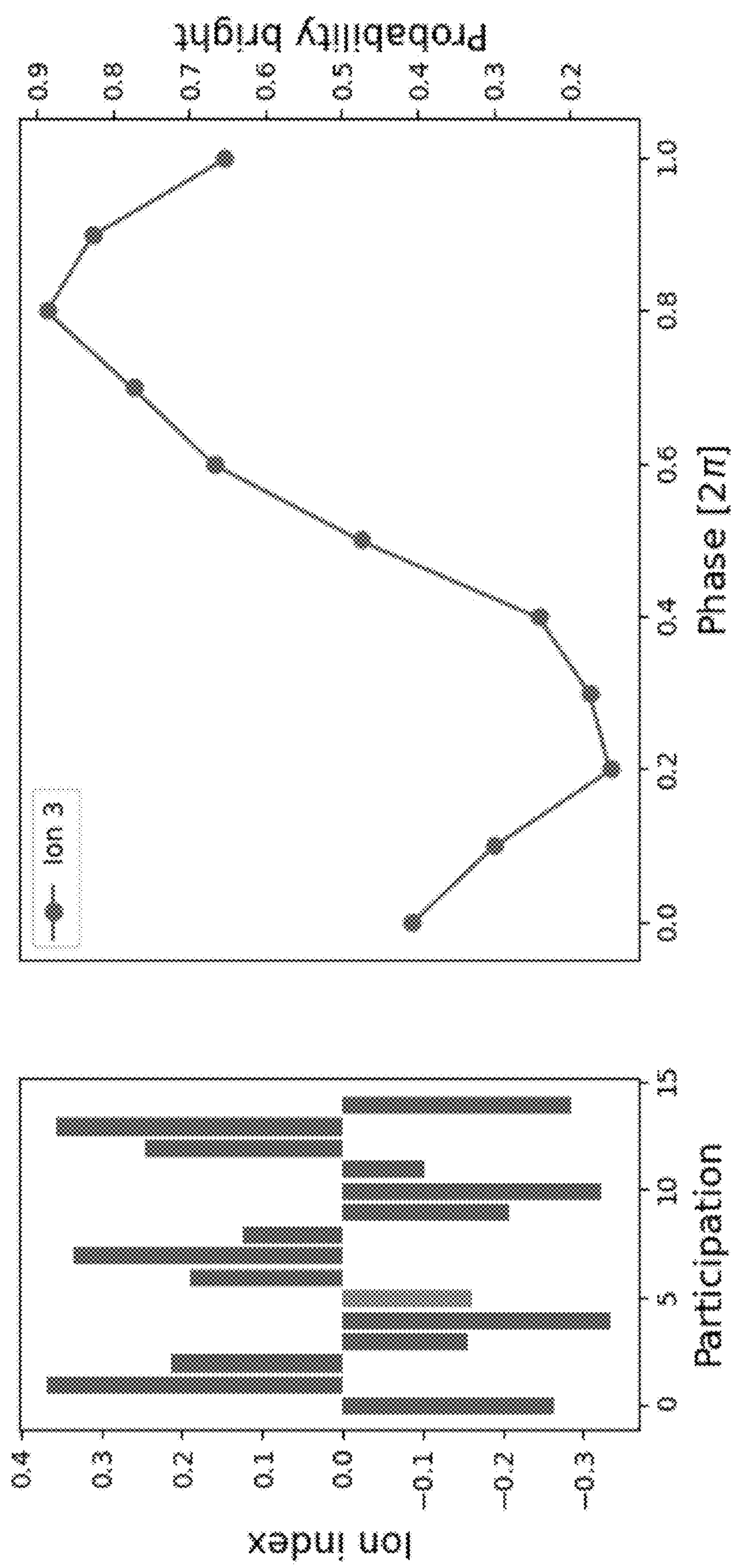
Figure 24E:
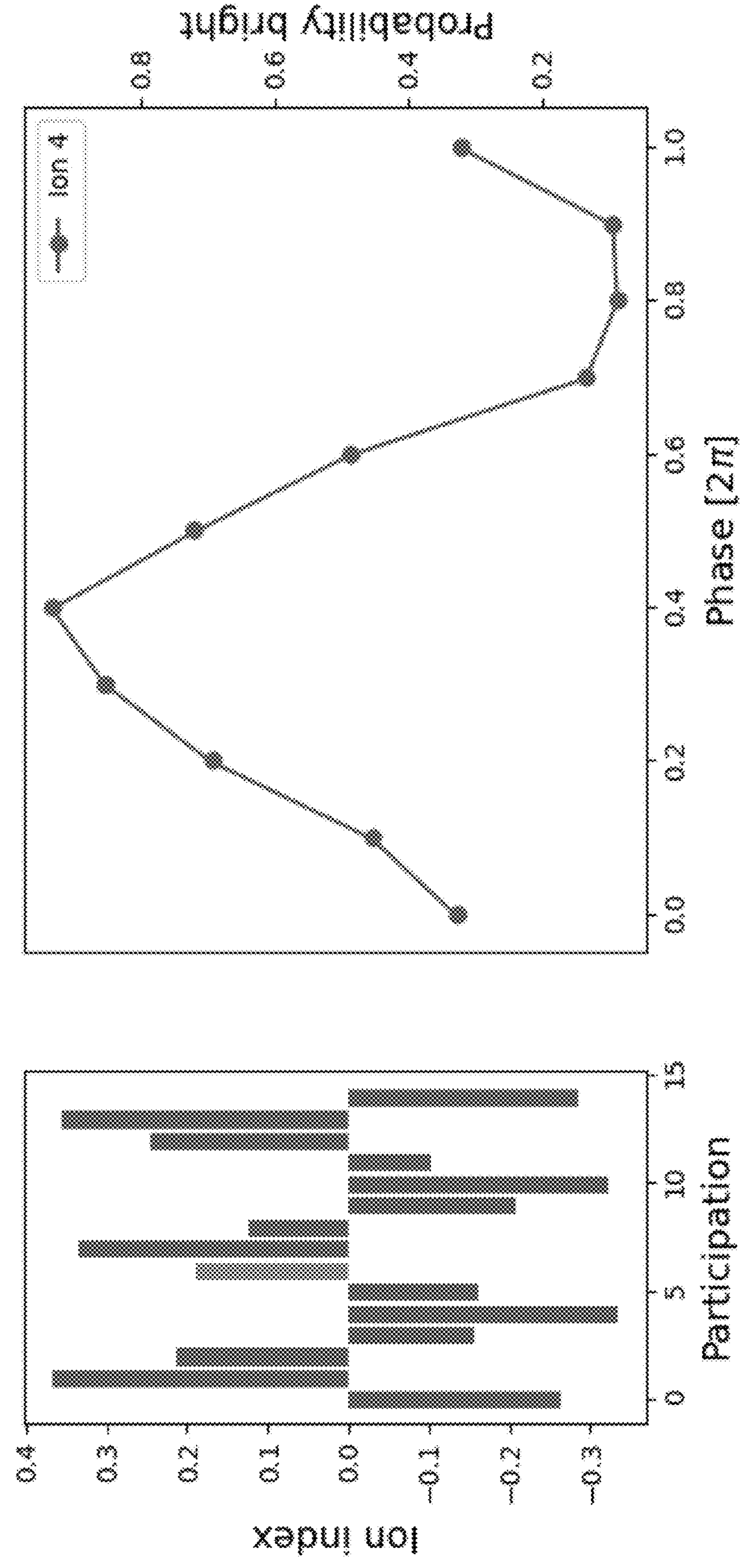
Figure 24F:
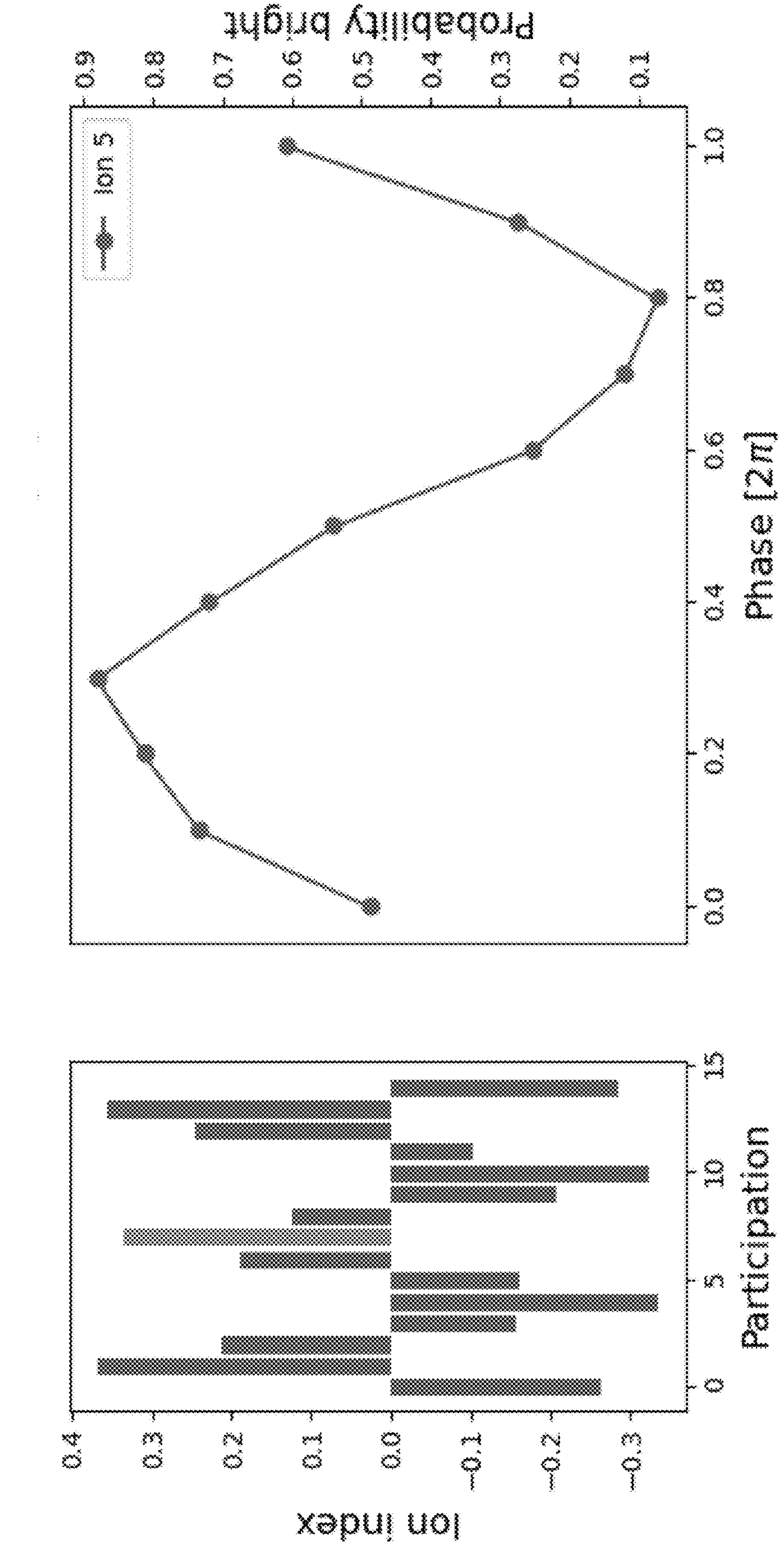
Figure 24G:
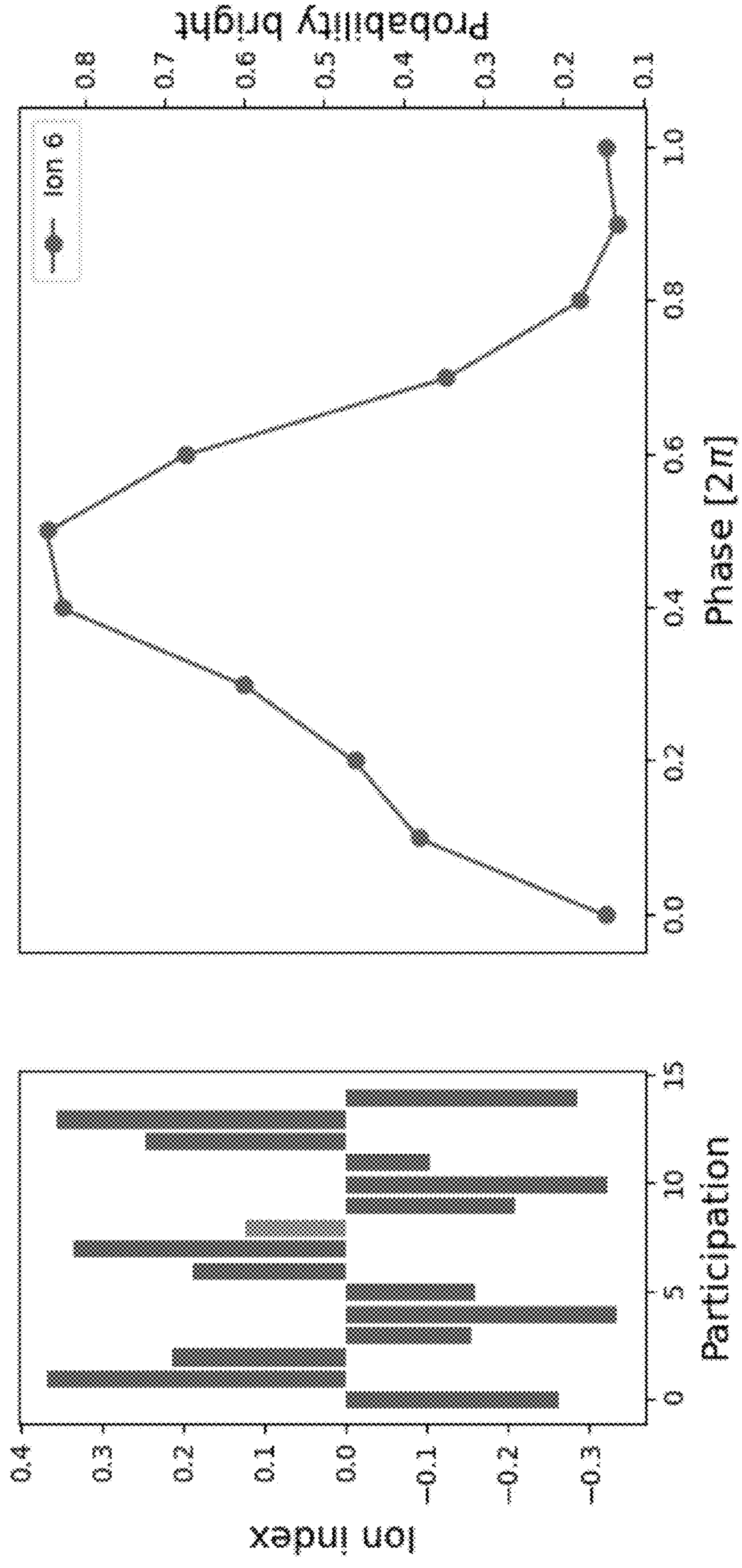
Figure 24H:
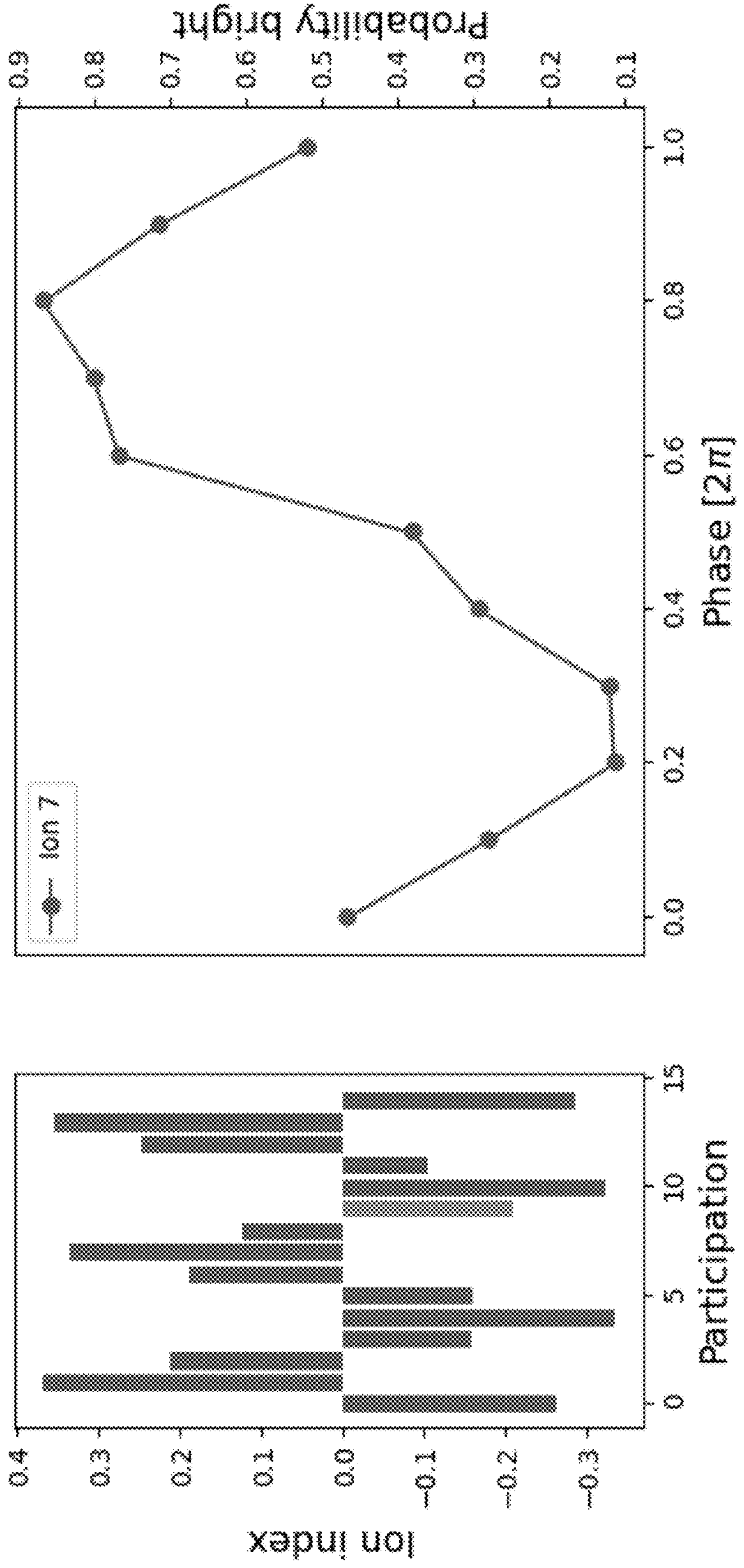
Figure 24I:
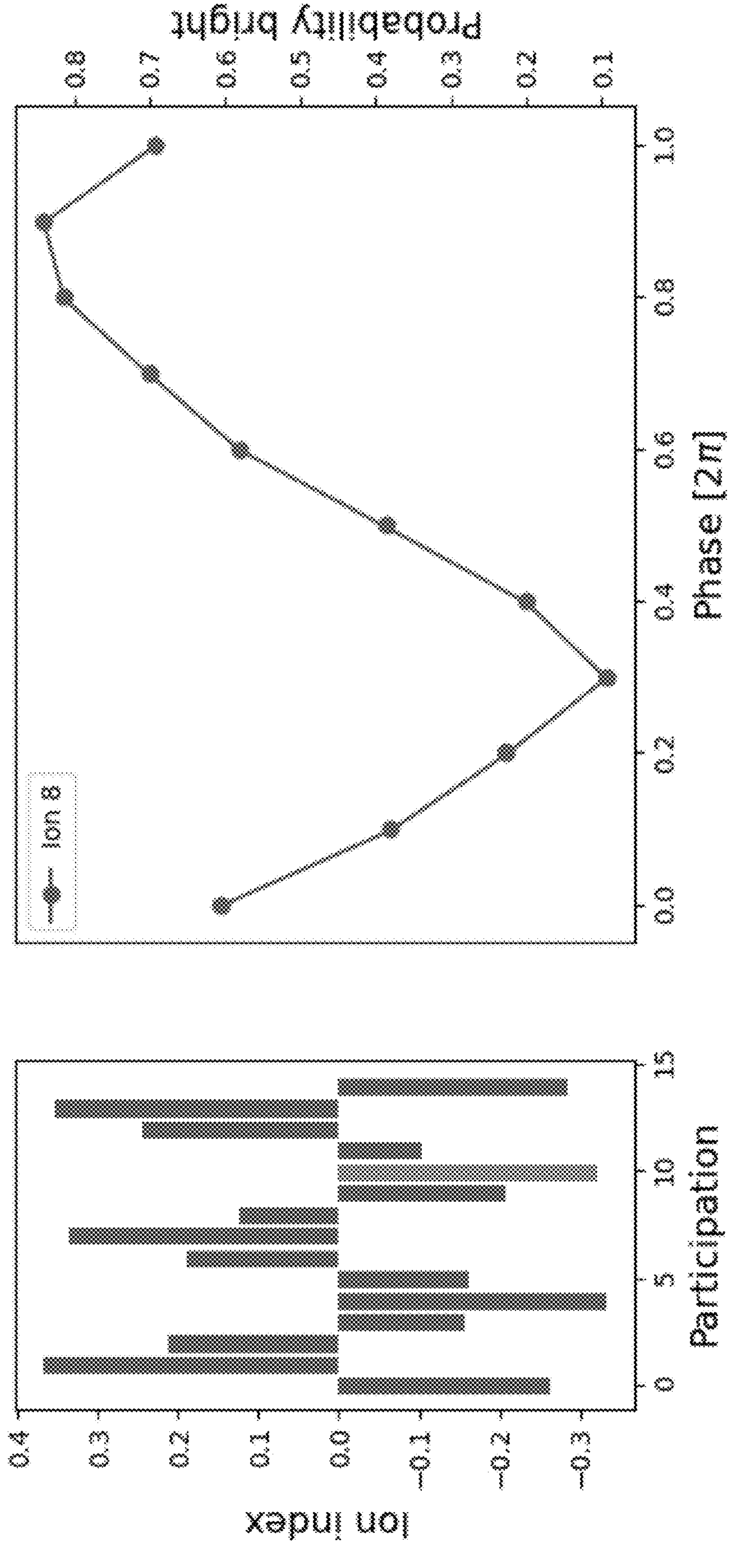
Figure 24J:
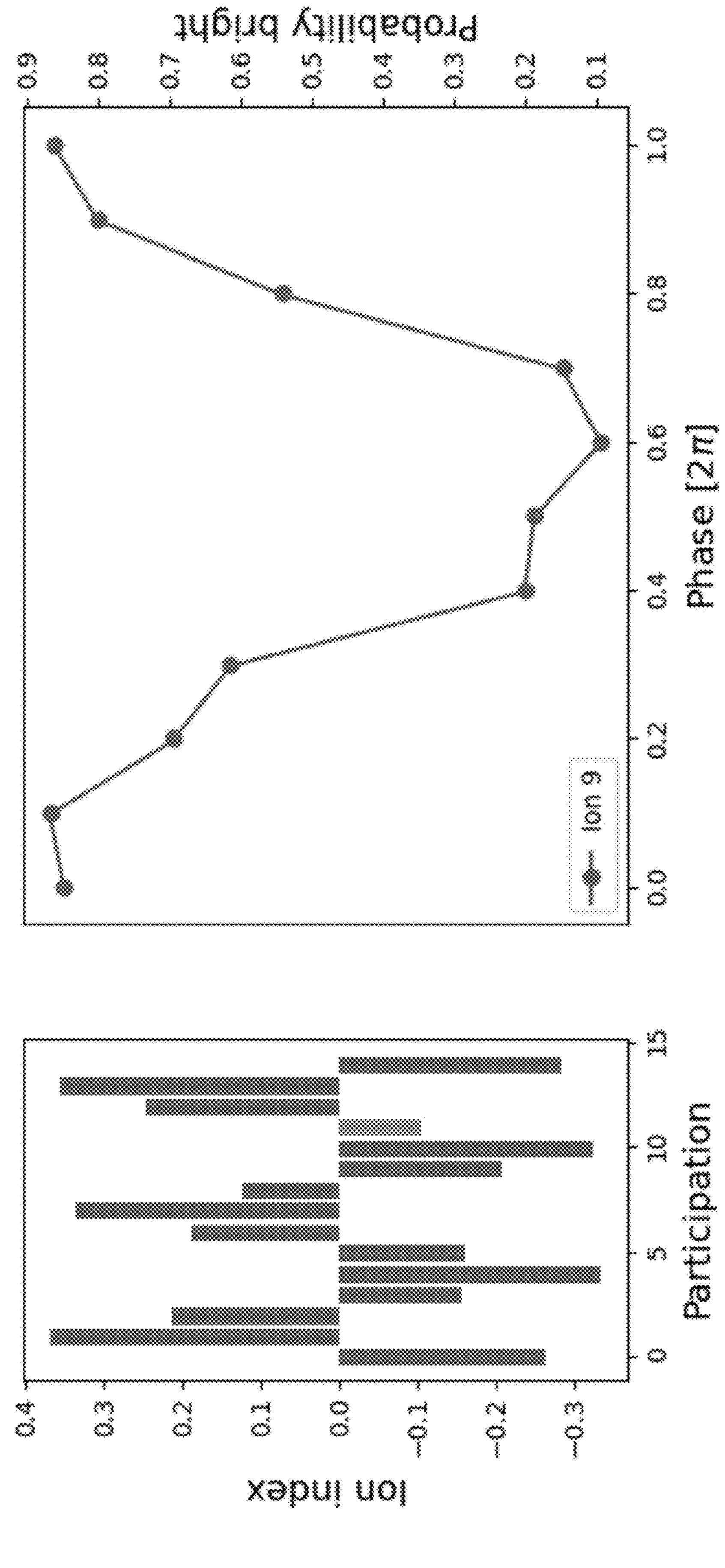
Figure 24K:
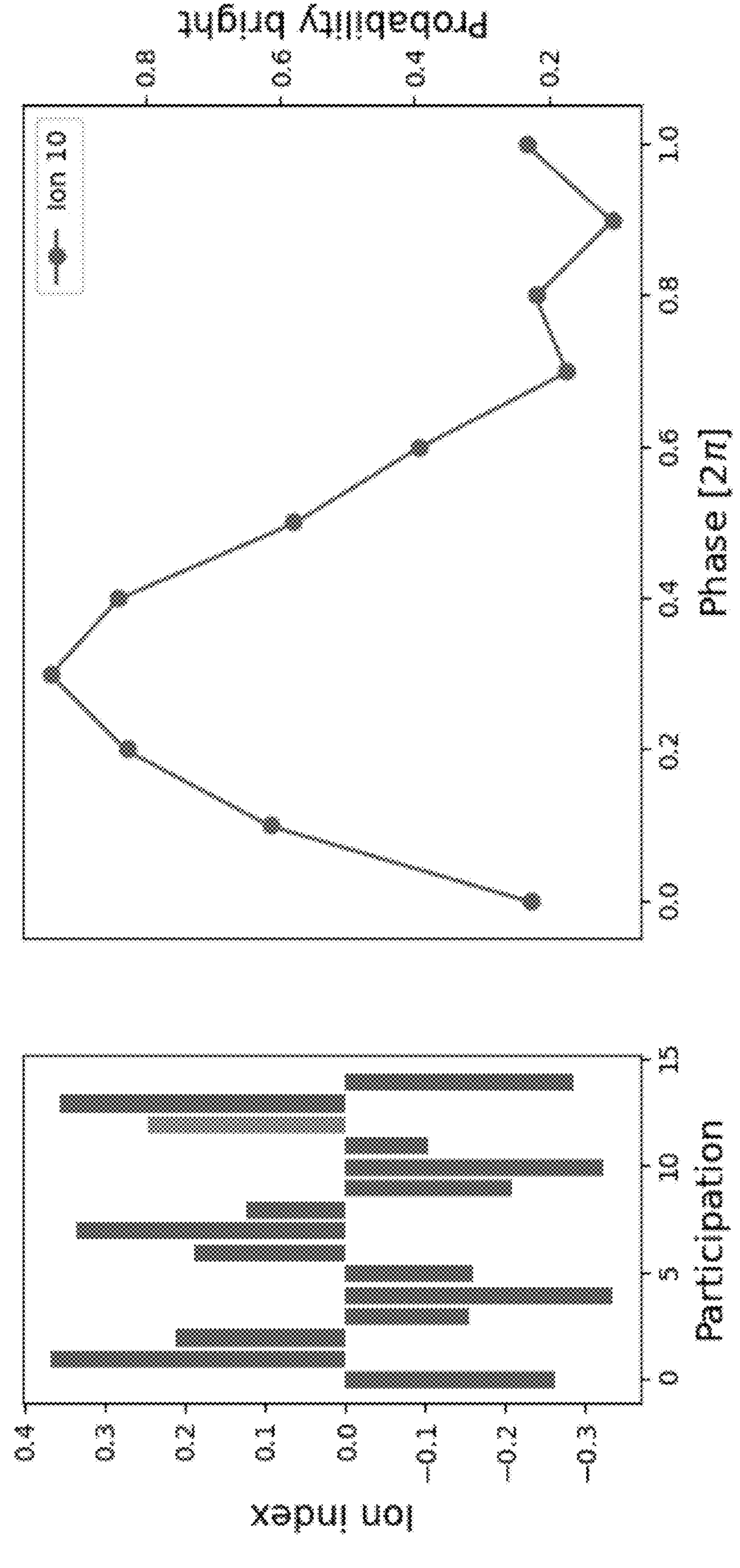

Turning to FIG. 23, a method 2300 of reducing cross-talk in a QIP system may be performed by the illumination system 2200, subcomponents of the illumination system 2200, the laser scheme of FIG. 18, the QIP system 1900, subcomponents of the QIP system 1900, the computer device 2000, and/or subcomponents of the computer device 2000.

At block 2305, the method 2300 may identify an ion chain having a plurality of trapped ions. For example, the QIP system 1900 and/or the computer device 2000 may identify an ion chain having a plurality of trapped ions.

At block 2310, the method 2300 may select at least two non-consecutive trapped ions in the ion chain for implementing a qubit. For example, the QIP system 1900, subcomponents of the QIP system 1900, the computer device 2000, and/or subcomponents of the computer device 2000 may select the trapped ions 2102, 2104 of the ion chain 2100 for implementing a qubit.

At block 2315, the method 2300 may apply at least a first Raman beam to shuttle at least one neighbor ION of the at least two non-consecutive trapped ions from a ground state to a metastable state. For example, the first light source 2202 and/or the second light source 2212 may apply the individual Raman beams 2214 to the neighboring trapped ion 2103 to transition the neighboring trapped ion 2103 to the metastable state.

At block 2320, the method 2300 may apply at least a second Raman beam to one or more of the at least two non-consecutive trapped ions, after shuttling the at least one neighbor ION to the metastable state, to transition from a first manifold to a second manifold. For example, the second light source 2212 may apply the individual Raman beams 2214 to the trapped ions 2102, 2104.

In some aspects of the present disclosure, two-qubit gates, as used in a QIP system, may create entanglement between two ions in a single ion chain by coupling the two ions using qubit-state dependent excitation of normal modes of spatial motion shared by the two ions. In order to computationally find the laser pulse amplitude and/or the frequency profile that leads to the desired entanglement, it may be desirable to know the amplitudes of participation of the ions in the chain in some or all normal modes of motion. These may be measured directly by exciting each motional mode on each ion, and observing the relative excitation strength. Additionally or alternatively, it may be necessary to know the relative phase of the motion of the ions in a given motional mode. However, it may be difficult and/or time-consuming to measure the relative phase. Therefore, it may be desirable to implement a scheme for the rapid probing of the relative phase.

An aspect of the present disclosure includes determining the phase of oscillation of one or more ions in an ion chain, such as the ion chain 2100, for a particular normal mode of motion. An example of a scheme for determining the phase may be as follows. The ions in the ion chain are initialized in the qubit ground state (i.e., $|\downarrow\rangle$) and the motional mode has been cooled to the ground state (i.e., $|0\rangle$). In an aspect of the present disclosure, the initial wavefunction of an ion 0 (e.g., the first ion in the ion chain) and an ion k (e.g., kth ion in the ion chain) may be expressed as $|\psi_0\rangle=|\downarrow_0\rangle\downarrow_k\rangle|0\rangle$. Next, a carrier $$\frac{\pi}{2}\text{-}$$

pulse may by applied to the ion 0, and the wavefunction may be modified as $$\frac{\pi_y}{2}|\psi_0\rangle = \frac{1}{\sqrt{2}}(|\downarrow_0\rangle + |\uparrow_0\rangle)|\downarrow_k\rangle|0\rangle.$$

A light source, such as a laser, may be used to emit the carrier $$\frac{\pi}{2}\text{-}$$

pulse. After the application of the carrier $$\frac{\pi}{2}\text{-}$$

pulse, a red sideband π-pulse may be applied to the ion 0. A light source, such as a laser, may be used to emit the red sideband π-pulse. The effect of a red sideband pi-pulse $|\downarrow\rangle|1\rangle\leftrightarrow|\uparrow\rangle|0\rangle$. As a result of the red sideband π-pulse, the wavefunction becomes $$\frac{1}{\sqrt{2}}|\downarrow_0\rangle|\downarrow_k\rangle(|0\rangle + |1\rangle).$$

The wavefunction is now in a superposition of only motional quanta. Consequently, the ion chain may undergo time dependent spatial oscillation.

In some aspects of the present disclosure, the scheme may next include de-exciting the time dependent spatial oscillation on the ion k (different than the ion 0). The phase of the spatial oscillation of the ion k may be different by π radians from the phase on the ion 0. Therefore, in the frame of the control laser of the ion k, the motional mode wavefunctions may also have a different sign. Specifically, the wavefunction may be expressed as $$\frac{1}{\sqrt{2}}|\downarrow_0\rangle|\downarrow_k\rangle(|0\rangle \pm |1\rangle),$$

depending on k.

In some aspects of the present disclosure, a red sideband I-pulse may be applied to the ion k, where the wavefunction becomes $$\frac{1}{\sqrt{2}}|\downarrow_0\rangle(|\downarrow_k\rangle \pm |\uparrow_k\rangle)|0\rangle.$$

A light source, such as a laser, may be used to emit the red sideband π-pulse. Due to the application of the red sideband π-pulse applied to the ion k, the wavefunction may be back in a superposition of qubit states. However, the relative phase (between the ion 0 and the ion k) of the motional oscillation may have been imprinted onto the spin wave-function.

Next, a carrier $$\frac{\pi}{2}\text{-}$$

pulse may be applied to the ion k. A light source, such as a laser, may be used to emit the carrier $$\frac{\pi}{2}\text{-}$$

pulse. A phase scan may be performed for the ion k after the carrier $$\frac{\pi}{2}\text{-}$$

pulse. The scheme described may be repeated for the remaining ions in the ion chain (i.e., k=1 . . . n where n is the number of ions in the ion chain).

FIGS. 24A to 24K illustrate examples of the results of mode phase scans performed on 11 qubits of a 15 ion chain. The bar graphs provide theoretically predicted mode participation amplitudes (with signs). In the bar graphs, the light grey lines show on which ion the second red sideband pulse is applied. The line graphs show the phase scan of the ion experiencing the second red sideband pulse. In some aspects, the phase of the scan may flip when the sign of the mode participation flips.

Figure 25:
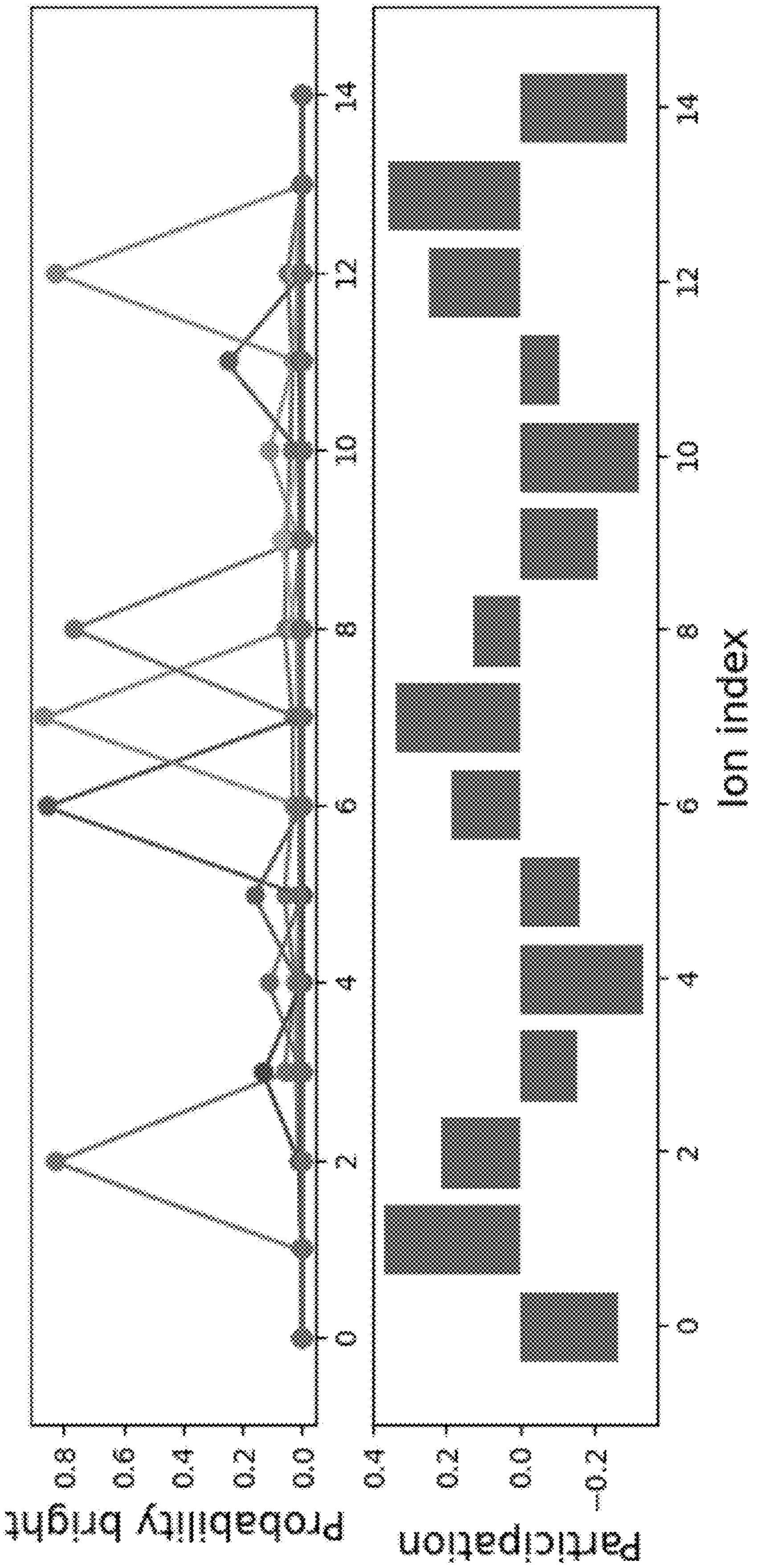
FIG. 25 illustrates an example of ion excitation at a fixed phase according to aspects of the present disclosure.

In some aspects of the present disclosure, a rapid version of this method may measure the excitation of each ion in the ion chain at a fixed phase of the last π/2-pulse. FIG. 25 illustrates an example of excitations of the ions if the phase is selected as 0.3 for the mode. As shown in FIG. 25, the probability of excitations of the ions may depend on whether the sign of the phase is either negative or positive. For example, ion excited with an excitation probability above 0.5 may have a positive sign for the participation phase, while ions with a excitation probability below 0.5 may have a negative sign for the participation phase.

In some aspects, the process of measuring the excitation is described as follows. If at the end of the pulse sequence described above, the ion is in the qubit down-state, then the ion will scatter no light (i.e., does not fluoresce) when a detection laser is applied to the ion. However, when the ion is in the qubit up-state, then the ion will scatter light from the detection laser. The relative frequency with which the ion appears in the up-state versus the down-state is referred to as the excitation. The excitation is determined by detecting the scattered light with photomultiplier tubes.

Figure 26:
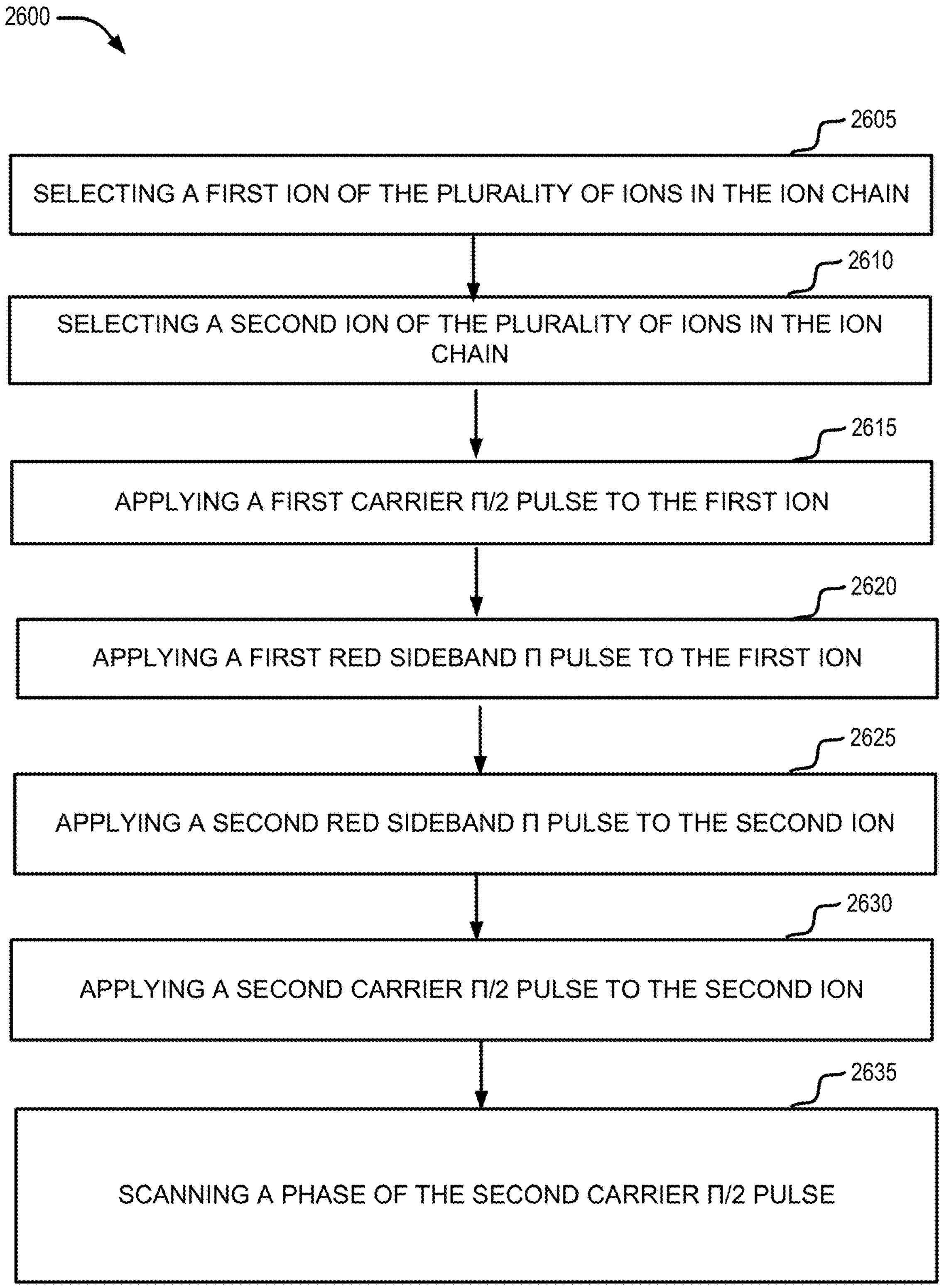
FIG. 26 illustrates an example of a method for measuring the motional mode of trapped ions according to aspects of the present disclosure.

FIG. 26 illustrates an example of a method 2600 for measuring motional mode phase of trapped ions in a ion chain.

At 2605, the method 2600 may include selecting a first ion of the plurality of ions in the ion chain. For example, one or more of the algorithm component 1910, the optical and trap controller 1920, the QIP system 1900, the processor 2010, the operating system 2060, and/or the computer device 2000 may select a first ion of the plurality of ions in the ion chain.

At block 2610, the method 2600 may include selecting a second ion of the plurality of ions in the ion chain. For example, one or more of the algorithm component 1910, the optical and trap controller 1920, the QIP system 1900, the processor 2010, the operating system 2060, and/or the computer device 2000 may select a second ion of the plurality of ions in the ion chain.

At block 2615, the method 2600 may include applying a first carrier $$\frac{\pi}{2}$$

pulse to the first ion. For example, the first lights source 2202 and/or the second light source 2212 may apply a first carrier $$\frac{\pi}{2}$$

pulse to the first ion.

At block 2620, the method 2600 may include applying a first red sideband π pulse to the first ion. For example, the first lights source 2202 and/or the second light source 2212 may apply a first red sideband π pulse to the first ion.

At block 2625, the method 2600 may include applying a second red sideband π pulse to the second ion. For example, the first lights source 2202 and/or the second light source 2212 may apply a second red sideband π pulse to the second ion.

At block 2630, the method 2600 may include applying a second carrier $$\frac{\pi}{2}$$

pulse to the second ion. For example, the first lights source 2202 and/or the second light source 2212 may apply a second carrier $$\frac{\pi}{2}$$

pulse to the second ion.

At block 2635, the method 2600 may include scanning a phase of the second carrier $$\frac{\pi}{2}$$

pulse. For example, one or more of the algorithm component 1910, the optical and trap controller 1920, the QIP system 1900, the processor 2010, the operating system 2060, and/or the computer device 2000 may scan a phase of the second carrier $$\frac{\pi}{2}$$

pulse. In one example, the phase of the pulses may be controlled via an AOM which modulates the phase of the source light.

Aspects of the present disclosure may include a method and/or a system for identifying an ion chain having a plurality of trapped ions, selecting at least two non-consecutive trapped ions in the ion chain for implementing a qubit, applying at least a first Raman beam to shuttle at least one neighbor ion of the at least two non-consecutive trapped ions from a ground state to a metastable state, and applying at least a second Raman beam to one or more of the at least two non-consecutive trapped ions, after shuttling the at least one neighbor ion to the metastable state, to transition from a first manifold to a second manifold.

Aspects of the present disclosure include the method and/or system above, further comprising, prior to applying the at least first Raman beam and the at least second Raman beam applying each of a plurality of Raman beams to each corresponding trapped ion of the plurality of trapped ions, and measuring optical cross-talk associated with neighboring trapped ions in response to applying each of the plurality of Raman beams to each of the corresponding trapped ion.

Aspects of the present disclosure include any of the method and/or system above, further comprising selecting a first portion of the plurality of trapped ions, wherein first optical cross-talk of the first portion of the plurality of trapped ions is lower than second optical cross-talk of a second portion of the plurality of trapped ions.

Aspects of the present disclosure include any of the method and/or system above, wherein the first portion of the plurality of trapped ions includes the at least two non-consecutive trapped ions.

Aspects of the present disclosure include any of the method and/or system above, wherein applying the at least a first Raman beam comprises applying a composite pulse sequence.

Aspects of the present disclosure include any of the method and/or system above, wherein the plurality of trapped ions includes a plurality of dual-space, single-species (DSSS) trapped-ions.

Aspects of the present disclosure include a method and/or a system for applying a global optical beam to a plurality of dual-space, single-species (DSSS) trapped ions, and applying at least one Raman beam of a plurality of Raman beams to a DSSS trapped ion of the plurality of DSSS trapped ions to transition a qubit associated with the DSSS trapped ion from a ground state, a metastable state, or an optical state to a different state.

Aspects of the present disclosure include any of the method and/or system above, wherein applying the global optical beam comprises applying a coherent quantum pulse sequence.

Aspects of the present disclosure include any of the method and/or system above, wherein applying the global optical beam comprises applying a single laser beam having an eccentricity in a direction along the plurality of DSSS trapped ions such that the single laser beam covers the plurality of DSSS trapped ions.

Aspects of the present disclosure include any of the method and/or system above, wherein applying the global optical beam comprises applying the global optical beam at a first 45-degree angle with respect to the plurality of DSSS trapped ions and a second 45-degree angle with respect to a magnetic field.

Aspects of the present disclosure include any of the method and/or system above, further comprising adjusting a frequency of the at least one Raman beam of the plurality of Raman beams using an electro-optic modulator (EOM) or an acousto-optic modulator (AOM) disposed in series with an EOM.

Aspects of the present disclosure include any of the method and/or system above, further comprising applying a cooling Raman beam of the plurality of Raman beams to at least a cooling ion of the plurality of DSSS trapped ions to transition the cooling ion from a first state to a second state that is higher than the first state.

Aspects of the present disclosure include any of the method and/or system above, further comprising reading an ancilla ion of the plurality of DSSS trapped ions associated with the DSSS trapped ion during a computation of the qubit.

Aspects of the present disclosure include any of the method and/or system above, further comprising calibrating the DSSS trapped ion based on the reading of the ancilla ion during the computation of the qubit.

Aspects of the present disclosure include any of the method and/or system above, further comprising performing remote entanglement generation between the plurality of DSSS trapped ions and one or more remote DSSS trapped ions.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method of measuring motional mode phase of a plurality of ions in a single ion chain, comprising:

selecting a first ion of the plurality of ions in the single ion chain;

selecting a second ion of the plurality of ions in the single ion chain, the second ion being different than the first ion;

applying a first carrier $\pi/2$ pulse to the first ion;

applying a first red sideband $\pi$ pulse to the first ion after the first carrier $\pi/2$ pulse is applied;

applying a second red sideband $\pi$ pulse to the second ion, wherein the second ion is entangled with the first ion through a motional mode shared by the first ion and the second ion;

applying a second carrier $\pi/2$ pulse to the second ion after the second red sideband $\pi$ pulse is applied; and scanning a phase of the second carrier $\pi/2$ pulse.

2. The method of claim 1, further comprising:

applying each of a plurality of red sideband $\pi$ pulses to each of remaining ions of the plurality of ions;

applying each of a plurality of carrier $\pi/2$ pulses to each of the remaining ions of the plurality of ions; and scanning a plurality of phases of the plurality of carrier $\pi/2$ pulses to determine a relative phase associated with a motional mode.

3. The method of claim 2, wherein scanning the plurality of phases comprises applying a fixed phase to a last $\pi/2$ pulse of the plurality of carrier $\pi/2$ pulses.

4. A non-transitory computer readable medium having instructions stored therein that, when executed by one or more processors of a quantum information processing (QIP) system, cause the one or more processors to:

select a first ion of a plurality of ions in a single ion chain;

select a second ion of the plurality of ions in the single ion chain, the second ion being different than the first ion;

control a light source to:

apply a first carrier $\pi/2$ pulse to the first ion;

apply a first red sideband $\pi$ pulse to the first ion after the first carrier $\pi/2$ pulse is applied;

apply a second red sideband $\pi$ pulse to the second ion, wherein the second ion is entangled with the first ion through a motional mode shared by the first ion and the second ion; and apply a second carrier $\pi/2$ pulse to the second ion after the second red sideband $\pi$ pulse is applied; and scan a phase of the second carrier $\pi/2$ pulse.

5. The non-transitory computer readable medium of claim 4, further comprising instruction to:

control the light source to:

apply each of a plurality of red sideband $\pi$ pulses to each of remaining ions of the plurality of ions; and apply each of a plurality of carrier $\pi/2$ pulses to each of the remaining ions of the plurality of ions; and scan a plurality of phases of the plurality of carrier $\pi/2$ pulses to determine a relative phase associated with a motional mode.

6. The non-transitory computer readable medium of claim 5, wherein the instructions for scanning the plurality of phases comprises instruction for applying a fixed phase to a last $\pi/2$ pulse of the plurality of carrier $\pi/2$ pulses.

7. A quantum information processing (QIP) system, comprising:

a controller configured to:

select a first ion of a plurality of ions in a single ion chain; and select a second ion of the plurality of ions in the single ion chain, the second ion being different than the first ion;

a light source configured to:

apply a first carrier $\pi/2$ pulse to the first ion;

apply a first red sideband $\pi$ pulse to the first ion after the first carrier $\pi/2$ pulse is applied;

apply a second red sideband $\pi$ pulse to the second ion, wherein the second ion is entangled with the first ion through a motional mode shared by the first ion and the second ion; and apply a second carrier $\pi/2$ pulse to the second ion after the second red sideband $\pi$ pulse is applied; and scan a phase of the second carrier $\pi/2$ pulse.

8. The QIP system of claim 7, wherein:

the light source is further configured to:

apply each of a plurality of red sideband $\pi$ pulses to each of remaining ions of the plurality of ions;

apply each of a plurality of carrier $\pi/2$ pulses to each of the remaining ions of the plurality of ions; and the controller is further configured to scan a plurality of phases of the plurality of carrier $\pi/2$ pulses to determine a relative phase associated with a motional mode.

9. The QIP system of claim 8, wherein scanning the plurality of phases comprises applying a fixed phase to a last $\pi/2$ pulse of the plurality of carrier $\pi/2$ pulses.

10. The method of claim 1, further comprising identifying the single ion chain having the plurality of ions.

11. The non-transitory computer readable medium of claim 4, further comprising instruction to identify the single ion chain having the plurality of ions.

12. The QIP system of claim 7, wherein the controller is further configured to identify the single ion chain having the plurality of ions.

* * * * *